США012075182B2

(12) United States Patent
Ukas-Bradley

(10) Patent No.: US 12,075,182 B2
(45) Date of Patent: Aug. 27, 2024

(54) BACKGROUND DISPLAY DEVICE, BACKGROUND DISPLAY SYSTEM, RECORDING SYSTEM, CAMERA SYSTEM, DIGITAL CAMERA AND METHOD OF CONTROLLING A BACKGROUND DISPLAY DEVICE

(71) Applicant: Arnold & Richter Cine Technik GmbH & Co. Betriebs KG, Munich (DE)

(72) Inventor: Stephan Ukas-Bradley, Simi Valley, CA (US)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 138 days.

(21) Appl. No.: 17/560,169

(22) Filed: Dec. 22, 2021

(65) Prior Publication Data
US 2022/0201163 A1 Jun. 23, 2022

Related U.S. Application Data

(60) Provisional application No. 63/130,120, filed on Dec. 23, 2020.

(51) Int. Cl.
*H04N 5/222* (2006.01)
*G03B 15/10* (2021.01)
(Continued)

(52) U.S. Cl.
CPC ........... *H04N 5/2226* (2013.01); *G06F 3/014* (2013.01); *G06T 7/73* (2017.01); *H04N 5/2628* (2013.01);
(Continued)

(58) Field of Classification Search
CPC .. G06T 7/12; G06T 7/73; G06T 7/536; G06T 19/006; G06T 2207/30204;
(Continued)

(56) References Cited

U.S. PATENT DOCUMENTS 6,201,579 B1  3/2001 Tamir et al.
6,304,298 B1  10/2001 Steinberg et al.
(Continued)

FOREIGN PATENT DOCUMENTS

DE  696 01 880 T2  7/1999
DE  199 06 995 A1  8/1999
(Continued)

OTHER PUBLICATIONS

European Search Report dated May 25, 2022 in related European Patent Application No. 21213713.7 (nine pages).
(Continued)

*Primary Examiner* — Wesner Sajous
(74) *Attorney, Agent, or Firm* — Kilpatrick Townsend & Stockton LLP

(57) ABSTRACT

A background display device for a virtual image recording studio is configured to display, behind or above a real subject, a representation of a virtual background for a recording by an associated camera. Furthermore, the background display device is configured to display a plurality of predetermined optically detectable position markers, in order to enable a determination of a position of the associated camera relative to the background display device.

29 Claims, 27 Drawing Sheets

Figure 1A:
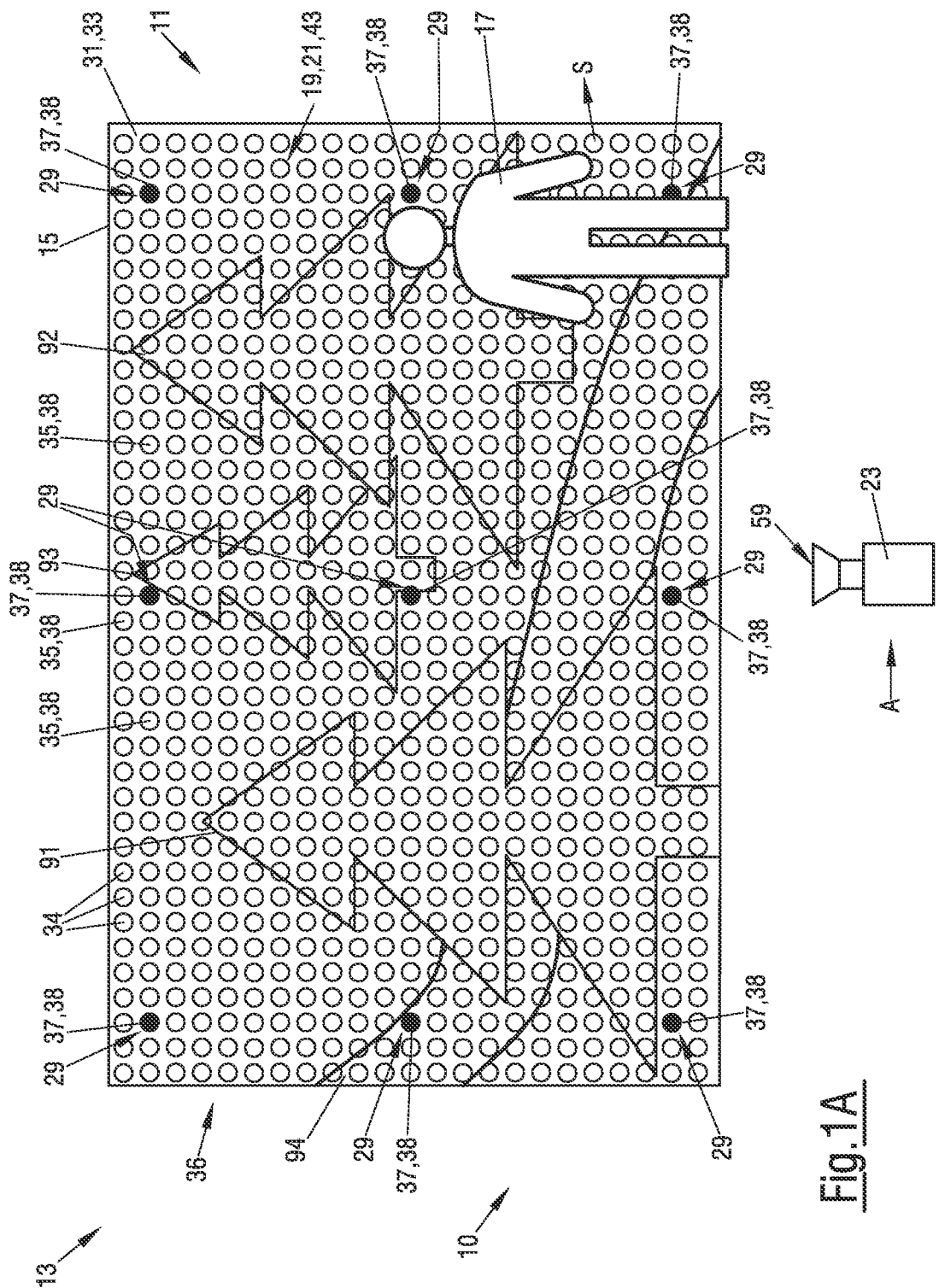

(51) Int. Cl.
| | |
|---|---|
| *G06F 3/01* | (2006.01) |
| *G06T 7/12* | (2017.01) |
| *G06T 7/73* | (2017.01) |
| *G06T 19/00* | (2011.01) |
| *H04N 5/262* | (2006.01) |
| *H04N 5/265* | (2006.01) |
| *H04N 5/33* | (2023.01) |
| *H04N 5/57* | (2006.01) |

(52) U.S. Cl.
CPC .............. *H04N 5/265* (2013.01); *H04N 5/33* (2013.01); *G03B 15/10* (2013.01)

(58) Field of Classification Search
CPC . G06T 2207/10016; G06T 2207/30196; G06T 15/50; G06T 15/20; H04N 5/272; H04N 5/2224; H04N 5/2628; H04N 5/265; H04N 5/33; H04N 5/57–58; H04N 5/77; H04N 9/73–75; H04N 23/23–24; H04N 23/71; G03B 15/10; G06F 3/014; G06F 3/147; G02B 3/0056; G02B 26/004; G02B 3/14; G09G 5/18; G09G 2320/028
See application file for complete search history.

(56) References Cited

U.S. PATENT DOCUMENTS

| | | | |
|---|---|---|---|
| 6,556,722 | B1 | 4/2003 | Russell et al. |
| 6,559,884 | B1 | 5/2003 | Tamir et al. |
| 6,741,241 | B1 | 5/2004 | Jaubert et al. |
| 9,236,032 | B2 * | 1/2016 | Choi ................. G06T 7/246 |
| 11,665,307 | B2 * | 5/2023 | Koppetz ............. G06T 15/10 |
| | | | 396/3 |
| 2010/0194863 | A1 * | 8/2010 | Lopes ................. G06T 7/12 |
| | | | 715/848 |
| 2014/0301088 | A1 | 10/2014 | Lu et al. |
| 2020/0145644 | A1 | 5/2020 | Cordes et al. |
| 2020/0336676 | A1 * | 10/2020 | Lee ................. H04N 23/60 |
| 2023/0098395 | A1 * | 3/2023 | O'Leary ............. H04N 7/15 |
| | | | 348/14.03 |
| 2023/0109787 | A1 * | 4/2023 | O'Leary .......... H04L 12/1822 |
| | | | 348/14.09 |
| 2023/0113256 | A1 * | 4/2023 | Popp ............... H04N 7/183 |
| | | | 348/207.99 |
| 2023/0114419 | A1 * | 4/2023 | Popp ............... G02B 3/0056 |
| | | | 348/801 |

FOREIGN PATENT DOCUMENTS

| | | | |
|---|---|---|---|
| DE | 698 04 591 T2 | 10/2002 | |
| DE | 698 19 181 T2 | 8/2004 | |
| DE | 698 31 181 T2 | 5/2006 | |
| DE | 10 2007 041 719 B4 | 1/2010 | |
| EP | 0885429 A1 * | 12/1997 | ............. H04N 5/265 |
| EP | 0 895 429 A1 | 2/1999 | |
| EP | 3 748 945 A1 | 12/2020 | |
| GB | 2 336 057 A | 10/1999 | |
| GB | 2 399 248 A | 9/2004 | |
| GB | 2 386 489 B | 10/2006 | |
| WO | 2011/015196 A1 | 2/2011 | |
| WO | 2019/195884 A1 | 10/2019 | |

OTHER PUBLICATIONS

Dalkian, Sevan: nDisplay Technology. Limitless scaling of real-time content, company publication Unreal Engine, Raleigh, NC, USA: Epic Games, 2019.

Eschenbacher, Anna: Real-Time Cinematography in a Virtual Production Environment, Hochschule der Medien Stuttgart, course: audiovisual media, bachelor thesis, Oct. 17, 2018. Stuttgart: HdM, 2018.

Gibbs, Simon; Arapis Costas; Breiteneder, Christian et al.: Virtual Studios: An Overview. IEEE MultiMedia, vol. 5, No. 1, Jan.-Mar. 1998, pp. 18-35.

Grau, Oliver; Price, Marc; Thoas, Graham A.: Use of 3-D Techniques for Virtual Production. BBC R&D White Paper WHP 033, Jul. 2002. London: British Broadcasting Corporation, Research & Development, 2002.

Götz, Kai: Virtual Production. Hochschule der Medien Stuttgart, course: electronic media, master thesis, Feb. 26, 2015, Stuttgart: HdM, 2015.

Kadner, Noah: The Virtual Production Field Guide. vol. 1, company publication, v1.3, Epic Games, 2019, Raleigh, NC, USA: Epic Games, 2019.

Mehling, Michael: Implementation of a Low Cost Marker Based Infrared Optical Tracking System. Fachhochschule Stuttgart, Hochschule der Medien, course: audiovisual media, degree dissertation, Feb. 26, 2006. Stuttgart: HdM 2006.

Oschatz, Sebastian: The Virtual Studio (VIST). Grundlagen eines echtzeitfähigen Systems zur Verwendung computergenerierter Fernseh-Studio-Kulissen, degree dissertation of TH Darmstadt am Institut für Integrierte Publikations—und Informationssysteme (IPSI) der GMD. St. Augustin/Darmstadt, 1994.

ROE Creative Display: ROE Visual LED Products for Virtual Production for Film & Broadcast. Company publication. Blank dated.

Rotthaler, Max: Virtual Studio Technology. EBU Technical Review, Summer 1996, pp. 2-6.

Schmidt, Ullrich: Professionelle Videotechnik. vol. 6, ISBN 978-3-642-38991-7. Berlin; Heidelberg: Springer, 2013. Chaper: Videosignalbearbeitung, p. 624-697, chapter 10: Videostudiosysteme, pp. 698-809.

Sommerhäuser, Frank: Das virtuelle Studio. Degree dissertation, division Photoingenieurwesen, Fachhochschule Köln. Köln: FH, Feb. 1995.

Sommerhäuser, Frank: Das virtuelle Studio. In: FKT; Bd. 50, 1996, H. 1, p. 11-22—ISSN 0015-0142.

SRT [Hrsg.]: Ausbildungshandbuch audiovisuelle Medienberufe. vol III., 2. Edition. ISBN 3-7785-2855-6. Heidelberg: Hüthig, 2003. Chapter 1.3: Virtuelles Studio, p. 11-1 3, chapter 6: Licht und Kameras, paragraphs 6.1-6.3, p. 327-377.

Thomas, G. A.: Mixed Reality Techniques for TV and their Application for on-Set and Pre-Visualization in Film Production. BBC Research White Paper WHP 145, Jan. 2007, London: British Broadcasting Corporation, BBC Research, 2007.

Thomas, G. A.; Jin, J.; Niblett, T.; Urquhart, C.: A Versatile Position Measurement System for Virtual Reality TV Production. International Broadcasting Convention, Amsterdam, Sep. 12-16, 1997, IBC 97. IEE Conference Publication, pp. 284-289.

German Search Report dated Sep. 20, 2021 in related German Patent Application No. 10 2021 106 488.0 (23 pages).

* cited by examiner

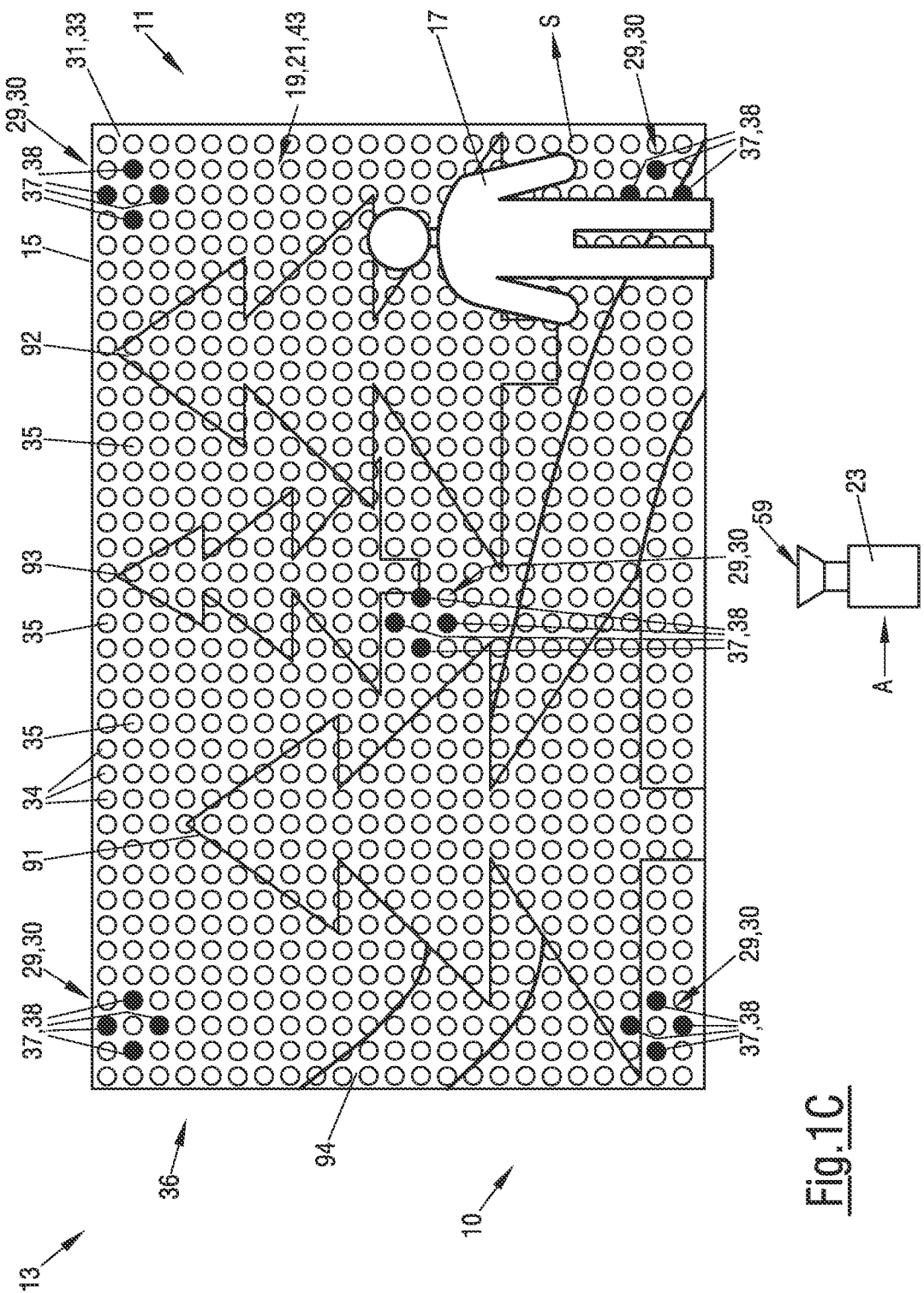

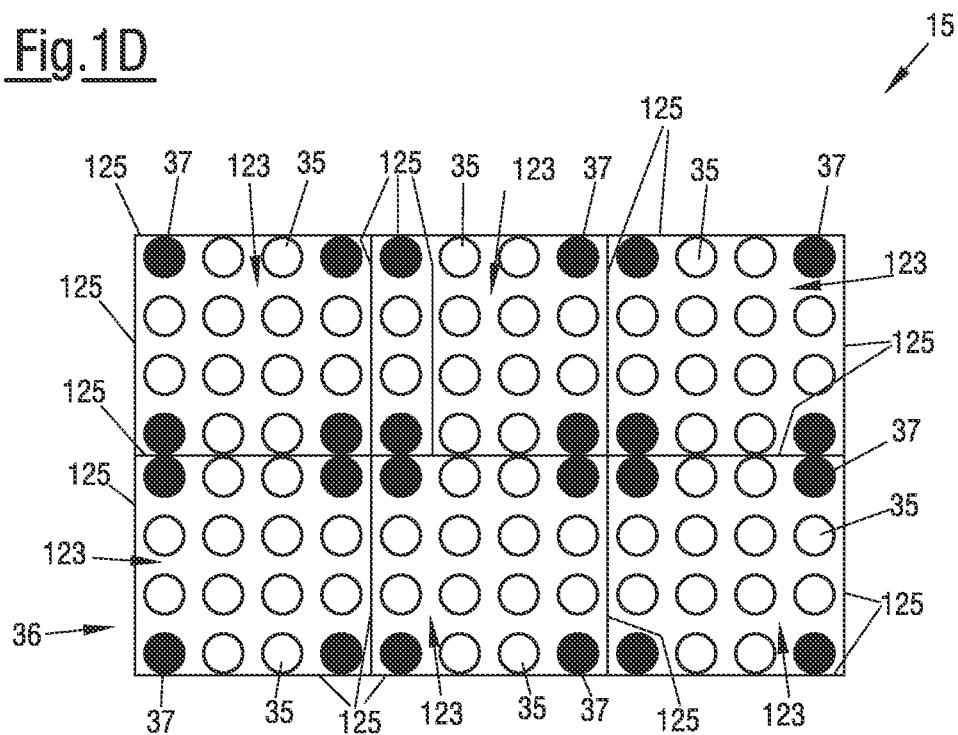
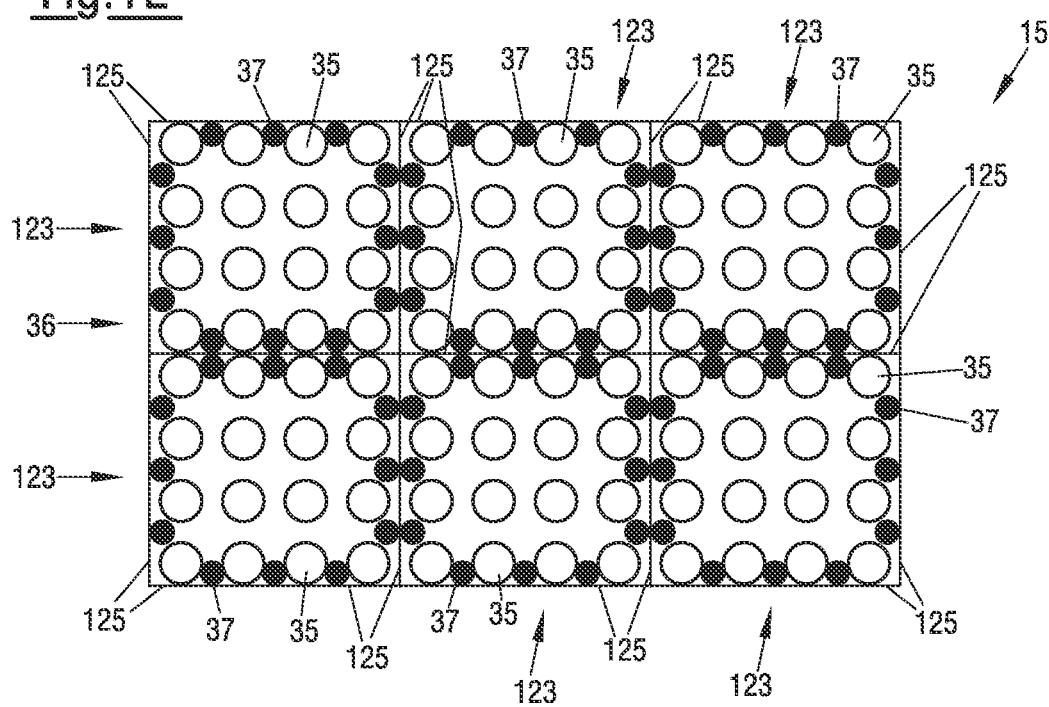

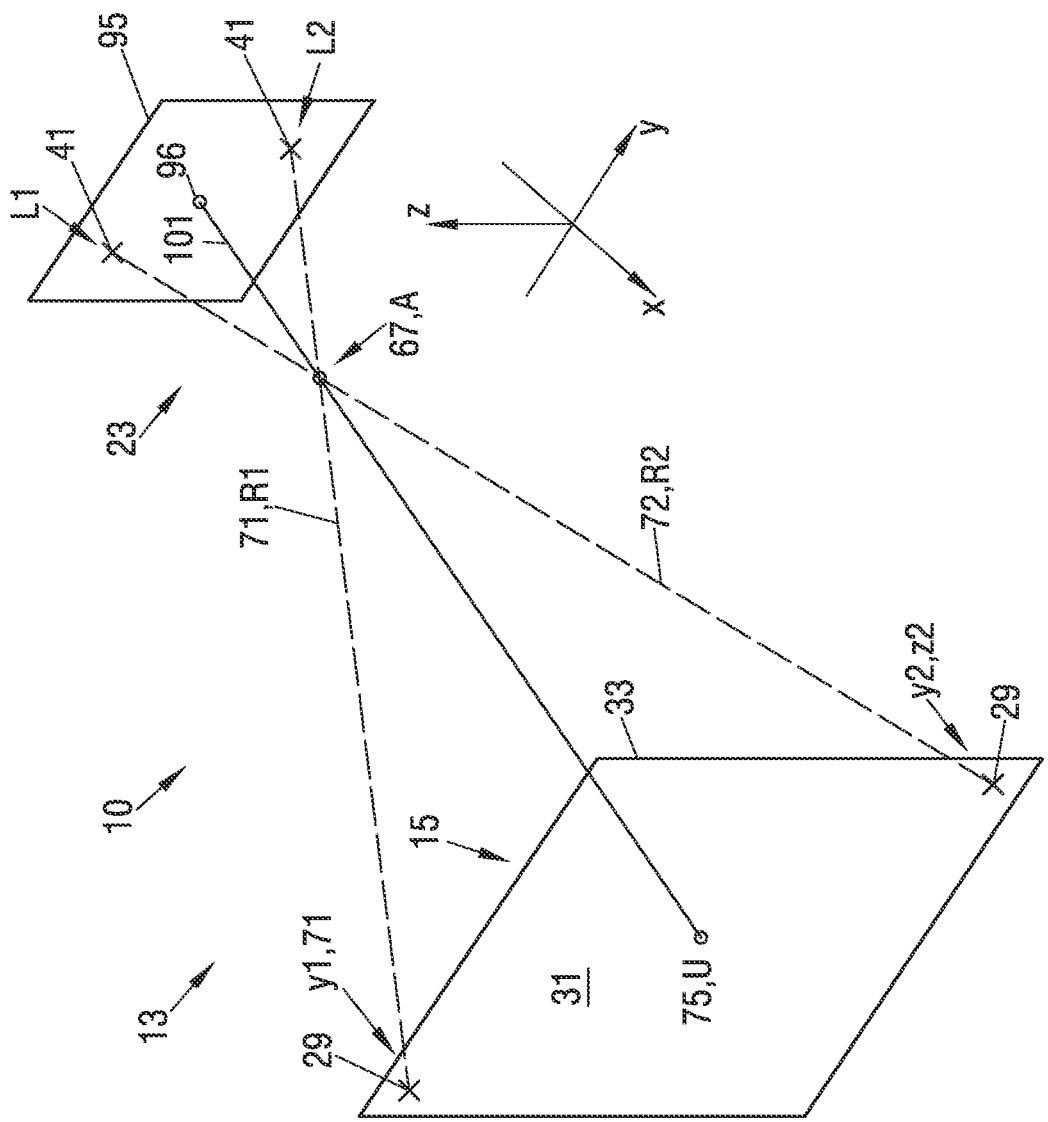

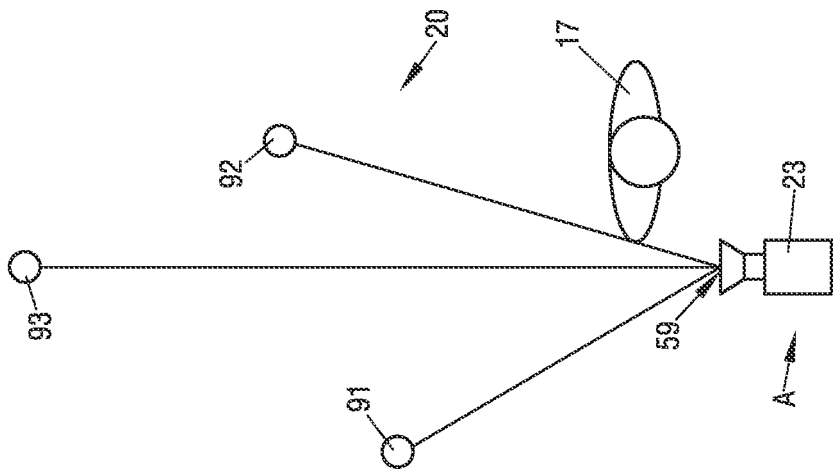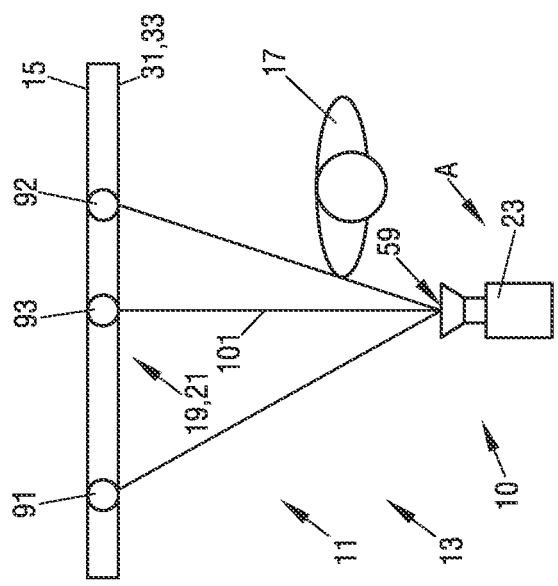

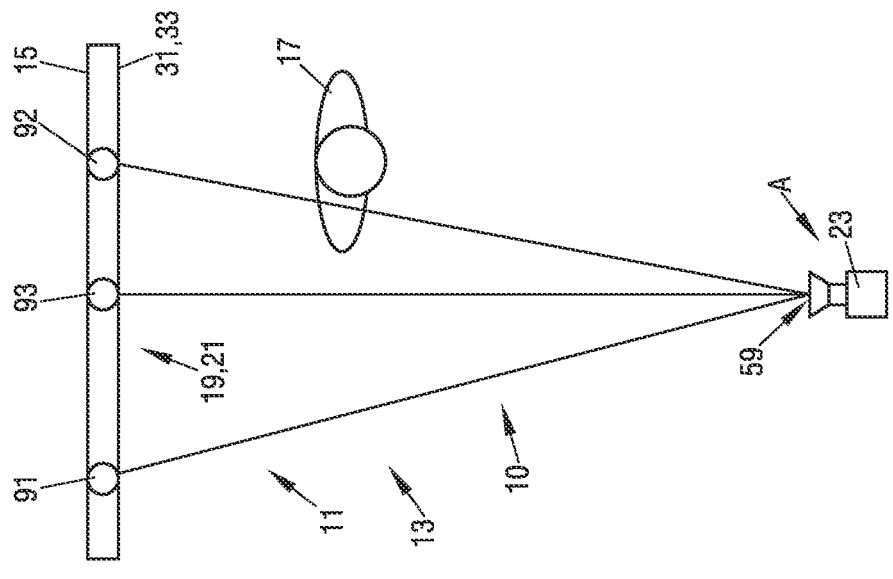
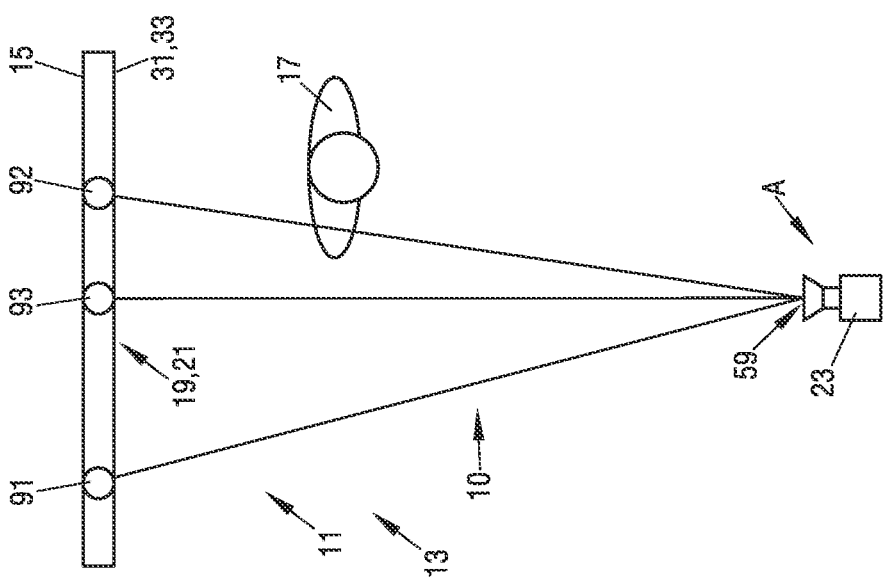

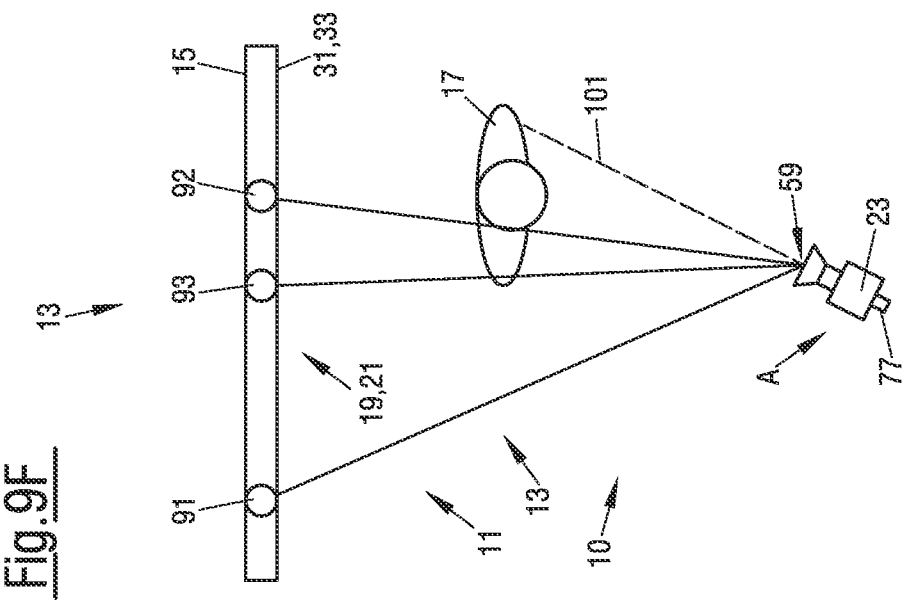
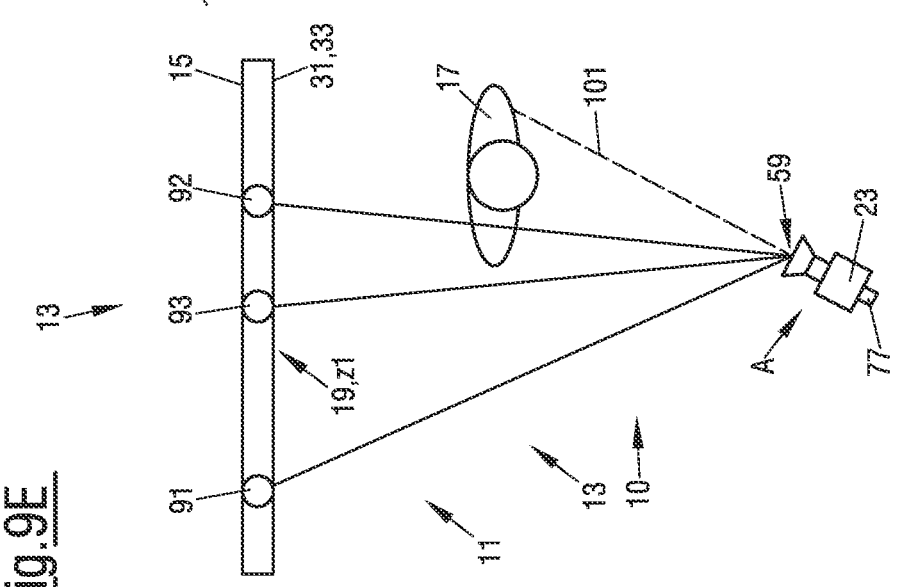

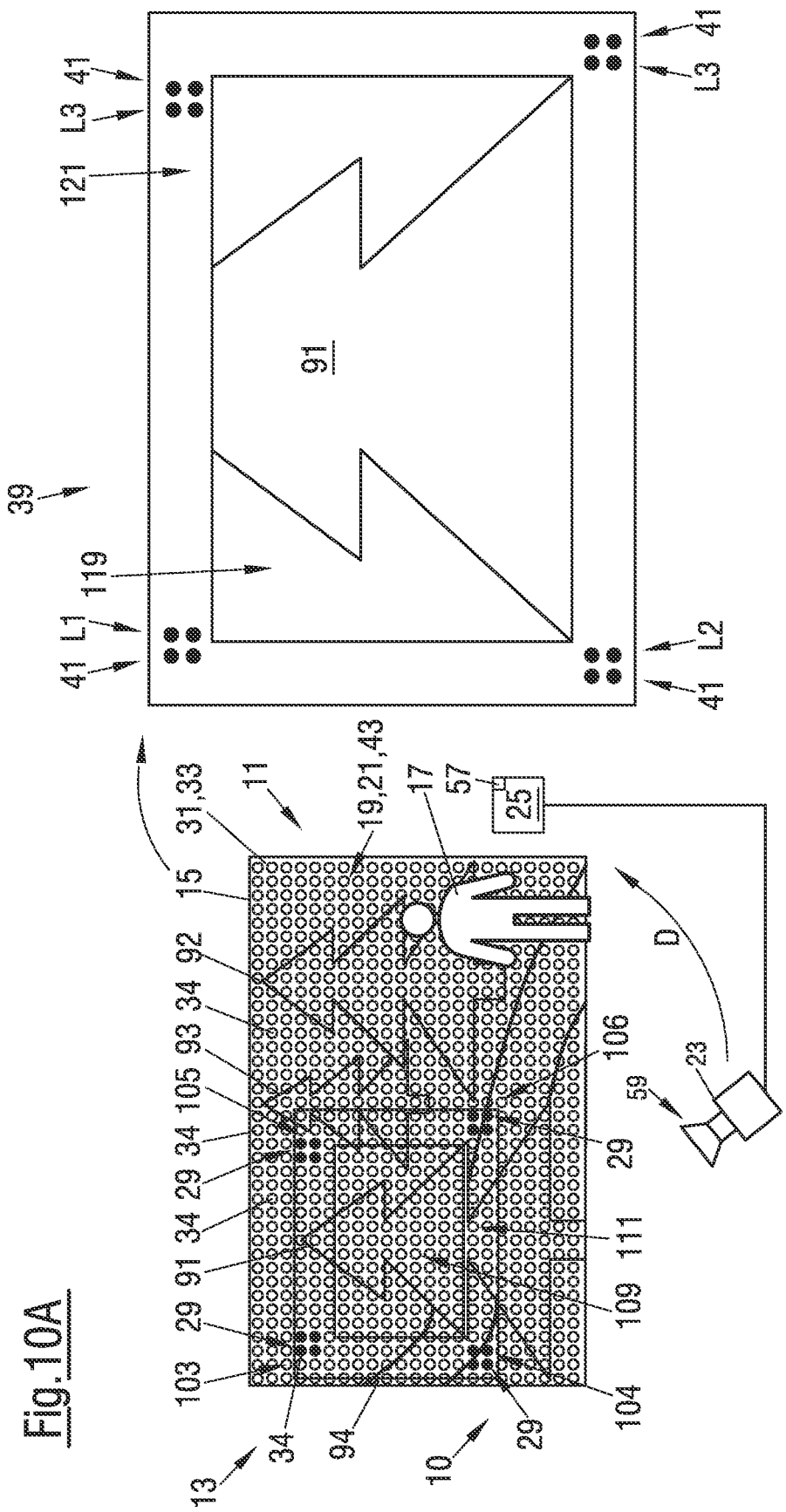

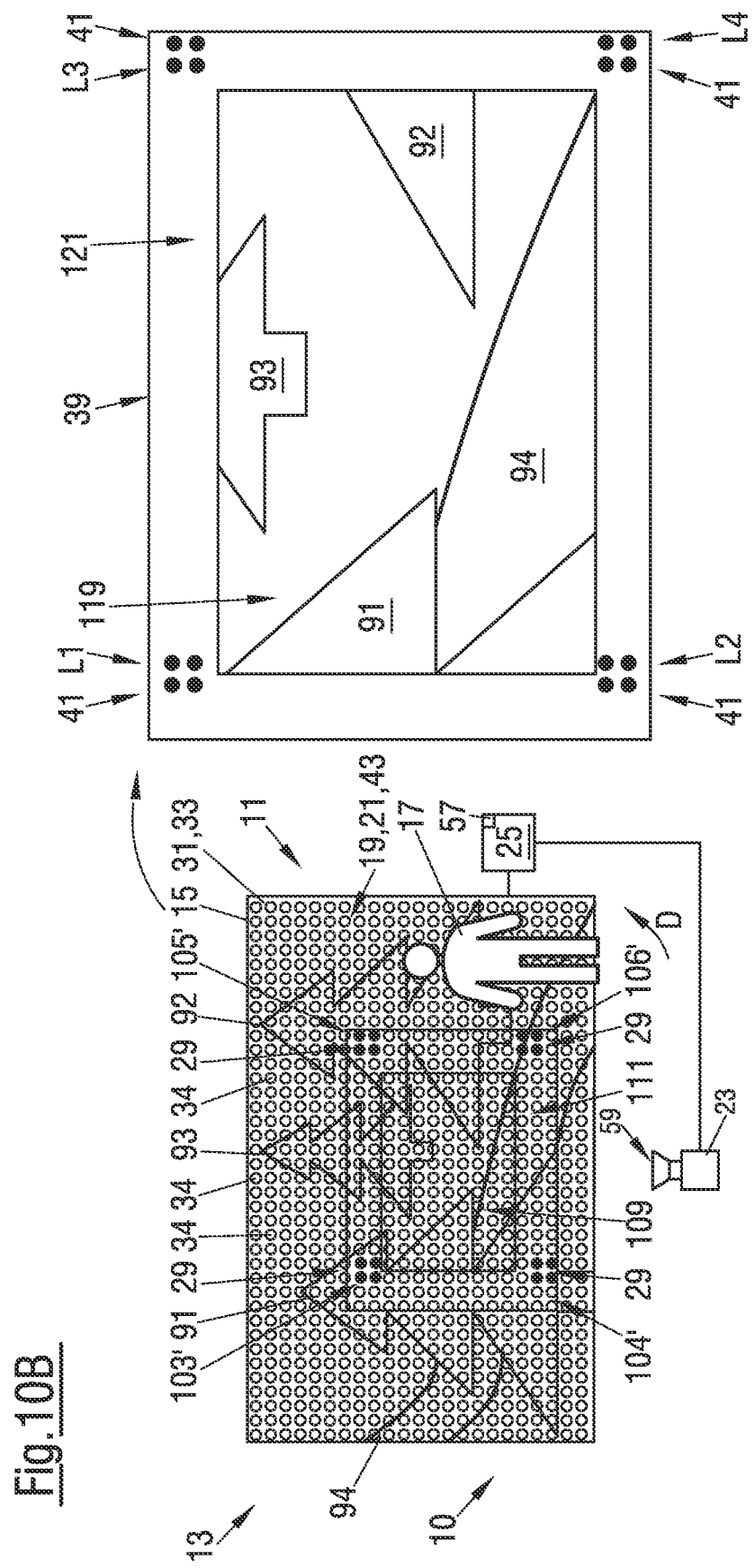

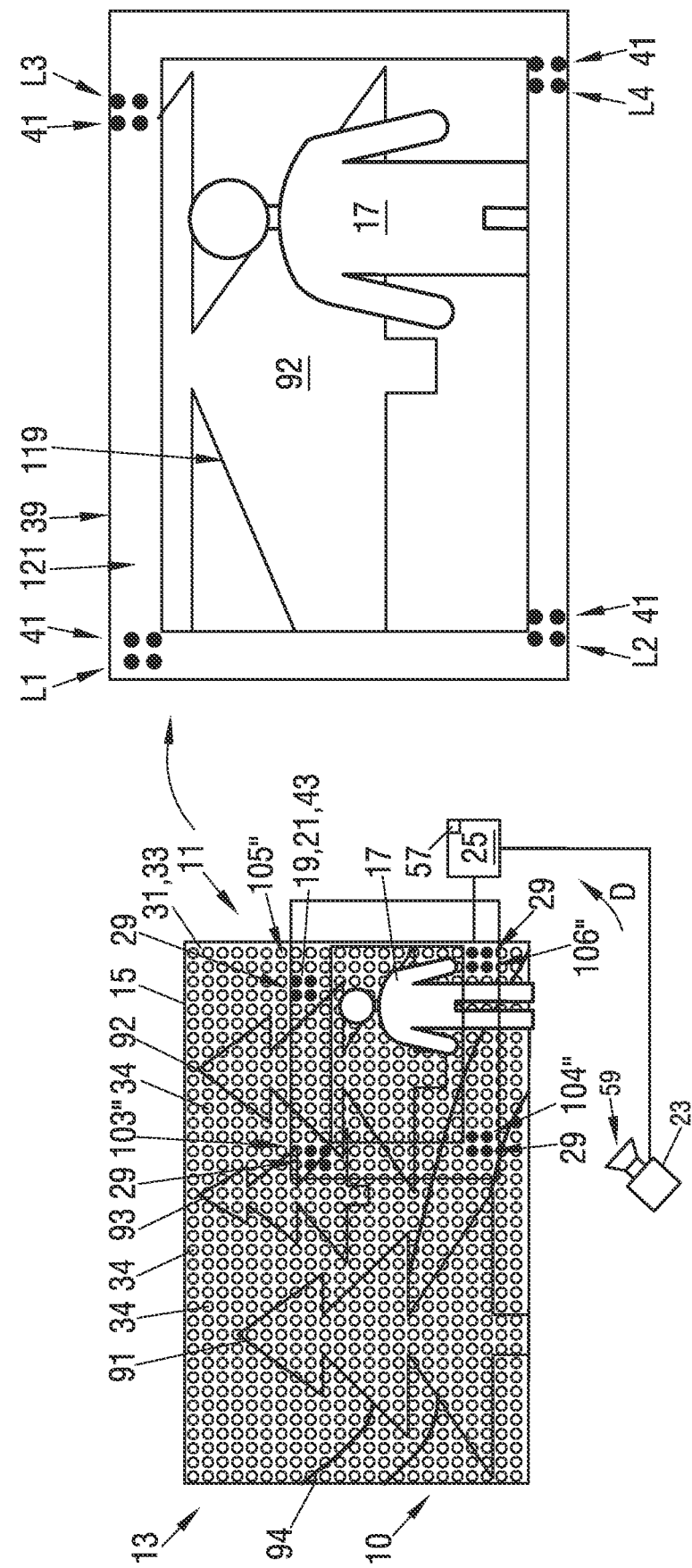

BACKGROUND DISPLAY DEVICE, BACKGROUND DISPLAY SYSTEM, RECORDING SYSTEM, CAMERA SYSTEM, DIGITAL CAMERA AND METHOD OF CONTROLLING A BACKGROUND DISPLAY DEVICE

This application claims benefit to U.S. Provisional Patent Application No. 63/130,120, filed Dec. 23, 2020, which is incorporated by reference herein.

The present invention relates to a background display device for a virtual image recording studio which is configured to display a representation of a virtual background, behind or above a subject, for a recording by means of an associated camera.

Furthermore, the invention relates to a background display system having such a background display device, a recording system having such a background display device and an associated camera, digital cameras, a camera system and a method of controlling such a background display device.

Background display devices of this type may be used in particular to display in an image recording studio a landscape or an environment in which a recording is to be made and which forms a virtual background for a scene to be recorded. The image recording studio, for example, may be a film studio for recording moving image sequences or a photo studio in which individual images or still images are recorded. In general, such a recording may include local storage of image data or a transmission to a remote location (e.g., Broadcast, Streaming). In the virtual image recording studio, a virtual background or an environment may be created in which an actor can move around during a moving image recording, or it may form a background for a still image recording.

For example, when recording moving images, such a background display device may be used to display a representation of a virtual background in order to be able to record a scene directly in the intended environment. In particular, as a result of this, the acting may be facilitated since possible events occurring in the virtual background may be perceived by an actor and the actor may react to these events. In contrast to the use of a green screen for example where the environment is not visible to the actor, the actor can therefore adapt his acting to any background events and a director, a camera person or any other person involved in the shooting may already gain an overall impression of the scene during the shooting and may evaluate the scene. In addition, the entire scene or a corresponding section of a film may be viewed and checked directly after the recording, without the background having to be added first.

In the case of still image recordings, such a background display device may be used in particular to record photographs in basically any surrounding in an image recording studio and thus in a controllable environment, and to thereby have the resulting image fully in view while taking the photograph. The background and the real subject or a person to be photographed can thus be optimally matched or coordinated with one another. In addition, the recording or the recorded photo may be viewed immediately, in order to carry out necessary adjustments if required.

Such a background display device can thus make it possible to display any landscapes or surroundings as a virtual background for a recording in an image recording studio and to carry out the recording before such a virtual background. However, regarding the interaction with the associated camera there arises the problem, that a real background corresponding to the virtual background would usually be imaged differently by the camera due to movements or position changes of the camera than the actual imaged representation of the virtual background by the camera. In particular, for three-dimensional virtual backgrounds, for example for landscapes, at least some background regions in a virtual image recording studio may usually not be displayed at a distance to the real subject, at which distance the background region in question would be arranged to the real subject in a real background corresponding to the virtual background. Indeed, it is usually necessary to display a three-dimensional virtual background, at least in sections, on two-dimensional surfaces of the background display device which, however, leads to the representation of the virtual background being imaged differently for a change in the camera position, as an observer of an actual three-dimensional scene would expect.

In order to address this problem, it would basically be necessary, at least to know the position of the camera in order to be able to make any adjustments based on this information. However, a determination of the position of the camera may in most cases only be achieved with a large constructive effort and with correspondingly high costs. For example, several additional cameras may be arranged in the image recording studio which are oriented at the camera provided for the recording, in order to determine from their images the position of the camera. However, this requires a plurality of additional cameras which need to produce spatially high-resolution images and whose images need to be evaluated using complex image analysis methods, in order to be able to distinguish the camera provided for the recording from other imaged elements.

It is therefore an object of the invention to create simpler, faster and more cost-effective options for determining a position of an associated camera for recordings in a virtual image recording studio.

This object is achieved by the independent claims.

In particular, the background display device is configured to display a plurality of predetermined optically detectable position markers, in order to enable a determination of a position of the associated camera relative to the background display device.

Since a plurality of optically detectable position markers is displayed on the background display device, the position markers and/or at least a portion of the position markers located in a field of view of the associated camera may, for example, be imaged by the associated camera during a recording, in particular, in addition to the representation of the virtual background. By identifying the position markers in the image, in particular by determining the locations of the individual position markers within the image, it may then be concluded, where or in which spatial position the camera is located relative to the position markers and thus to the background display device. Alternatively, or in addition, in some embodiments the position markers may also be detected by means of at least one auxiliary camera. The determining of the position of the camera based on the locations of the position markers within the image may take place, for example, based on a triangulation method, as will be explained below.

The plurality of position markers may in particular be spaced spatially from one another (within a plane or in three-dimensional space), so that from the locations of the position markers in an image of the background display device, the position of the camera that generates the image, may be determined.

The image generated by the main camera and/or an auxiliary camera may generally correspond to a projection of a frustrum (also referred to as Viewing Frustum) of the relevant camera onto an image sensor. In this respect, by means of the respective camera, a three-dimensional, in particular a frustoconical, field of view of the camera in which the three-dimensional scene in the virtual image recording studio takes place, may be projected onto a two-dimensional image sensor in order to generate a two-dimensional image of the frustrum of the camera. The locations of the position markers within the image or the locations of the imaged position markers thus may in particular indicate where the position markers are located within the two-dimensional image. The locations of the imaged position markers may thus be specified, for example, as two-dimensional coordinates. These locations and in particular their coordinates may be determined in the image itself or in image data which correspond to the image and are generated by an image sensor of the associated camera or an auxiliary camera. As an alternative to this, the locations may also refer directly to the image sensor and indicate where the light emanating from the position markers impinges on the image sensor. For this purpose, for example, those sensor elements of the image sensor which detect light emanating from a position marker may be identified and specified.

In addition to the locations of the position markers within the image, the number of imaged position markers may also be considered when determining the position of the associated camera, since, for example, the size of an area in a region of the background display device recorded by the camera may vary in dependence on the distance between the camera and the background display device. By moving the camera away from the background display device, accordingly, increasingly more position markers can get into the frustum of the camera and be imaged, so that the number of imaged position markers correlates with the distance between the camera and the background display device and may offer information about the position of the camera in space.

While the position markers are displayed by the background display device, the position markers do not contribute to the representation of the virtual background. The position markers are accordingly not part of the represented image content, which represents the virtual background. Rather, the position markers may only serve, or exclusively serve, to mark positions on the background display device. The position markers may be arranged within the representation of the virtual background and may be imaged together with the representation of the virtual background, however, are optically distinguishable from the representation of the virtual background or where applicable, from adjacent background regions of the virtual background and thus, be identifiable in the image. Optical distinguishability may be achieved, for example, by displaying the position markers in specific wavelength ranges, in particular in the non-visible (i.e., imperceptible to the human eye) wavelength ranges such as an infrared and/or an ultraviolet wavelength range. In some embodiments, optical distinguishability may also be achieved, for example, by a display of specific marking patterns. For example, geometric shapes or color patterns (wavelength patterns) come into consideration. In particular, the position markers may also be displayed always in the same way, independent of a respective represented virtual background and, in particular, independent of changes or adjustments to the virtual background occurring during the recording, in order to enable a simple and constant identification in the image.

Fundamentally, the virtual background may represent a three-dimensional scene. This three-dimensional scene may be displayed by the background display device, in particular at least in sections, on a two-dimensional surface, wherefor the background display device may have, for example, an active lighting matrix, in particular an LED-wall, or a screen for a rear projection. The background display device may extend behind and/or above the real subject and may be configured to be planar in sections and/or curved in sections. Also, the position markers may be arranged on such two-dimensional sections of the background display device, wherein the position of the associated camera may be determined based on the locations of at least two position markers within an image of the background display device.

In particular, it may be provided for, that the position markers may be imaged by the associated camera, which is also provided for the recording of the representation of the virtual background and the real subject. As a result, the position of the associated camera may be deduced or determined from the image generated anyway by the associated camera, without further recordings needing to be created or additional optical components being required. Alternatively, it may be provided for, for example, in some embodiments, that the position markers may be detected by at least one auxiliary camera connected to the associated camera provided for the recording in the virtual image recording studio, so that from the image generated by the auxiliary camera, the position of the auxiliary camera and from this, the position of the associated camera may be determined. Alternatively, or additionally, for an imaging of the position markers by such an auxiliary camera, a parallax correction may initially take place, so that the position of the associated camera may be determined directly based on the image generated by the auxiliary camera, without first determining the position of the auxiliary camera.

In such a camera system having at least one auxiliary camera, the associated camera may form a main camera which generates the recording or images the representation of the virtual background and the real subject, while the auxiliary camera or auxiliary cameras may serve to determine the position of this main camera. Here, the auxiliary camera may simply form a minor extension of the main camera and, for example, may be connected as a module to the main camera, in particular it may be screwed on and/or plugged in. However, a physical connection between the main camera and the auxiliary camera(s) is really not necessary, provided the spatial relationship between the main camera and the auxiliary camera(s) is known.

Moreover, for such camera systems, generally several auxiliary cameras may be connected to a main camera, whereby the respective auxiliary cameras or their image sensors may, for example, be light-sensitive to wavelength ranges different from one another and/or light-sensitive to a non-visible wavelength range. In particular, images of a scene to be recorded may be generated in a visible wavelength range by means of the main camera, while the auxiliary cameras or some of the auxiliary cameras may be configured, for example, to image infrared and/or ultraviolet wavelength ranges. In particular, the auxiliary cameras of such a camera system may image position markers generated in non-visible wavelength ranges, in order to be able to determine the position of the main camera in a space, based on the locations of the position markers in an image generated by at least one of the auxiliary cameras.

Furthermore, an auxiliary camera or several auxiliary cameras may be provided in a camera system to obtain additional information which may be used for determining the position of the associated camera, in addition to the information obtained by way of the imaged position markers. For example, at least one auxiliary camera oriented vertically upwards in the direction of a ceiling or an upper boundary of the virtual image recording studio (also referred to as a dome camera) may be connected to the main camera. An auxiliary camera aligned in this way can make it possible to determine a distance between the auxiliary camera and the ceiling or boundary and, to determine a distance between the main camera and the ceiling or boundary based on a predetermined or known relative position between the auxiliary camera and the main camera, in order to be able to determine a height of the associated camera in space based on this information or, to be able to use this information for determining the height. For this purpose, the auxiliary camera may in particular include a depth sensor or be coupled to such a sensor, which may determine the distance to the ceiling or boundary of the virtual image recording studio, for example, according to the principle of Time of Flight or Phase Shift.

Alternatively, or in addition, an auxiliary camera or several auxiliary cameras may be connected to the main camera, by means of which information about the position of the main camera in space may be obtained by Depth Mapping, in that, for example, the sharpness and/or contrast gradients of the generated image are analyzed and correlated with the respective distances of the imaged objects to the auxiliary camera and thus the main camera. Such a Depth Mapping may also take place based on an image generated by the main camera. Furthermore, one or more auxiliary cameras may be provided in a camera system to obtain information about the position of the main camera using a Structured Light Method. With such a method, a predefined light pattern, for example, a grid or a line pattern, may be projected onto the background display device or the scene to be recorded, in order to be able to obtain depth information in respect of the objects reflecting the light, based on the deformation of the reflected light pattern, which may be used to determine the position of the associated camera. The light pattern may be generated in particular in a non-visible wavelength range, so as not to impair the image of the scene generated by the main camera in the visible wavelength range, wherein the auxiliary camera or cameras may be configured accordingly for imaging non-visible light. For example, several such methods, in addition to the imaging of the position markers by means of a camera system, may in particular be carried out in real time, in order to be able to determine and track the position of the associated camera in space as precisely as possible in real time. Both a Depth Mapping and a Structured Light Method may take place with the aid of an image analysis method, which may be carried out, for example, by means of a microprocessor and/or a CPU of the background display device and/or the relevant camera.

In order to be able to image the position markers with the associated camera and identify them in the image generated, the position markers may be displayed in particular in a visible wavelength range and, for example, be identified in the image generated by the camera by means of image analysis methods. The position markers may be removed again from the image generated by the associated camera, for example, at the time of post-production or subsequent image processing, so that the position markers are no longer contained or visible in the image ultimately shown. Alternatively, it may for example be provided for, that the background display device is configured to display the position markers in a non-visible wavelength range, so that the position markers are not perceivable to the human eye. However, the associated camera or, in some embodiments, an auxiliary camera connected to the associated camera, may be configured to detect light in the relevant non-visible wavelength range, in order to enable the position markers to be detected and to allow the determining of the position of the associated camera. As a result, a determining of the position of the associated camera may be achieved without the image of the representation of the virtual background or a scene to be recorded being influenced by the display of position markers. Subsequent removal of the position markers in this case is not necessary.

In general, in association with the invention, non-visible electromagnetic radiation (in particular, in an infrared or an ultraviolet wavelength range) is for the sake of simplicity referred to as light. The distinction between visible and non-visible light pertains to the perceptibility by the human eye.

The position of the associated camera relative to the background display device determined by means of the position markers, may be used in particular to adapt the representation of the virtual background in dependence on the determined position of the camera in such a way, that the image of the representation of the virtual background corresponds to an image expected by the observer of a real background, in particular three-dimensional, which corresponds to the virtual background. For example, background regions or objects present in the virtual background may be displaced in the representation of the virtual background, so that the background regions or objects in the image generated by the associated camera are imaged at a place that the observer would expect the background regions or objects for an imaging of the real background to be. Both the determining of the position of the camera and the adaptation of the representation of the virtual background may take place in particular in real time, in order to be able to adapt the representation of the virtual background in dependence on the changing position of the camera, for example, during a quick camera panning.

In particular, the associated camera may be a moving image camera which may be used to record a scene taking place in the virtual image recording studio, including the representation of the virtual background as a sequence of a plurality of images or as a moving image sequence. As an alternative to this, the associated camera may be configured as a still image camera for recording individual images, in order to be able to record in the virtual image recording studio, for example, photographs in basically any virtual environment or in front of the virtual background.

In that the background display device is configured to display a plurality of optically detectable position markers, the position of the associated camera relative to the background display device may be determined in a simple manner from an image of the background display device. This may be achieved with a relatively minimal constructional effort, since only the display of, in particular, a small number of position markers on the background display device is required, which may be done, for example, by a plurality of light sources provided at the background display device. Apart from such minor adjustments, if required, to be made to the background display device, the image recording studio may, however, remain structurally unchanged compared to conventional solutions.

To a certain extent, the background display device disclosed herein represents a departure from the possible approach of observing the associated camera with great effort and deducing the position of the camera from these observations. In contrast to this, the background display device disclosed herein offers the possibility of determining the position of the associated camera based on data or an image that is generated at the position of the camera, for some embodiments, in particular by the associated camera which is used anyway. This enables a determining of the position of the associated camera, which is simple, fast and inexpensive, in order to be able to, in particular, adapt in real time the representation of the virtual background in dependence on the camera position.

Further embodiments may be found in the dependent claims, the description and the drawings.

In some embodiments, the background display device may comprise a display surface for the representation of the virtual background. In particular, the background display device may thus be configured to display a three-dimensional virtual background on the display surface, in particular, in two-dimensions. The display surface may extend, at least in sections, in a plane and/or be configured to be curved, at least in sections. For example, in the image recording studio, the background display device may extend around the real subject in a curved and/or circular arc shape and comprise a likewise curved display surface on which the virtual background may be represented. Furthermore, the background display device may comprise one or more planar display surfaces extending in respective planes for representing the virtual background. In doing so, several of the planar display surfaces may be connected to one another, whereby a further planar display surface or a curved display surface may be arranged between two planar display surfaces.

In some embodiments, the position markers may be arranged on the display surface. In particular, the position markers may therefore be arranged at respective positions onto which the associated camera is aligned anyway for recording the representation of the virtual background, so that the position markers may be detected by the associated camera and may be identified in the image generated by the associated camera. By providing a plurality of position markers and in particular, position markers which are spatially spaced apart from one another, it may further be ensured that there is always an adequate number of position markers in a field of view of the associated camera, in order to be able to determine the position of the associated camera. Thus, the associated camera does not have to record the entire display surface and the position of the associated camera may also be detected even if a part of the position markers is covered by the real subject.

Furthermore, in some embodiments, the background display device may be configured to illuminate the real subject. In addition to other lighting of the image recording studio, the background display device may in particular operate so as to achieve lighting conditions that appear as realistic as possible. In particular, shadows cast by the real subject, for example, due to a lamp represented in the virtual background, may be generated and imaged by such lighting, in the same way as for a recording in front of or in a real background corresponding to the virtual background.

In some embodiments, the background display device may extend in a vertical and/or horizontal orientation. The background display device may extend in particular in a vertical orientation behind the real subject and/or in a horizontal orientation above the real subject, whereby the background display device may comprise, for example, a curved transition section between a section with a vertical orientation and a section with a horizontal orientation. Both in sections with a vertical orientation and in sections with a horizontal orientation and/or in transition sections, the background display device may comprise respective display surfaces for generating the representation of the virtual background.

The plurality of position markers may in particular be arranged on the background display device, wherein the arrangement of the position markers in some embodiments may form a three-dimensional structure. In some embodiments, it may thus be provided for, that not all of the plurality of position markers are arranged within a common plane, but rather, the plurality of position markers is distributed in space. However, even with such a three-dimensional arrangement, some of the plurality of position markers may be arranged in a common plane and, for example, on a planar section of the said display surface. In particular, the arrangement of the plurality of position markers in a three-dimensional structure may expand the possibilities for determining the position of the associated camera and/or enable a more precise determining of the position. For example, in addition to the position of the associated camera, an orientation of the camera in space, in particular a rotated position and/or a tilted position of the camera, and/or a field of view of the camera may be determined by imaging position markers arranged in a three-dimensional structure.

In some embodiments, the plurality of position markers may be configured differently from one another. For example, the plurality of position markers may differ with respect to a shape and/or color, in which the position markers are displayed. As a result, the respective position markers may also be distinguishable from one another within the image provided for determining the position of the associated camera, so that a respective imaged position marker may be clearly assigned to a specific position marker on the background display device. Also, in this way, the determining of the position of the associated camera may be more precise.

Furthermore, in some embodiments it may be provided for, that the plurality of position markers is divided into different groups of position markers, wherein the position markers of one group are configured the same, but different from the position markers of at least one other group (e.g., with respect to shape and/or color). For example, the position markers may be configured or displayed identical to one another in individual sections of the background display device, so that, based on the respective imaged position markers, the alignment of the associated camera to the corresponding section of the background display device may be directly deduced and/or the field of view of the associated camera may be determined.

In some embodiments, the background display device may comprise a light-source wall which includes a plurality of light sources, wherein the light sources may be configured to display the representation of the virtual background and to generate the plurality of position markers. In particular, the light sources may also be individually controllable.

The light sources may in particular be configured to generate light signals in a planar arrangement, in order to display the representation of the virtual background and the position markers. Furthermore, the plurality of light sources or a part of the plurality of light sources may be configured as active and/or as separate lighting means. Alternatively, the plurality of light sources or a part of the plurality of light sources may be formed by points of light which are generated by reflection or transmission at the light-source wall, for example, a screen for rear projection. In such an embodiment, the active light generation may take place by a projector, whereby the light sources are merely formed indirectly on the screen.

In particular, a portion of the plurality of light sources may display the representation of the virtual background, while another portion of the plurality of light sources is provided (e.g., by appropriate control or through appropriate physical design) to generate the plurality of position markers. In some embodiments, a predetermined first portion of the plurality of light sources may be provided (e.g., configured) to display the representation of the virtual background, while a predetermined second portion of the plurality of light sources may be provided (e.g., configured) to generate the plurality of position markers. The position markers may consequently be generated at fixed positions on the background display device, in order to enable the position of the associated camera to be determined.

As an alternative to this, however, in some embodiments it may also be provided for, that all the plurality of light sources are configured to selectively display a section of the representation of the virtual background or to generate a position marker (completely or partially). In particular, that portion of the light sources that generate the position markers may be varied during the recording, so that the position markers may be generated or displayed on the background display device with changing positions, for example, during a recording. As a result, the position markers may, for example, always be led into a field of view of the associated camera during the recording, in order to enable an imaging of the position markers and the spatial position of the associated camera to be determined. If a respective light source is initially used to generate a position marker, but the position marker in a subsequent time period is generated at a different position or at least no longer generated by the respective light source, the respective light source in the subsequent time period may in particular be used to display a part of the representation of the virtual background. The position markers may in particular form overlays of the representation of the virtual background, so that an selective generation of a position marker by means of a light source may override, for example, a display of a part of the representation of the virtual background, while the light source by an absence of override, may display the corresponding part of the representation of the virtual background.

Furthermore, all of the plurality of light sources may, for example, be configured in the same way. In particular, in some embodiments it may be provided for, that all of the plurality of light sources are configured to emit light in the visible wavelength range. In such embodiments, both the representation of the virtual background and the position markers are consequently perceptible to the human eye. This in particular may make it possible, to image the plurality of position markers with the associated camera and to be able to determine a spatial position of the associated camera on the basis of the image generated by the associated camera. Here, the position of the camera may thus be determined on the basis of data that are generated anyway by the associated camera itself and during the recording. Since, for example, only some of the light sources possibly provided in a conventional background display device may be used to generate the position markers, in some embodiments the determining of the spatial position of the associated camera may be carried out without significant additional structural effort.

As an alternative to this, it may also be provided for, that the light sources of the plurality of light sources are configured to be at least partially different from one another. For example, a first part of the plurality of light sources, by means of which the representation of the virtual background is displayed, may be configured to emit light in the visible wavelength range, while a second part of the plurality of light sources may be configured to generate the position markers and to emit light in a non-visible wavelength range, in particular infrared and/or ultraviolet. Alternatively to this, the second part of the plurality of light sources may be configured to generate the position markers and to emit light in a special visible wavelength range that is different from the emission spectrum of the light sources of the first part and is thus distinguishable in the associated camera or an auxiliary camera. Consequently, the light sources of the first part and the second part of the plurality of light sources differ from each other, whereby the position markers may be generated in particular by the light sources configured for this purpose at fixed positions on the background display device. The position markers may, for example, be detected by an auxiliary camera which is sensitive in the non-visible wavelength range or in the special visible wavelength range and which is connected to the associated camera and is arranged at a defined position relative to the associated camera. As a result, the position markers may be detected and the position of the associated camera may be determined, without the recording of the scene or the image generated by the associated camera being impaired by the position markers displayed by the background display device.

In some embodiments, each of the plurality of position markers may be generated by a respective light source. Accordingly, the plurality of position markers may be imaged, for example, point-like or circular. In other embodiments, however, each of the plurality of position markers may be generated by a respective plurality of light sources. In particular, the position markers may be generated as predetermined marking patterns by a plurality of light sources arranged in the marking pattern, in order to enable easier identification in the image generated by the associated camera. Here, for example, concentric circles, polygons or crosses as marking patterns are possible. The marking patterns may be monochrome or multicolored. The marking patterns may be identifiable by pattern recognition. Furthermore, it may also be provided for, that different position markers or different groups of position markers are displayed as different marking patterns, in order to enable a clear identification of the respective position marker or the group of position markers in the image.

Since the light sources may in particular be individually controlled, for example, the color and/or the brightness of the light sources may be individually set. By appropriately controlling the light sources, in particular a representation of fundamentally any virtual background may thus be generated. Also, movements in the virtual background may be displayed by means of the background display device by appropriately varying the settings of the light sources that generate the representation of the virtual background.

Furthermore, in some embodiments, the light sources, in particular all light sources, may be arranged in a regular grid. For example, the light sources may thereby be arranged in several rows and columns or in other repetitive patterns in a planar arrangement, in order to form a display surface of the background display device or to be arranged on a display surface.

In some embodiments, the plurality of light sources may include light-emitting diodes. At least some of the plurality of light sources may thus be configured as light-emitting diodes. Furthermore, in some embodiments, all of the light sources may be configured as light-emitting diodes. In particular, some or all of the plurality of light sources may be configured as LEDs (Light Emitting Diodes) or OLEDs (Organic Light Emitting Diodes). Furthermore, the light-emitting diodes may in particular be part of a liquid crystal display.

In such embodiments, the background display device may in particular comprise an LED-wall which comprises a plurality of individually controllable light-emitting diodes in a flat arrangement. The LED-wall may thereby form the aforementioned display surface for representing the virtual background, wherein a first part of the light-emitting diodes may generate the representation of the virtual background. The position markers may also be arranged on the LED-wall and be generated by a second part of the light-emitting diodes. By individually controlling the first part of the light-emitting diodes, the representation of the virtual background may be changed or adapted as desired, wherein the position of the camera may be determined on the basis of the position markers generated by the second part of the light-emitting diodes. Depending on the determined position of the associated camera, the light-emitting diodes of the first part of light-emitting diodes may be controlled in such a way, that the image of the representation of the virtual background generated by the camera corresponds to or approximates an image expected by an observer of a real, in particular three-dimensional, background corresponding to the virtual background.

Furthermore, the assigning of a respective light-emitting diode to the first part and/or to the second part of the light-emitting diodes during a recording may be constant or variable. For a constant assigning, in particular the position markers are always generated by the same light-emitting diodes assigned to the second part, so that the position markers are always displayed in the same or in an unchanged position on the background display device during a recording. The position markers may in particular be imaged by the associated camera, in order to enable a determining of the spatial position of the camera however, they may be removed from the image in a subsequent image processing, for example by means of an interpolation based on edge detection.

Alternatively, the assigning of a respective light-emitting diode to the first part of the light-emitting diodes or to the second part of the light-emitting diodes may be varied during a recording. For example, a first light-emitting diode may generate a position marker or a part of a position marker in a first time period of the recording, while a second light-emitting diode, adjacent to the first light-emitting diode, displays a part of the representation of the virtual background in the first time period, wherein the first light-emitting diode in a subsequent second time period of the recording may be used to display a part of the representation of the virtual background, while the second light-emitting diode may generate the position marker or a part of the position marker in the second time period. The position marker or the part of the position marker may thus move from a first position on the background display device in the first time period, to a second position on the background display device in the second time period. In particular, the position marker may be moved in such a way, that the position marker is in a field of view of the camera during the entire recording. Such control of the background display device is explained in more detail below.

In some embodiments, the background display device may comprise a plurality of multicolored light source units, wherein each light source unit is configured to generate light in a plurality of selectable colors, in order to display the representation of the virtual background. For this purpose, the respective multicolored light source unit may comprise, for example, a single light-emitting diode whose spectral emission characteristic is tunable (i.e., may be electronically controlled), or the respective multicolored light source unit may comprise, for example, a plurality of light-emitting diodes in a dense arrangement, which generate light of different predetermined wavelengths and whose brightness is controllable, in order to create different mixing ratios. In particular, the multicolored light source units may form so-called RGB pixels, which selectively generate red light (R), green light (G) or blue light (B) or a mixture thereof.

In some embodiments, the background display device may comprise a plurality of position marker light sources that generate the plurality of position markers. In particular, the position markers may be displayed in the form of light signals which may be generated by the position marker light sources, directly or indirectly, on the aforementioned display surface of the background display device, for example, by reflecting a light beam. These light signals may be generated in a visible or in a non-visible wavelength range. The position marker light sources may be appropriately configured to emit light in a visible wavelength range and/or in a non-visible wavelength range, in particular in an infrared wavelength range and/or in an ultraviolet wavelength range.

In some embodiments, the background display device may thus comprise a plurality of position marker light sources which are used exclusively to generate the position markers and do not contribute to the representation of the virtual background. The position marker light sources may be arranged at fixed positions on the background display device, so that the position markers may also be generated at fixed or unchangeable positions during a recording by means of the position marker light sources. Furthermore, all position marker light sources may continuously emit light during the recording, so that all position markers may be displayed during the entire recording. The position marker light sources may, however, also be individually controllable, so that, for example, selectively only a part of the position markers may be generated. Furthermore, in some embodiments, the position marker light sources may be intermittently controllable to emit light. The control of the position marker light sources may in particular be synchronized with the associated camera, in order to be able to detect the position markers in frames provided therefor and to be able to determine the spatial position of the associated camera in these frames, while only the representation of the virtual background is displayed in the other frames.

Furthermore, it may be provided for, that the position markers are generated by individual position marker light sources or by a plurality of position marker light sources. For example, a plurality of position marker light sources may be arranged in a geometric shape, for example in a polygon, in concentric circles or in a cross shape, in order to generate a correspondingly shaped position marker. Furthermore, a plurality of position marker light sources, arranged in particular adjacent to one another, may be used to generate a position marker that is sufficiently large for unambiguous identification in a respective image. Alternatively, the position marker light sources may also be configured or provided to individually generate a respective position marker, which may be detectable as point-like or circular in an image.

In some embodiments, the background display device may moreover comprise a light-source wall, which comprises a plurality of individually controllable picture-element light sources. In particular, in some embodiments, the background display device may thus comprise a light-source wall that comprises a plurality of individually controllable picture-element light sources, and the background display device may comprise a plurality of position marker light sources which generate the plurality of position markers. In this case, a part of the aforementioned plurality of light sources may form the plurality of picture-element light sources, while another part of the plurality of light sources may form the plurality of position marker light sources.

In some embodiments, the background display device may thus comprise a plurality of light sources, wherein a part of the plurality of light sources forms the plurality of picture-element light sources and another part of the plurality of light sources forms the plurality of position marker light sources. In such embodiments, the aforementioned plurality of light sources may be divided in a predetermined manner into picture-element light sources on the one hand, and into position marker light sources on the other hand. A respective light source of the plurality of light sources may accordingly be, in particular either a picture-element light source or a position marker light source. This allocation may be unchanging, in particular during the recording. Fundamentally, the picture-element light sources and the position marker light sources may also be permanently set, so that a respective light source of the plurality of light sources may always be either a picture-element light source or a position marker light source.

The picture-element light sources and the position marker light sources may, in some embodiments, be of the same type, in particular physically similar and, for example, be configured as light-emitting diodes. As an alternative to this, the picture-element light sources and the position marker light sources may, in some embodiments, also be configured to be physically different, wherein, for example, the respective emission spectra of the picture-element light sources and the position marker light sources may differ from one another. In particular, in some embodiments, the position marker light sources may be configured to generate light in a non-visible wavelength range, while the picture-element light sources may be configured to display the representation of the virtual background in visible wavelengths.

The picture-element light sources may generate in particular respective picture-element light signals in a planar arrangement, in order to display the virtual background. For example, the color and/or the brightness of the picture-element light sources may be individually adjustable, so that the representation of the virtual background may be generated by appropriate control of the picture-element light sources. Movements in the virtual background may also be represented by appropriately varying the settings of the picture-element light sources by means of the background display device. The picture-element light sources and/or the aforementioned position marker light sources may be in particular active and/or separate lighting means. As an alternative to this, the picture-element light sources and/or the position marker light sources may be formed, for example, by points of light that are generated by reflection or transmission on the light-source wall, for example, a screen for a rear projection.

In some embodiments, the picture-element light sources and/or the position marker light sources may comprise light-emitting diodes. In particular, the picture-element light sources and/or the position marker light sources may be configured as LEDs (Light Emitting Diodes) or OLEDs (Organic Light Emitting Diodes). These light-emitting diodes may also be part of a liquid crystal display.

In such embodiments, the background display device may comprise in particular an LED-wall which comprises a plurality of individually controllable picture-element light-emitting diodes in a planar arrangement. The LED-wall may thereby form the aforementioned display surface for representing the virtual background, wherein the picture-element light-emitting diodes may generate the representation of the virtual background. The position markers may also be arranged on the LED-wall and are generated by or from respective position marker light-emitting diodes. By individually controlling the picture-element light-emitting diodes, the representation of the virtual background may thereby be changed or adapted as required, whereby the position of the camera may be determined based on the position markers generated by the position marker light-emitting diodes. Depending on the determined position of the associated camera, the picture-element light-emitting diodes may consequently be controlled in such a way, that the image of the representation of the virtual background generated by the camera corresponds to or approximates an image expected by an observer of a real, in particular three-dimensional, background corresponding to the virtual background.

In some embodiments, the number of position marker light sources may be less than the number of picture-element light sources. The picture-element light sources may also be assigned to a plurality of groups of light sources, wherein the plurality of groups of light sources represent different colors of visible light, and wherein the number of position marker light sources may be less than the number of picture-element light sources of the group with the least number of picture-element light sources.

The position marker light sources may be provided exclusively to generate or display the position markers without being involved in the representation of the virtual background. In this respect, the number of position marker light sources may significantly lie below the number of picture-element light sources which are provided for generating in particular the high-resolution representation of the virtual background. The number of position marker light sources may be sufficiently small in particular for an arrangement on a display surface of the background display device, that the representation of the virtual background by means of the picture-element light sources may be displayed unimpaired and with at least an essentially unchanged resolution.

In some embodiments, for example, the background display device may comprise a maximum of one hundred, in particular a maximum of fifty or a maximum of twenty or a maximum of ten position marker light sources. In some embodiments, for example, the background display device may comprise at least ten and at most one hundred position marker light sources. The background display device may also be configured to display a maximum of one hundred, in particular a maximum of fifty or a maximum of twenty or a maximum of ten position markers. In some embodiments, for example, the background display device may be configured to display at least ten and at most one hundred position markers. In particular, the background display device may comprise a plurality of light-emitting diodes, wherein a predominant portion of these light-emitting diodes may be provided as picture-element light-emitting diodes for generating the representation of the virtual background, while only a small portion of the light-emitting diodes may form position marker light-emitting diodes, which are provided and/or configured to display the position markers.

In some embodiments, the plurality of picture-element light sources may be arranged in a regular grid, wherein the position marker light sources may be arranged between the picture-element light sources of the regular grid.

For example, the plurality of picture-element light sources may be arranged in a grid of rows and columns, in order to generate the representation of the virtual background in a planar arrangement or on a display surface of the background display device. It may thereby be provided for, that the position marker light sources are arranged in respective interspaces of the regular grid between a plurality of the picture-element light sources. By attaching the position marker light sources in such interspaces, the number of picture-element light sources does not have to be reduced in order to be able to display the position markers, rather, the representation of the virtual background may be generated with the same number of picture-element light sources and with unchanged resolution. Whereas interspaces in the regular grid that most likely exist anyway, may be used to attach position marker light sources that enable the determining of the position of the associated camera. For example, a respective position marker light source may be arranged in a center point of a square formed by four picture-element light sources in the regular grid, or in a center point of several picture-element light sources arranged in a circle. In some embodiments, the position marker light sources may also have less expanse than the picture-element light sources, in order to be able to be provided in such interspaces.

Furthermore, in particular with an arrangement of the position marker light sources between a plurality of the picture-element light sources, it may be provided for, that the position marker light sources are generated indirectly on the light-source wall and/or a display surface of the background display device. For example, the light-generating sources for generating the position marker light sources may be arranged behind the display surface or the light-source wall, wherein the generated light may be guided to the display surface via respective light guides in order to be emitted therefrom. The light guides may thereby have a relatively small area requirement on the display surface, in particular a smaller area requirement than the light-generating sources, for example light-emitting diodes, so that respective light-outlet openings of the light guides are easily arranged in spaces between a plurality of picture-element light sources of the regular grid, and which may form position marker light sources. For example, they may be generated by light-emitting diodes which are arranged behind a display surface of the background display device and are connected to the display surface via respective light guides, wherein the light guides may open into respective spaces between several picture-element light sources.

Alternatively or in addition, in some embodiments, the position marker light sources may be arranged in place of a respective picture-element light source of the regular grid. A respective position marker light source may thus be arranged in such embodiments at a position in the regular grid at which a picture-element light source would be arranged in accordance with the grid. To a certain extent, individual picture-element light sources may be replaced by position marker light sources.

Such a replacement of individual picture-element light sources by position marker light sources may offer a simple opportunity for displaying the position markers, that may be achieved in particular without any structural effort. For example, in a conventional light-source wall on which a virtual background is generated, individual picture-element light sources may not be used to represent the virtual background, but rather are used to display position markers. Consequently, no picture-element light sources need to be replaced or separate position marker light sources need to be built into the light-source wall, rather individual picture-element light sources may be used specifically as position marker light sources and—instead of being involved in the representation of the virtual background—may be controlled to display the position markers. Thereby, the classification of individual light sources of the regular grid as position marker light sources may be set, in particular for the recording to be made by the associated camera or the images to be generated during it, for example a moving image sequence or a single still image recording or a plurality of still image recordings, and thus may not be changed during the recording.

For example, both the picture-element light sources and the position marker light sources may be configured as light-emitting diodes and the background display device may comprise an LED-wall, wherein all the light-emitting diodes may be arranged in a regular grid, however some of the light-emitting diodes are not used for representing the virtual background. The position markers may, for example, be displayed as a geometric pattern by the light-emitting diodes functioning as position marker light-emitting diodes, and which are identifiable in an image of the background display device or the representation of the virtual background, in particular by means of an image analysis method. Alternatively, or additionally, the position marker light sources may generate the position markers in a color that differs from a background region of the virtual background surrounding the respective position marker or from the colors of the picture-element light sources which surround the respective position marker. Generally, such a color of the position markers may be constant and/or changeable during a recording in order to be able to adjust the color, for example, to a changing color of the surrounding background region.

Also, when the position marker light sources are classified in a regular grid of the picture-element light sources, it may however be provided for, that the position marker light sources differ structurally from the picture-element light sources. Also, position marker light sources arranged in the regular grid of the picture-element light sources may be configured, for example, to emit light in a non-visible wavelength range.

In some embodiments, the background display device may comprise a plurality of display modules, wherein each of the plurality of display modules comprises a part of the plurality of picture-element light sources (e.g., light-emitting diodes). Such display modules may be configured in particular as panels (also referred to as tiles) and/or be flat. The display modules may have lateral edges, wherein the display modules adjoin one another at their lateral edges to form the background display device. In particular, the display modules may have an outline (e.g., square or hexagonal) which enables an arrangement of the display modules essentially seamless in two dimensions, next to one another in a regular grid. The position marker light sources (e.g., light-emitting diodes) may be arranged at the lateral edges of the display modules and thus be arranged at the boundaries between the display modules. This simplifies the fitting of the background display device with a plurality of position marker light sources (e.g., also with regard to the required control lines), whereby it is even possible to retrofit existing display modules.

In some embodiments, the background display device may be configured to generate the position markers with partially or completely different wavelengths than the picture-element light signals. Furthermore, in some embodiments, the background display device may be configured to generate the position markers with partially or completely non-visible wavelengths.

For example, the position marker light sources may be configured to emit light in a special wavelength range or spectrum which differs from the emission spectra of the picture-element light sources. As a result, the position marker light sources and the picture-element light sources may be configured in particular as position marker light-emitting diodes or picture-element light-emitting diodes, wherein the emission spectrum or the emission spectra of the position marker light-emitting diodes may differ from the emission spectrum or the emission spectra of the picture-element light-emitting diodes. In particular, the emission spectra of the position marker light sources may thereby be selected to be narrow-band or go beyond the respective end regions of the emission spectra of the picture-element light sources to small and/or large wavelengths. In some embodiments, the position marker light-emitting diodes may be configured to emit light with a higher relative intensity in a specific wavelength range or in such end ranges.

By having such different emission spectra, makes it possible to distinguish within an image whether detected light was emitted from a position marker light source or from an picture-element light source, in order to thereby identify the position marker. For example, the associated camera or an auxiliary camera provided for position determining and being connected to the associated camera, may comprise for this purpose an image sensor having light-sensitive sensor elements, whereby only a part of the sensor elements is sensitive to wavelengths that go beyond one of the mentioned end regions of the emission spectra of the picture-element light sources. If such a sensor element detects light, this light may be identified as being emitted from a position marker light source, so that the location of the corresponding position marker in the image generated by the camera may be determined and therefrom, the position of the associated camera may be determined. Different spectral sensitivities of individual sensor elements may thereby be achieved, for example, by providing the sensor elements with a color filter pattern (Color Filter Array, CFA), which insofar may be part of an image sensor.

For generating the position markers in a non-visible wavelength range, it may be provided in particular, to generate in an ultraviolet and/or an infrared wavelength range. In this case, for example, partial emission in the non-visible wavelength range may be provided for, in that, for example, end regions of an emission spectrum of the position marker light sources extend into the non-visible range. However, the position markers may also be displayed with wavelengths lying completely in a non-visible wavelength range. In particular, a subsequent removal of the position markers in the image generated by the associated camera may therefore be dispensed with, since the non-visible position markers are in any case imperceptible to the human eye.

In order to be able to detect such position markers generated in a non-visible wavelength range, an image sensor of the associated camera and/or at least one auxiliary camera connected to the associated camera may comprise, at least in sections, light-sensitive sensor elements in a non-visible wavelength range. Therefore, for example, an interrelated sensor area may be configured with sensor elements that are sensitive in a non-visible wavelength range and/or individual sensor elements that are sensitive in a non-visible wavelength range and may be arranged between sensor elements that are sensitive to visible light. This may also be achieved, for example, by means of a color filter pattern or a wavelength filter pattern of the sensor elements. An auxiliary camera, which is connected or may be connected to the associated camera or to the main camera provided for recording, may also comprise an image sensor with sensor elements that are sensitive only in a non-visible wavelength range, as will be explained in more detail below.

In some embodiments, the background display device may be configured to generate the position markers only intermittently and/or alternating in time to the picture-element light signals.

By such alternating or intermittent control of the position marker light sources and the picture-element light sources, the determining of the position of the associated camera may in particular take place in frames specifically provided for this purpose, while in other frames only the representation of the virtual background is generated by means of the picture-element light sources. The control of the position marker light sources and the picture-element light sources may be synchronized with the associated camera, so that in the respective frames either only the picture-element light sources, or only the position marker light sources or both the picture-element light sources and the position marker light sources are switched on. In particular, when the position markers are displayed in the visible wavelength range, the number of frames in which the position markers have to be subsequently removed may therefore be reduced. In this case, in individual frames, for example, only the position determination may be carried out, in that only the position marker light sources are switched on, or the position marker light sources may be switched on in individual frames in addition to the picture-element light sources that always generate the representation of the virtual background, so that by an identification of the position markers in these frames, the position of the camera may be determined.

The position marker light sources and the picture-element light sources may, for example, generate light alternating in successive frames, or the position marker light sources may be controlled to generate light after a predetermined number of frames in which only the representation of the virtual background is generated by means of the picture-element light sources, in order to be able to determine the position of the camera in these frames. In particular, the emission duration of the position marker light sources in such an alternating or intermittent operation may be shorter than the emission duration of the picture-element light signals, so that the generation of the position marker is imperceptible to the human eye and in particular, imperceptible to an actor moving in front of the background display device.

As already explained, in some embodiments, the background display device may comprise a plurality of light sources. In some embodiments, the plurality of light sources may for this purpose be configured to selectively generate the plurality of position markers or display a part of the representation of the virtual background.

In such embodiments, there occurs at least no fundamental physical subdivision of the light sources into a first part of light sources which display the representation of the virtual background, and into a second part of light sources which generate the position markers, rather, the light sources of the plurality of light sources may be used to selectively generate the plurality of position markers or display a part of the representation of the virtual background. In particular, each of the light sources of the plurality of light sources may be configured to selectively generate the plurality of position markers or one of the plurality of position markers, or display a part of the representation of the virtual background.

The light sources may generally be configured alike in order to be able to selectively generate either a part of the representation of the virtual background or a position marker or part of a position marker. In particular, all of the plurality of light sources may be configured to emit visible light, so that both the representation of the virtual background and the position markers may be perceptible to the human eye. The position markers may insofar be generated as virtual position markers which appear in the representation of the virtual background. In particular, the position markers may be displayed thereby as respective overlays on the representation of the virtual background.

The light sources configured to selectively generate the position markers or display the representation of the virtual background or a part of the representation of the virtual background may be subdivided, for example, before the recording, in order to generate, for example, a number of position markers that enables a reliable determining of the position of the camera. Consequently, for example, some of the light sources for generating the position markers may be selected before the recording. The position of the position markers on the background display device may selectively also be defined, for example, before a respective recording in the image recording studio, wherein this position in particular remains constant during the recording. It may, for example, be ensured, that there is always a sufficient number of position markers in a field of view of the camera to enable the position of the camera to be determined. For example, before a certain scene is recorded, it may be known, that only some areas or sections of the representation of the virtual background are imaged by the associated camera, so that a sufficient number of position markers may be generated in the corresponding sections of the background display device.

In some embodiments, the background display device may also be configured to generate the plurality of position markers in varying positions on the background display device. Alternatively, or in addition, the background display device may be configured to generate the plurality of position markers with partial or completely visible wavelengths.

The background display device may in particular be configured to generate the plurality of position markers in varying positions on the background display device during the recording. This may in particular make it possible to track to a certain extent the position markers of the associated camera during the recording, so that during the recording the position markers are generated always at positions on the background display device that are in a field of view of the camera and/or the at least one auxiliary camera connected to the associated camera. In this way, with only a limited number of position markers, it may be ensured that always a sufficient number of position markers may be imaged by the associated camera, especially if the positions and/or orientations, in particular rotational or tilted positions of the associated camera, change during the recording, in order to enable the position of the associated camera to be determined on the basis of the imaged position markers and, in particular, their location within the image generated by the associated camera. Thereby, the background display device may in particular be configured to change the position of a position marker on the background display device in dependence on a change in the location of the position marker within the image generated by the associated camera.

Fundamentally, the background display device may be configured to generate at least such a number of imagable position markers that enables a determination of the degrees of freedom for determining the position of the associated camera in space. The determining of the position of the camera in space, may in particular be defined by a three-dimensional coordinate tuple, whereby the position to be determined, if required, may additionally include a three-dimensional tuple of rotational positions of the camera with regard to rotations about three coordinate axes, in particular Cartesian coordinate axes. The determining of the position of the camera in space may thus include in particular six degrees of freedom, so that the background display device may be configured to generate at least a number of imagable position markers, which enables six degrees of freedom to be determined. For this purpose, for example, a density of the position markers generated on the background display device can be chosen to be sufficiently large, in order to ensure that at least the number of position markers necessary for determining the position of the associated camera are always located in a field of view of the camera. Furthermore, as explained above, the background display device may be configured to track at least the number of position markers necessary to determine the degrees of freedom to a field of view of the camera. However, it may also be provided for, that the background display device is configured to always generate a greater number of position markers in a field of view of the camera than the minimum required number of position markers for determining the position of the camera, in order to increase the accuracy of the position determination.

Furthermore, in some embodiments, at least some of the six degrees of freedom mentioned above may be determined in a manner other than being based on the position markers. In particular, a measurement device may be provided on the camera and/or on an auxiliary camera connected to the associated camera, by means of which the rotational and/or tilting positions of the camera may be determined. In such embodiments, degrees of freedom relating to rotational positions of the camera, accordingly, do not have to be determined on the basis of the position markers, so that the number of degrees of freedom in determining the position and, accordingly, the minimum required number of position markers in a field of view of the camera, may be reduced. In particular, the position determination in such embodiments may include three degrees of freedom, which may correspond to three coordinates to be determined in a coordinate system defined with respect to the image recording studio. In addition, as already explained above, in particular a height of the camera, if necessary, may be determined by means of an auxiliary camera oriented vertically upwards, which may include, for example, a depth sensor, so that in some embodiments the number of degrees of freedom in the position determination may be further reduced. The number of position markers at least required to determine the position of the associated camera may thus depend on the specific implementation of the position determination and/or, if necessary, in addition to the position markers, information used in the position determination.

The number of degrees of freedom that need to be determined based on the position markers, in order to be able to carry out the position determination may, in some embodiments, also be limited in a mechanical way, for example, if the camera is not moveable (e.g., pivotable) in certain directions.

While the background display device may generate the position markers with visible wavelengths, a detection of the position markers may be carried out, in particular by means of the associated camera, so that the position markers may be identified in an image of the background display device generated anyway by the associated camera during the recording. Any other cameras are consequently not required, rather, the position of the associated camera may be determined from data obtained by the associated camera itself.

In such embodiments, the position markers may in fact be recorded by the associated camera. However, the position markers do not necessarily have to be a part of the image recording data that are to be stored as desired image information in a predetermined format as a recording of a scene or, for example, that are to be broadcast as a live transmission of the recording.

In particular, such a background display device, which is configured to generate the position markers in a varying position, may be used in combination with an associated camera which comprises an image sensor having a so-called over-scan area. Such an image sensor may comprise a plurality of light-sensitive sensor elements, whereby only an inner-lying part of the sensor elements is provided to generate an image of the representation of the virtual background or the scene to be recorded in a predetermined format or to generate corresponding image recording data. However, outside this inner-lying part, such a sensor may comprise further light-sensitive sensor elements, whereby image signals generated by these sensor elements are not further processed as part of the image in the intended format. In contrast, the image signals from these sensor elements located outside or in an over-scan area, may be used to image the position markers and, in particular, to determine the position of the camera in space based on their location in the image generated by the camera by means of the sensor elements located outside. Thereby, the position markers may always be variably positioned on the background display device such that the position markers may be detected by sensor elements in the over-scan area, but not by sensor elements in the inner-lying area of the image sensor. As a result, the position of the associated camera may be determined by means of position markers generated in visible wavelengths, in particular as overlays of the representation of the virtual background, without the recording of the scene or the image of the scene generated by the camera in the intended format being impaired by the position markers generated in visible wavelengths. Therefore, subsequent removal of the position markers from such an image is also not necessary.

Furthermore, in some embodiments, the background display device may be configured to generate the position markers as at least one predetermined marking pattern.

For example, the position markers may be generated as predetermined geometric patterns and/or as color patterns, in order to enable a simple and exact identification of the imaged position markers in an image of the background display device generated by the camera and/or an auxiliary camera connected to the camera. In particular, this identification may take place using software-based image analysis methods or image recognition methods. For example, it may be provided for, to generate the position markers as concentric circles, as crosses, as stars or as polygons e.g., as triangles, squares or hexagons. The at least one marking pattern may be selected, in particular, also in dependence on the represented or to be represented virtual background, in order to display the position markers, for example, in a shape and/or color that clearly differs from the surroundings and enables a clear identification of the position marker in an image.

In particular, a set of a plurality of predetermined marking patterns may be stored, from which one or more may be selected for displaying. For example, different position markers may be displayed with different marking patterns, so that a respective imaged position marker may be clearly identified or assigned in the image generated by the associated camera and/or an auxiliary camera connected to the associated camera. Furthermore, for example, position markers in a particular section of the background display device may be generated as a first predetermined marking pattern from the set of a plurality of predetermined marking patterns, while position markers in another section of the background display device may be generated as a second predetermined marking pattern from the set of a plurality of predetermined marking patterns. In this way, for example, a field of view of the associated camera may be deduced from the respective imaged position markers and/or an alignment of the associated camera may be determined, if necessary. Fundamentally, however, it may also be provided for, that all position markers are generated and/or may be generated with the same predetermined marking pattern during a recording, wherein the predetermined marking pattern may be selected from the set of a plurality of predetermined marking patterns. To store the set of a plurality of predetermined marking patterns, the background display device may comprise a memory, in particular a non-volatile memory, for example a semiconductor memory.

The marking patterns may also be monochrome or multicolored, wherein generation in the visible and/or in a non-visible wavelength range is possible. Visible marking patterns may be recorded and corrected relatively easily in the image data, for which purpose, for example, an interpolation based on edge detection may be provided. Fundamentally, marking patterns of any shape and/or color or generated in any wavelength may be provided, which, however, have to be identifiable by image recognition.

The invention also relates to a background display system for a virtual image recording studio, which comprises a background display device of the type disclosed herein and a control device which is configured to adapt the representation of the virtual background in dependence on a determined position of the associated camera. Embodiments of the background display device explained in association with this background display system, may also be provided for the separately claimed background display device.

In particular, the control device may be configured to adapt the representation of the virtual background in dependence on the position of the camera in such a way, that the image of the representation of the virtual background generated by the associated camera corresponds to or approximates an image that would be expected by a recording of a real background corresponding to the virtual background by means of the associated camera. For example, for this purpose, the control device may move objects or background regions of the virtual background in the representation generated by the background display device in dependence on the position of the associated camera, in order to take into account the distance between the camera and the object in question in a real background corresponding to the virtual background and a field of view of the camera that also changes as a result of a change in position of the camera. Furthermore, the control device may be configured, for example, to adapt the brightness of individual areas of the representation of the virtual background in dependence on the position of the camera, in order to adapt for example a shadow gradient in the virtual background in dependence on the position of the camera.

The control device may comprise, for example, a microprocessor, a CPU (Central Processing Unit) and/or a GPU (Graphics Processing Unit). Furthermore, the control device may comprise in particular a Game engine or draw on a Game engine for adapting and/or generating the representation of the virtual background. Such a Game engine is often used, particularly in computer games, as a software component to generate a background or an environment in dependence on a player's position in a virtual world. In particular, it may be provided for, that the Game engine may access one or more databases in order to generate the respective environment, wherein, for example, information on particular classes of objects may be stored in the respective databases. As an analogy to this, the control device may use for this purpose such a Game engine to adapt and/or generate the representation of the virtual background in dependence on the determined position of the associated camera, instead of the position of a player in a computer game. For this purpose, the control device may be connected, for example, to a memory, in particular a non-volatile memory, for example a semiconductor memory, in which databases that may be read out by the Game engine may be stored. The adapting of the representation of the virtual background by means of the Game engine may take place particularly in real time.

In some embodiments, the control device may be an integral part of the background display device. It is also possible for the control device to be configured as a separate unit, wherein for communication between the control device and the background display device, for example, a wired and/or wireless connection may be provided. For this purpose, the control device and the background display device may, for example, have respective wireless modules.

In some embodiments, the background display system may comprise a position-determining device which is configured to determine the spatial position of the associated camera in dependence on camera data which represent the locations of the plurality of position markers within an image of the background display device. The position-determining device may in particular be integrated into the control device or form a separate unit. In particular, the position-determining device may be integrated into the control device and may comprise a software module that may be executed by the control device and through whose execution, the position of the associated camera may be determined in dependence on the camera data. If the position-determining device is not integrated into the control device of the background display system, but rather is configured separately therefrom, the position-determining device, in some embodiments, may be integrated into the associated camera or into at least one auxiliary camera, as will be explained below.

The position-determining device may fundamentally comprise a microprocessor, a CPU and/or a GPU, both for when it is configured as a separate unit and for when it is integrated into the control device. The position-determining device may generate corresponding position data in dependence on the camera data or in dependence on the locations of the plurality of position markers or the imaged position markers within an image of the background display device, which may be used by the control device for adapting the representation of the virtual Background. If the position-determining device is not integrated into the control device, the position data generated by the position-determining device may be transmitted to the control device.

In order to be able to receive and evaluate the camera data, the position-determining device may comprise an interface for receiving camera data from the associated camera and/or at least one auxiliary camera—provided in some embodiments—connected to the associated camera. If the position-determining device is not integrated in the associated camera or the auxiliary camera, the associated camera or the auxiliary camera may be wired and/or wirelessly connected to the interface of the position-determining device, in order to be able to transmit the camera data to the position-determining device. A wireless connection may be established, for example, via a Wi-Fi/WLAN connection, a Bluetooth connection and/or a mobile funk connection, for which purpose the camera and the position-determining device may be configured with appropriate funk modules.

During a recording, an optical image of the background display device may be generated by means of the associated camera and/or at least one auxiliary camera connected to the associated camera, wherein the representation of the virtual background is imaged in the image generated by the associated camera. In particular, when the position markers are displayed in the visible wavelength range, the optically detectable position markers may also be imaged by the associated camera. For generating the position markers in a non-visible wavelength range, however, it may for example be provided, to image the position markers by means of at least one auxiliary camera connected to the associated camera, which is sensitive in the non-visible wavelength range. In this case, the position markers are consequently identifiable in the image of the background display device generated by the at least one auxiliary camera, while the position markers may not be imaged, for example, by the associated camera. The optical image generated by the associated camera and/or the auxiliary camera is also converted into image data, for example, by means of an image sensor and readout electronics, which represent the image generated by the respective camera and form an image data set corresponding to the image. Within such an image, the position markers, which are detectable by the respective camera, have a specific location which may be depicted in the image by coordinates, in particular two-dimensional coordinates. These locations of the position markers may be determined, for example, by image analysis methods.

The position-determining device may thereby be configured to determine the position of the camera in space, from the relative and/or absolute locations of the position markers within the image using, for example, a triangulation method. In particular, the position-determining device may thereby determine the position of the camera in three-dimensions or as a tuple of an x-, y- and z-coordinate. Furthermore, the position-determining device may be configured to determine the position of the camera as an intersection of straight lines which run through the respective position markers and the location of the corresponding imaged position marker in the image, as will be explained in more detail below.

As an alternative to integrating the position-determining device into the control device, it may also be provided that when the position-determining device is configured as a separate unit, then the position-determining device is integrated in the associated camera or in at least one auxiliary camera connected to the associated camera. In this respect, the respective camera itself may be configured to determine the position of the camera relative to the background display device based on the locations of the position markers within an image generated by the camera. The camera may be configured to transmit the position data determined by the position-determining device to the control device of the background display device. The camera data, which represent the locations of the position markers within the image generated by the camera, may consequently, in such embodiments, be processed in the camera itself, wherein the position determined therefrom, may be made available to the control device of the background display device. However, this does not preclude that the data transmitted by the camera is further processed within the control device or some other unit of the background display device, in order to transform the position transmitted by the camera, for example, into a designated coordinate system. The integration of a position-determining device in a camera, is explained in more detail below.

In some embodiments, at least two position markers may be provided. In particular, however, more than two, in particular three, four, five, six, seven, eight, ten, twenty or fifty position markers may be provided. A higher number of position markers may enable the position of the camera to be determined more easily and/or more precisely. The number of position markers may, however, be selected to be relatively small, especially when being displayed in the visible wavelength range, in order to minimize the effort of a subsequent removal of the position markers or any disturbances, from the image of the representation of the virtual background. In contrast, by a higher or an adequate number of position markers, it may be achieved, that there is always a sufficient number of position markers in the field of view of the associated camera or at least one auxiliary camera connected to the associated camera, in order to enable a reliable determining of the position of the associated camera.

In some embodiments, the camera data may comprise coordinates of the locations of the plurality of position markers in an image of the background display device generated by the associated camera and/or by at least one auxiliary camera. Alternatively, or in addition, in some embodiments, the camera data may comprise image data or an image data set of an image of the background display device generated by the associated camera and/or by at least one auxiliary camera connected to the associated camera, wherein the position-determining device may be configured to determine the locations of the plurality of position markers within the image.

For example, the locations of the plurality of position markers within the image may already be determined by the associated camera or at least one auxiliary camera and may be made available to the position-determining device, so that these coordinates, for example as a respective y-z-coordinate tuple, may be used by the position-determining device to directly determine the position. Alternatively, the image data of the image or a data set representing the image may be transmitted to the position-determining device, wherein the position-determining device may be configured to determine the locations of the position markers and/or their coordinates using an image analysis method.

In order to be able to determine the locations of the position markers within the image, fundamentally—within the camera and/or by the position-determining device—for example, a pattern recognition may take place, by means of which the position markers may be identified, and their respective location may be determined. In particular, when generating the position marker in a non-visible wavelength range or with an emission spectrum that differs from the emission spectra of the picture-element light sources provided for generating the representation of the virtual background, the coordinates of the locations of the imaged position markers however, may, for example, also be directly determined from the coordinates of signal-emitting sensor elements of an image sensor. For this purpose, in particular at least some of the sensor elements may be sensitive only in the wavelength range in which the position markers are generated and/or that differs from the emission spectrum of the picture-element light sources, so that a signal from such a sensor element may only be generated by a position marker. However, also in this case, additionally a pattern recognition may take place in order to prevent accidental or incorrect identification of position markers in the image.

Alternatively, or in addition to the locations of the position markers within an image generated by the associated camera or at least one auxiliary camera, in some embodiments, the camera data may also include information about distances between the associated camera and/or the at least one auxiliary camera on the one hand and respective position markers on the other hand. For example, the camera and/or the auxiliary camera in this case may comprise or be coupled to a depth sensor which may work, for example, according to the principle of determining the time of flight or the phase shift. The position of the camera may thereby be determined by the position-determining device, for example, as an intersection of several surfaces of spheres, the center points of which correspond to the respective position markers and their radii correspond to the distances between the camera and the position markers.

In addition, in some embodiments, the camera data may include information about distances between the camera and/or at least one auxiliary camera and other elements of the virtual image recording studio. In particular, the camera data may include information about a vertical distance between the camera and/or the auxiliary camera and a ceiling or an upper boundary and/or a floor or a lower boundary of the virtual image recording studio, whereby from this information a height of the associated camera in a coordinate system defined with respect to the virtual image recording studio may be determined. Such measurements for determining a vertical distance of the associated camera and/or the auxiliary camera may also be carried out by a depth sensor operating as described above. For example, a height determined using such measurements may be determined as a coordinate of the position of the associated camera in a three-dimensional coordinate system, while the other two coordinates of the three-dimensional position of the camera may be determined based on the locations of the position markers in an image of the associated camera and/or the at least one auxiliary camera. Alternatively, the height of the camera determined by a distance measurement may be used as a data point, wherein the coordinates of the position of the associated camera may be determined using further data points, in particular the locations of the imaged position markers.

Furthermore, it may be provided for, that at least one auxiliary camera is connected to the associated camera, the field of view of which differs from a field of view of the associated camera. Such an auxiliary camera may serve, for example, to image position markers that are not located in the field of view of the associated camera, in order to be able to increase the number of position markers used for determining the position. Thus, position markers imaged by the associated camera and position markers different from these position markers, imaged by means of an auxiliary camera, may thus be used for determining the position.

In some embodiments, the position-determining device may be configured to calculate the position of the camera from the locations of the plurality of position markers within the image and/or to look it up in a look-up table. For this purpose, the position-determining device may be connected, for example, to a memory, in particular a semiconductor memory, in which are stored calculation rules for calculating the position of the camera in dependence on the locations of the plurality of position markers within the image and/or one or more look-up tables for looking up the position of the associated camera in dependence on the locations of the plurality of position markers within the image. For example, positions of the associated camera in dependence on the locations of the position markers within the image that are stored in a look-up table, may be determined by a calibration preceding the recording. The position-determining device may be configured to determine an approximate position of the associated camera for combinations of locations of position markers for which there is no position of the associated camera that can be taken from the look-up table, by interpolation and/or using the respective nearest locations of position markers to which a position of the associated camera is assigned.

With a view to calculating the position of the associated camera, in particular triangulation methods or the intersection of straight lines starting from the position markers come into consideration. For example, such geometrical considerations in the form of systems of equations, to be solved and/or at least partially solved, may be stored as calculation rules. The position-determining device may thereby be configured to solve such systems of equations in one or more calculation steps and to determine the position of the associated camera based on the stored calculation rules. This is explained in more detail below.

In some embodiments, the position-determining device may be configured to determine from the locations of the plurality of position markers within the image, a respective direction in which the plurality of position markers generated on the background display device are arranged relative to the associated camera. Such directions may correspond to connecting lines in space between the respective position marker and the camera. These directions may in particular also be determined within the associated camera and/or at least one auxiliary camera connected to the associated camera or by a position-determining device integrated in the respective camera and, for example, are transmitted as part of the camera data to a position-determining device of the background display device. In this respect, fundamentally, different steps for determining the position of the associated camera may be carried out in some embodiments by different units. In particular, the locations of the position markers within the image generated by the associated camera and/or at least one auxiliary camera may be determined within the camera and transmitted as part of the camera data to the position-determining device, which is directly connected to the control device of the background display system or may be integrated in the control device. Furthermore, the said directions in which the plurality of position markers generated on the background display device are arranged relative to the associated camera may also be determined within the respective camera and transmitted to a position-determining device external to the camera, wherein the position of the associated camera in space may be determined by the external position-determining device based on the transmitted directions. In addition, it is also possible for the position of the associated camera to be completely determined by a position-determining device integrated in the assigned and/or the at least one auxiliary camera.

A direction in which a respective position marker is located relative to the associated camera may be determined for example by comparing a center point ray impinging on the center of an image sensor of the associated camera or an auxiliary camera with a center point ray emanating from the respective position marker, which impinges the image sensor at the coordinates of the imaged position marker. Thereby, a center point of the optical system formed by the camera may be determined or defined, at which point these center point rays meet. For example, the associated camera or an auxiliary camera connected to the associated camera may comprise optical elements, for example one or more lenses for focusing light on the image sensor, wherein respective center point rays entering through the center point of this optical system impinge on the image sensor in a straight line. Furthermore, the associated camera or the auxiliary camera may, for example, comprise a light-inlet opening in particular a diaphragm aperture or iris diaphragm aperture, through which light enters and impinges on the image sensor in a straight line and which may form a center point of the optical system of the camera at which rays or center point rays impinging the image sensor intersect. By knowing the locations of the position markers or their coordinates in a plane defined by the image sensor, and by knowing the distance of the center point of the optical system as the intersection point of the center point rays from the image sensor, three-dimensional vectors may consequently be determined which indicate the direction in which the position markers in question are located relative to the center point of the optical system. If the said directions are determined by a position-determining device external to the associated camera or auxiliary camera, the information or parameters of the respective camera necessary for this determination, in particular the distance between the image sensor and the center point of the optical system, may be written into a memory connected to the position-determining device prior to recording. As a result, the position-determining device or the background display system may be used flexibly with different associated cameras or camera systems having an associated camera and an auxiliary camera. Based on several directions in which there are located a plurality of position markers relative to the associated camera, conclusions may be drawn about the position of the camera in space, or this position may be determined. The position of the camera may for example be defined as the center point position of the optical system.

In some embodiments, the position-determining device may be configured to take into consideration information about an optical system of the camera and based on its image may determine the position of the associated camera in space. For example, this information from the associated camera and/or at least one auxiliary camera connected to the associated camera may be transmitted to the position-determining device as part of the camera data, wherein the transmission may take place in particular in real time. Furthermore, information about the optical system of the respective camera may be entered by a user before and/or during a recording by means of an input device of the background display device. A position-determining device comprised by the associated camera and/or an auxiliary camera connected to the associated camera may be configured to receive in real time information about the optical system of the respective camera and/or to read it from a memory of the camera.

In particular, the information about the optical system of the camera may include information about components of the optical system, in particular about a lens connected to the camera, and/or settings of the optical system or of a lens, which may influence the location of an imaged position marker and/or a beam path through the optical system. For example, settings made to the main camera for a focus position, a focal length, a zoom factor, or a diaphragm aperture (iris diaphragm aperture) may be taken into account when determining the position of the associated camera. Such settings may influence in particular a frustum of the camera, so that the section of the three-dimensional virtual image recording studio imaged by the camera may depend on both the position of the camera in space and the optical system of the camera and its settings. By taking into account such settings of the optical system, effects caused thereby and which influence the image and thus the locations of the position markers in the image may also be taken into account by the position-determining device, in order to ultimately obtain a dependency relationship between the locations of the position markers in the image and the position of the camera, and to be able to determine the position of the associated camera in space on the basis of this dependency relationship. In particular, the directions in which the position markers are located relative to the camera may be determined by the position-determining device considering such information about the optical system.

The respective directions may be determined in particular in a coordinate system defined with respect to the image sensor of the camera, whose origin may lie, for example, at the center point of the image sensor. Two coordinate axes may, for example, run along a plane defined by the image sensor, while the third coordinate axis may run through the center point of the image sensor and the center point of the optical system. If necessary, directions determined in such a coordinate system may be transformed into a coordinate system defined with respect to the background display device or the image recording studio, in order to thereupon, be able to determine the position of the camera in this coordinate system.

In some embodiments, the position-determining device may be further configured to determine the position of the associated camera by triangulation. In particular, the distance between at least two position markers on the background display device may be known as the base length in this case, so that the position of the associated camera in space may be determined on the basis of previously determined directions in which the relevant position markers are arranged relative to the associated camera. The precision of determining the position may be increased in particular by using more than two position markers, in particular three, four, five, six, seven, eight or more than eight position markers, and their distances to each other to determine the position of the camera. As an alternative to determining directions in which the position markers are arranged relative to the camera, the position of the camera may also be determined by using distances between the camera and the position markers determined, for example, by means of a depth sensor and included in the camera data, as well as the known distances between the position markers in a triangulation process.

In some embodiments, the position-determining device may be configured to determine respective directions in which the plurality of position markers are arranged relative to the associated camera from the locations of the plurality of position markers within the image, wherein the position-determining device may be configured to determine the position of the associated camera as the intersection of straight lines emanating from the plurality of position markers in the respective directions.

In particular, the position-determining device may be configured to determine the position of the camera in three dimensions in a coordinate system defined with respect to the image recording studio and/or the background display device. For example, the origin of such a coordinate system may lie in the center of a display surface, for example the center of an LED-wall of the background display device.

With regard to the image recording studio and/or the background display device, the position markers may be arranged on the background display device at predetermined positions with known coordinates. Here, the positions of the plurality of position markers may be known or specifiable, in particular as three-dimensional coordinates. By determining the directions in which the position markers are arranged relative to the associated camera, corresponding straight lines may be formed starting from the respective position markers, which intersect at the position of the camera or at a center point of the optical system of the camera, so that the position of the camera may be determined as the intersection point of the straight lines.

In particular, due to measurement inaccuracies, for example with regard to the locations of the position markers within the image, the coordinates of the position markers and/or an expansion of the position markers or the imaged position markers, straight lines defined by the determined directions may however possibly run skewed to one another. The position-determining device may therefore be configured to determine the point of intersection of the straight lines as the point in space at which the straight lines have the smallest distance to one another. Particularly in the case of determining the position by means of more than two position markers, the position of the camera or a point of least distance between the lines may be determined using regression methods, for which the position-determining device may be configured, for example, to perform linear regression methods and/or the method of least squares.

Further, in some embodiments, the camera data may comprise an orientation of the associated camera, in particular a rotational position and/or a tilt position of the associated camera, wherein the position-determining device may be configured to take the into account the orientation when determining the position of the associated camera. Such transmission of rotational positions and/or tilted positions of the associated camera, as already explained above, may in particular reduce the number of degrees of freedom of determining the position of the associated camera, in order to be able to determine the position precisely, for example as a three-dimensional coordinate tuple in a coordinate system defined with respect to the image recording studio, on the basis of the imaged position markers.

In particular, the position-determining device may be configured using the locations of the position markers within the image of the background display device, to correct defined directions in which the position markers are located relative to the camera, taking into account any rotational positions or tilted positions of the camera. Directions determined on the basis of the locations of the position markers within the image, may in particular be determined in a coordinate system defined with respect to the associated camera or an auxiliary camera connected to the associated camera and/or a respective image sensor, whereby this coordinate system may differ from a coordinate system defined with respect to the image recording studio or the background display device, in particular as a result of rotations of the camera. However, in order to be able to determine the position of the camera in such a coordinate system defined with respect to the image recording studio or the background display device or independent of rotations of the camera in a coordinate system always defined the same, the directions determined as vectors may be transformed into the intended coordinate system, for example, by means of a rotation matrix. For example, the determined directions may be transferred into a coordinate system in which the optical axis of the associated camera or the auxiliary camera is aligned perpendicular to a display surface of the background display device, in order to determine the position of the camera in space or in this coordinate system on the basis of the directions.

In order to be able to determine the orientation of the respective camera and, in particular, rotations about the Cartesian coordinate axes, and to be able to transmit these to the position-determining device as part of the camera data, the associated camera or at least an auxiliary camera connected to the associated camera may, in particular, comprise a measurement device. Such a measurement device may for example comprise or be connected to an incremental rotary encoder, in order to be able to determine rotations of the camera. Alternatively, or additionally, the measurement device may be connected to static acceleration sensors and/or comprise such sensors, wherein the measurement device and/or the position-determining device may be configured to determine an orientation of the camera based on the signals of the static acceleration sensors.

As explained above, the position-determining device may be particularly configured to solve the subsequent systems of equations and/or equations from the preceding geometric considerations, in order to determine the position of the associated camera.

In some embodiments, the control device may be configured to change positions of the plurality of position markers on the background display device in dependence on the camera data. In particular, the control device may be configured to change the positions of the plurality of position markers on the background display device during the recording in dependence on the camera data.

By changing the positions of the position markers by means of the control device, the position markers may be represented moving along in particular the background display device during a recording. Since such movements may take place in dependence on the camera data representing locations of the plurality of position markers within the image, the change of the positions of the plurality of position markers may in particular be carried out in such a way, that the plurality of position markers is always located within a field of view of the respective camera, the image of which is used to determine the position of the associated camera in space. As such, the control device may be configured in particular to compare locations of position markers within the image in temporally successive images and, in dependence on a change in these locations, to shift to some extent the position markers or at least one position marker on the background display device, so that the position marker or markers track the field of view. If, for example, it is detected that a respective position marker within the image is imaged further out with respect to the field of view in a subsequent image than in a preceding image, the position of the position marker on the background display device may be changed in such a way that this change in location is compensated for in a subsequent image. Thus, the position marker may be moved in accordance with the movement of the camera. In particular, the location of the position marker within the image may change due to a change in the position and/or orientation of the imaging camera and/or a change in a lens setting affecting the field of view of the imaging camera, for example a changed zoom factor. In this context, the control device may be configured to change the positions of the position markers in real time in dependence on the camera data, in order to be able to react in real time to such changes in the field of view of the associated camera.

In particular, a background display system having a control means configured to change the positions of the plurality of position markers on the background display device in dependence on the camera data, may be used in combination with an associated camera comprising an image sensor with an over-scan area. As explained above, such an image sensor may be configured to generate an image in visible light in a predetermined format or as a corresponding image data set but comprises a plurality of additional light-sensitive sensor elements which are arranged in an over-scan area and do not contribute to the image in the predetermined format. This over-scan area may in particular lie adjacent to a central section of the image sensor, whereby the image of the scene to be recorded, as well as the representation of the virtual background in the predetermined format, is generated by means of sensor elements arranged in this central section.

Fundamentally, such an over-scan area may make it possible to flexibly generate images in a respective intended format by means of the associated camera and/or to observe outer lying areas of the scene with an electronic camera viewfinder, whereby the signals of the additional sensor elements in particular may not be read out in order to reduce the amount of data to be processed and to record only the data required for the respective format. However, the image data generated by the additional sensor elements may be used to identify a position marker imaged in the over-scan area and to determine the position of the associated camera in space based on the image data generated by the sensor elements arranged in the over-scan area. By the fact that the control device of the background display system may thereby be configured to change the positions of the position markers on the background display device, in particular it may be achieved that the position markers may always be detected during the recording, for example also after or during a change in the position of the camera, by sensor elements arranged in the over-scan area, but not in the central area for generating the image in the intended format. In this way, a determining of the position of the associated camera may be made based on data generated by the associated camera without the images in the intended format being impaired by the generated position markers or without the position markers having to be subsequently removed from the images or the corresponding image data.

In particular, the position markers that may be generated with variable position, thus may also be generated and displayed in visible wavelengths without affecting the recording of the scene or the images generated by the associated camera in the intended format. In doing so, the background display device may in particular comprise a plurality of light sources, wherein the light sources are configured to selectively display the representation of the virtual background or to generate the plurality of position markers. The plurality of light sources may further be arranged in a regular grid. Such a configuration of the background display device may thereby enable the position markers to be represented in the visible wavelength range as an overlay of the representation of the virtual background and to be tracked to the field of view of the associated camera, in particular an over-scan area of an image sensor of the associated camera, in order to be able to achieve a determination of the position of the camera. If a respective light source is no longer required or used for generating the position marker due to a changed position of a position marker on the background display device, this light source may be directly involved in the representation of the virtual background. In particular, the position markers may be represented as at least one predetermined marker pattern, in order to enable easy identification in the image generated by the associated camera, in particular in an over-scan area.

Ultimately, in this way, the determining of the position of the associated camera may be carried out with minimal constructional effort and without the need for subsequent removal of the position markers from the images generated by the associated camera, since the position markers only need to be represented moving on the background display device during a recording. Due to the possibility of representing the position markers in the visible wavelength range, basically a conventional background display device may be controlled, in addition to the representation of the virtual background, to display the position markers with variable positions as an overlay on the representation of the virtual background. Furthermore, communication between the control device and the associated camera is required in order to be able to change the positions of the position markers in dependence on the camera data. This may be achieved, for example, by means of a wired and/or wireless connection between the associated camera and the control device.

In some embodiments, the control device may be further configured to transmit the changed positions of the plurality of position markers to the position-determining device. This may enable the position-determining device to use the changed positions of the plurality of position markers in the next determining of the position of the associated camera, so that the position-determining device may always take into consideration the current positions of the plurality of position markers in determining the position of the associated camera. In particular, the position-determining device may be configured, for example, to determine the position of the associated camera by way of intersecting respective straight lines that start out from the changed or current positions of the position markers along directions previously determined based on of the locations of the position markers in the image generated by the associated camera. To this end, the position-determining device may be configured in particular to solve subsequent systems of equations from such geometric considerations. Furthermore, the position-determining device may determine the position of the associated camera, for example, by triangulation methods and/or from distances between the camera and the position markers transmitted by the camera as part of the camera data, taking into consideration the changed position of the position markers.

In some embodiments, the control device may be connected to a memory in which at least one model for generating the representation of the virtual background may be stored. In particular, a three-dimensional model of the virtual background may be stored in the memory. The memory may be a non-volatile memory and, in particular, a semiconductor memory, in which the at least one model may be permanently stored, whereby however it may be possible to overwrite the model. Furthermore, the memory may be integrated into the control device or configured as a separate unit connected to and/or communicating with the control device.

For example, such a model may comprise position information and image information for a respective background region, wherein the control device may be configured to generate the representation of the virtual background based on the image information and to adapt it taking into consideration the position information and depending on the position of the associated camera. The position information may in particular comprise distances of objects of the virtual background or of respective background regions to the background display device, in order to be able to take these distances into account when adapting the representation of the virtual background in dependence on the position of the associated camera. Further, the position information may comprise three-dimensional coordinates of the background regions in a coordinate system defined with respect to the image recording studio and/or the background display device. Furthermore, the stored model may comprise, for example, information regarding the brightness of respective background regions.

In particular, the control device may comprise or draw on a game engine in order to adapt the representation of the virtual background. In doing so, the game engine may, in particular taking into account the determined position of the associated camera, draw on one or more databases which contain the position information, and which may be stored in the memory. The position of the camera may thus represent the central parameter for controlling the background display device, on the basis of which the representation of the virtual background is adapted by means of the control device.

The control device may, in some embodiments, be configured to calculate an adaptation of the representation in dependence on the position of the associated camera. Alternatively, or additionally, in some embodiments, the control device may be connected to a memory in which various models for generating the representation of the virtual background in dependence on the position of the associated camera are stored. For example, different positions of the associated camera may be assigned to respective models, wherein the control device may, for example, read out the respective model from a look-up table in dependence of the position of the associated camera.

In particular, the control device may be configured to consider positions of objects or background regions in a real background corresponding to the virtual background when adapting the representation. In this way, the control device may in particular adapt the representation of the virtual background in such a way that the image of the representation of the virtual background generated or which may be generated by the associated camera, corresponds to or approximates an image that would be expected if a real, in particular three-dimensional, background corresponding to the virtual background were imaged.

In some embodiments, the control device may be configured to take into account an orientation of the camera when adapting the representation of the virtual background. In particular, the control device may be configured to take into account the aforementioned orientation of the camera transmitted as part of the camera data. For example, the control device may determine a field of view of the camera on the basis of the orientation of the camera and the position determined by the position-determining device and adapt the representation in such a way that, for a real background corresponding to the virtual background objects located in the field of view of the camera are represented at a respective position that enables imaging in the position expected when imaging the real background.

In the course of adapting the representation, the control device may be configured in particular to shift and/or rotate objects or background regions of the virtual background in the representation of the virtual background in dependence on the position of the camera. In particular, positions of objects within the image generated by the associated camera that change in dependence on the distance of the camera from an object and the orientation of the camera, may be corrected in this way.

Furthermore, the control device may be configured to adapt a size of objects of the virtual background and/or a shape of objects of the virtual background in the representation of the virtual background in dependence on the position of the camera. The control device may also be configured to adapt a brightness of objects and/or of background regions of the virtual background in the representation of the virtual background in dependence on the position of the camera. In particular, the brightness may moreover be adapted taking into account the orientation of the camera, in order to, for example, be able to correctly represent or image shadows that change as a result of a rotation of the camera.

The invention further relates to a camera system, in particular for use with a background display system of the type disclosed herein, having a main camera and an auxiliary camera, wherein the main camera comprises an image sensor having a plurality of main sensor elements that are sensitive to light for a number of different visible colors, and wherein the auxiliary camera is detachable, however, in a defined position to the main camera is attachable, wherein the auxiliary camera comprises an image sensor having a plurality of auxiliary sensor elements which are sensitive to light of non-visible wavelengths. Each of the main camera and the auxiliary camera may in particular comprise a respective readout circuit which is configured, based on image-element signals from the sensor elements, to generate image data sets which correspond to a respective image of a field of view of the main camera or of the auxiliary camera, or which represent such an image.

In that, non-visible wavelengths are detectable at the image sensor of the auxiliary camera or by means of the auxiliary sensor elements, in particular the above-described position markers displayed by a background display device may be generated in a non-visible wavelength range and may be detected by the auxiliary camera, while the main camera may be provided to image the representation of the virtual background or the scene to be recorded in the visible wavelength range. In this respect, the main camera may correspond to the associated camera explained above. The auxiliary camera, on the other hand, may enable the imaging of position markers generated in a non-visible wavelength range, for example an infrared and/or an ultraviolet wavelength range, and to determine the position of the main camera based on their locations in the image generated by the auxiliary camera. By means of the image generated by the auxiliary camera or based on the image data set generated by the image sensor of the auxiliary camera, for example, the position of the auxiliary camera in space may firstly be determined, in particular, as explained above, in association with the position-determining device. In that the auxiliary camera is thereby provided at the main camera in a defined position, the position of the auxiliary camera determined on the basis of the position markers may be used to directly deduce the position of the main camera, so that the position of the main camera may be considered in the control of a background display device as described above. Alternatively, to determining the position of the auxiliary camera, also based on the defined position of the auxiliary camera relative to the main camera, the position of the main camera may be determined based on the image generated by the auxiliary camera by means of a parallax correction. For this purpose, the locations of the position markers in the image generated by the auxiliary camera may, for example, first be transferred into the respective locations that would be expected in an image at the position of the main camera, so that the position of the main camera may then be determined on the basis of these parallax-corrected locations.

In this respect, this camera system solves the task of creating simpler, faster and more cost-effective ways of determining a position of an associated camera for recordings in a virtual image recording studio, in that the associated camera in the form of the auxiliary camera is provided, as it were, with an add-on, which enables the detection of non-visible light. As a result, the position of the main camera may be easily determined from the image generated by the auxiliary camera without requiring any adjustments to the main camera, its optical elements and/or its image sensor. By arranging the auxiliary camera in a defined position relative to the main camera, the fundamental concept of determining the position of the main camera based on data obtained at the position of the main camera or the associated camera, is further pursued. While fundamentally, it is also possible, as explained above, to determine the position of the associated camera based on an image of visible wavelengths generated by the associated camera, the image of position markers displayed in non-visible wavelengths generated by the auxiliary camera offers the possibility of creating, by means of the main camera, a recording of a scene and the representation of the virtual background, which is not impaired in any way by the generation of the position markers. In particular, no additional steps are required regarding subsequent image processing to remove the position markers from the image generated by the main camera. The camera system thus offers an alternative for determining the position, by which in particular time-consuming post-processing steps and/or possible adjustments to be made to the main camera may be dispensed with.

In order to connect the auxiliary camera to the main camera at a defined position, the auxiliary camera may be attached to the main camera, for example, by means of a rotary connection, a plug-in connection and/or a rotary plug-in connection and in particular, attached to the top of the main camera. Reaching the defined position may thereby be perceptible, for example, haptically and/or acoustically, for example by a clicking sound and/or a snap-in, in order to ensure correct positioning of the auxiliary camera relative to the main camera. Attaching the auxiliary camera to the main camera at a defined position may include, for example, creating a form-fit (e.g., inserting a holder of the auxiliary camera into a matched receptacle of the main camera), whereby a subsequent fixing of the form-fit may take place (e.g., by means of a screw or a clamping lever).

In some embodiments, it may be provided for, that only the image sensor of the auxiliary camera, but not the image sensor of the main camera, is light-sensitive to non-visible wavelengths. In particular, this may allow the position markers to be detectable only by the auxiliary camera, while the recording produced by the main camera may be completely unaffected by the display of the position markers on the background display device, and its image sensor may be optimized for the detection of visible light.

In some embodiments, the main camera and the auxiliary camera may further comprise at least partially coinciding fields of view in the mounted state. The orientation of the auxiliary camera may thus at least partially coincide with the orientation of the main camera in the mounted state, wherein in particular respective optical axes of the main camera and the auxiliary camera may extend at a predetermined angle to each other, parallel to each other, or be coincident. Furthermore, the image sensor of the auxiliary camera may in particular comprise at least some auxiliary sensor elements, which are at least, also or exclusively light-sensitive in the visible wavelength range. As a result, by comparing the images of the background display device generated by the auxiliary camera with those generated by the main camera, for example, any differences with regard to the orientation of the auxiliary camera and the orientation of the main camera or the respective fields of view may be determined and may be taken into account when determining the position of the main camera.

However, fundamentally it is also possible that the auxiliary camera shows a different orientation from the main camera and the fields of view of the main camera and the auxiliary camera are considerably different and/or completely different. For example, the determining of the position may be carried out using position markers that are located in the field of view of the auxiliary camera but not in the field of view of the main camera. The defined position of the auxiliary camera relative to the main camera and/or a defined orientation of the auxiliary camera relative to the main camera may subsequently be used to infer the position of the main camera and/or its field of view. For example, the position of the auxiliary camera may first be determined, and from this, the position of the main camera may be deduced, and/or the position of the main camera may be determined by means of a parallax correction based on the image generated by the auxiliary camera.

In some embodiments, the image sensor of the auxiliary camera may have a lower spatial resolution than the image sensor of the main camera, i.e., a lower number of sensor elements per unit length or per unit area. Further, in some embodiments, the number of auxiliary sensor elements may be less than the number of main sensor elements. Thus, the auxiliary camera may serve at least primarily, in particular exclusively, to determine the position of the main camera without being used for actually recording a scene. As a result, the auxiliary camera may be attached to the main camera, in particular as a relatively inexpensive add-on module, in order to enable a simple determining of the position that does not impair the recording.

Furthermore, in some embodiments, the camera system may comprise the position-determining device explained above, which may in particular be integrated into the main camera and/or the auxiliary camera or may be connectable to the main camera and/or the auxiliary camera as a separate unit. Thus, in some embodiments, it may be provided for, that the camera system is configured to determine the position of the main camera relative to a background display device based on an image produced by the auxiliary camera. The camera system may also be configured to transmit the determined position to a control device of a background display device.

With such a position-determining device integrated in the camera system, the position-determining device may in particular be configured to calculate the coordinates of position markers in a coordinate system fixed with respect to the camera system, wherein the origin of such a coordinate system may lie in particular at the position of the camera. This may in particular take place as explained above, based on determining the directions in which the position markers are arranged relative to the main camera, and determining straight lines intersecting at the position of the camera or at the origin, for example by solving a corresponding system of equations. The positions of the position markers, determined as such, in a coordinate system defined with respect to the camera system may then be transferred into a coordinate system defined with respect to the image recording studio and/or the background display device, or compared with the positions of the position markers in this coordinate system, wherein the position of the main camera in the coordinate system defined with respect to the image recording studio and/or the background display device may be determined on the basis of the transformation performed for the positions of the position markers. This transformation may be carried out by the position-determining device of the camera system, or the position-determining device of the camera system or the camera system may be configured to transmit the positions of the position markers in the coordinate system that is fixed with respect to the camera system to the background display device, whereby the control device, for example, may be configured to perform the required transformation for determining the position of the camera.

In order to enable the determining of the positions of the position markers by the position-determining device, relative coordinates of the position markers in a calibration preceding the recording may, for example, be written into a memory connected to the position-determining device, for example by coupling the main camera and/or the auxiliary camera with a computer (PC) or via an input menu of the respective camera. The camera system or its position-determining device may thus be used flexibly in different image recording studios or with different background display systems or background display devices.

The main camera and/or the auxiliary camera of the camera system may also basically comprise the features of the associated camera, the main camera and/or the auxiliary camera explained above and/or below, provided that these do not fundamentally contradict the concept of the described camera system with a main camera imaging light in the visible wavelength range and an auxiliary camera imaging light in the non-visible wavelength range.

The invention further relates to a digital camera, in particular for use with a background display system of the type disclosed herein, having an image sensor comprising a main sensor area with a plurality of main sensor elements, wherein the main sensor elements are light-sensitive to a plurality of different visible colors and generate corresponding image-element signals, and having a readout circuit configured to generate, on the basis of the image-element signals of the main sensor elements, image data sets corresponding to a respective image of a field of view of the camera, wherein the image sensor comprises, outside the main sensor area, at least one supplementary sensor area having a plurality of supplementary sensor elements which are light-sensitive to non-visible wavelengths, wherein the image sensor is light-sensitive to non-visible wavelengths only in the supplementary sensor area, but not in the main sensor area. In particular, the supplementary sensor elements may be light-sensitive to wavelengths in an infrared and/or ultraviolet wavelength range.

Furthermore, the readout circuit for generating the image data sets may be partially integrated into the image sensor or may be configured as one or more separate units. In particular, the readout circuit may comprise amplifiers, multiplexers, analog-to-digital converters, buffer memories and/ or microcontrollers. The readout circuit may read out, process, digitize and/or output the image-element signals.

The image sensor may also comprise a readout circuit which is configured to generate image data sets on the basis of the signals from the supplementary sensor elements, so that position markers generated in a non-visible wavelength range may be identified in these image data sets of the supplementary sensor elements. Fundamentally, a common readout circuit may also be provided for generating the image data sets of the main sensor elements and for generating the image data sets of the supplementary sensor elements, and/or the image data sets of the main sensor elements and the supplementary sensor elements may be formed and/or output as a common image data set. The respective sensor elements may be configured to convert light incident in a wavelength range in which the sensor elements are sensitive into electrical charge, which may be read out by means of the readout circuit.

Such a digital camera or its image sensor thus makes it possible to detect position markers of a background display device generated in a non-visible wavelength range by means of the supplementary sensor elements, while the recording of a scene to be recorded in an image recording studio and the representation of the virtual background may take place completely unimpaired by means of the main sensor elements. In particular, position markers displayed in a non-visible wavelength range do not have to be subsequently removed from the recording of a scene produced by the camera, rather, the recording may be further processed in a conventional manner. The digital camera may thus function as the associated camera and/or main camera as explained above and/or below.

In this respect, this digital camera solves the task of creating simpler, faster and more cost-effective possibilities for determining a position of an associated camera for recordings in a virtual image recording studio, in that the image sensor of the camera is slightly expanded by the at least one supplementary sensor area and detection of position markers generated in a non-visible wavelength range is made possible. Within the image generated by the supplementary sensor elements, in particular respective locations of the position markers may be determined, in order to be able to determine the position of the camera based on these locations. In that, the supplementary sensor area is arranged outside the main sensor area, the number and/or density of the main sensor elements may remain completely unchanged compared to a conventional image sensor, so that the main sensor area may be configured for optimal recording or imaging of a scene. Here, too, the concept of determining the position of the camera from data generated at the position of the camera or by the camera is implemented accordingly, without having to observe the camera by external optical devices or cameras.

In some embodiments, the main sensor area may be rectangular and have four edges, wherein the at least one supplementary sensor area may be arranged adjacent to at least one of the four edges of the main sensor area. In particular, the supplementary sensor area may be arranged adjacent to an upper edge of the main sensor area and/or a lower edge of the main sensor area and/or a lateral left edge and/or a lateral right edge of the main sensor area. In this case, the at least one supplementary sensor area may be directly adjacent to the respective edge of the main sensor area or may be arranged at a slight distance from the edge, whereby such a distance may be due, in particular, to the manufacturing process. Furthermore, the supplementary sensor area may be arranged adjacent to all four edges of the sensor area or comprise a plurality of supplementary sensor areas, wherein the supplementary sensor area or the supplementary sensor areas may form a frame surrounding the main sensor area.

In some embodiments, it may be provided for, that the spatial resolution in the supplementary sensor area is lower than in the main sensor area. In particular, the number of supplementary sensor elements per unit length or per unit area may be less than the number of main sensor elements per unit length or per unit area. Furthermore, the supplementary sensor elements may be formed with a larger area than the main sensor elements. The supplementary sensor area may thus be provided for determining the position of the digital camera, which does not necessarily require the highest possible resolution, while the main sensor area may be configured for generating high-resolution images of a scene to be recorded in the image recording studio.

Such a digital camera may also comprise, in particular, the features explained above and/or below with respect to an associated camera, a main camera and/or an auxiliary camera, provided that these do not oppose the concept of an image sensor having a main sensor area and a supplementary sensor area. In particular, a respective location of the position markers in an image generated by the digital camera, in particular in an image generated by the supplementary sensor elements, may thereby be determined, in order to determine therefrom the position of the digital camera relative to a background display device. In this case, for example, the digital camera may comprise a position-determining device for determining this position and/or the digital camera may be configured to transmit camera data to such a position-determining device.

The invention further relates to a recording system having a background display system of the type disclosed herein and having the associated camera and/or at least one auxiliary camera connected to the associated camera, in particular having a camera system of the type disclosed herein or a digital camera having an image sensor with main sensor elements and supplementary sensor elements of the type disclosed herein, and having a position-determining device, wherein the camera and/or the auxiliary camera is or are configured to generate the camera data for the position-determining device.

The associated camera, which may also be referred to as the main camera and/or may be configured as a digital camera of the type disclosed herein, and/or the auxiliary camera, is or are configured to generate an image of the background display device in which the position markers may be identified. Based on the images or image data sets generated by the respective camera, in particular the locations of the position markers within the image may be determined. The position-determining device may be configured to determine the position of the associated camera, or the main camera, based on these locations of the position markers in the relevant image.

As already explained above, the position-determining device may, for example, be integrated in the control device of the background display system or connected to the control device as a separate unit of the background display system. Alternatively, the position-determining device may also be integrated in the associated camera or the main camera or the digital camera and/or the auxiliary camera, so that the camera data may be processed within the camera or a camera system, in order to determine the position of the associated camera. A position of the camera determined by the position-determining device may be transmitted in the form of position data to the control device of the background display system, wherein the control device may be configured to adapt the representation of the virtual background by means of the background display device in dependence on the determined position of the camera. The determining of the position of the camera and the adapting of the representation of the virtual background may take place in particular in real time.

In some embodiments, the associated camera and/or the auxiliary camera may be configured to detect light of a non-visible wavelength. In particular, the associated camera and/or the auxiliary camera may be configured to detect light in an infrared and/or in an ultraviolet wavelength range. For example, an auxiliary camera connected to the associated camera and arranged at a defined position relative to the associated camera may be configured to detect light in a non-visible wavelength range to detect, for example, radiation in an infrared wavelength range emitted by respective position marker light sources. Thus, the auxiliary camera may serve for determining the position, while the associated camera or main camera may be provided for the recording of the scene or visible light, without this recording being impaired by the generation of the position markers. Alternatively, the associated camera of the recording system may, for example, comprise an image sensor having a main sensor area and main sensor elements light-sensitive to light in the visible wavelength region, and having a supplementary sensor area and supplementary sensor elements light-sensitive to light in a non-visible wavelength region, in order to be able to detect position markers generated in a non-visible wavelength region, as explained above.

In some embodiments, the associated camera and/or the auxiliary camera may comprise a measurement device configured to determine an orientation of the associated camera, particularly a rotational position and/or a tilt position of the associated camera, wherein the camera data may further include the orientation of the associated camera.

For example, the measurement device may comprise a rotary position sensor, in particular an incremental rotary encoder, and/or a static acceleration sensor, to determine the orientation of the associated camera. In particular, the measurement device may thereby be arranged on the associated camera so that the orientation of the associated camera may be determined directly. Alternatively, it may also be provided for, that the measurement device is arranged or attached to an auxiliary camera connected to the associated camera, and which is connected to the associated camera at a defined position and orientation, so that the orientation of the associated camera may be determined directly from the orientation of the auxiliary camera.

As explained above, the orientation of the associated camera may be taken into account, in particular, when determining the position of the camera and when adapting the representation of the virtual background, in order to reduce the number of degrees of freedom in determining the position of the associated camera in space. In particular, the camera data transmitted to the position-determining device may thus allow the position of the associated camera to be determined unambiguously and in a coordinate system defined with respect to the image recording studio and/or the background display device.

Further, in some embodiments, the associated camera may comprise an image sensor comprising a plurality of light-sensitive sensor elements for generating respective pixel signals, wherein the associated camera may be configured to record or output a first portion of the pixel signals corresponding to an image of a recording field of view of the camera as recording image data, and to generate a second portion of the pixel signals corresponding to an image of an observation field of view of the camera adjacent to the recording field of view, as observation image data. Further, the associated camera may thereby be configured to evaluate the observation image data with respect to the locations of the plurality of position markers within the image of the observation field of view, or to transmit the observation image data as part of the camera data to the position-determining device.

For a camera configured in this way, the recording image data may correspond to the image information of the scene which is to be recorded by the associated camera and stored within the associated camera or on an external recorder or is to be output for a broadcasting (e.g., live transmission or broadcast). In particular, the recording image data may thereby correspond to an image of the scene recorded by the associated camera in a predetermined and/or a specifiable or in a pre-recording selectable format, in which the image is ultimately to be viewed. The observation field of view may be imaged by sensor elements in the already mentioned over-scan area of the camera or its image sensor, in which observation image data may be generated, which do not contribute to the imaging of the recorded scene in the intended format. In this respect, the observation field of view may extend the recording field of view of the camera in one or more directions, so that fundamentally a larger area may be imaged by means of the camera than is required for the desired imaging of the intended scene.

In this regard, the observation image data may enable, with regard to the image in the intended format, an ongoing additional recording of the position markers in visible wavelength regions, without the recording image data being impaired. In that, the associated camera may be configured to evaluate the observation image data regarding the locations of the plurality of position markers within the image of the observation field of view, or to transmit the observation image data to the position-determining device as part of the camera data. The locations of the plurality of position markers within the image may either be determined by the camera itself and/or may be made available to the position-determining device, wherein the position-determining device may identify the locations of the plurality of position markers, for example, by means of image analysis methods. Based on the locations of the position markers within the image or the observation image data, the position of the associated camera may then be determined, as explained above.

Thus, position markers generated in visible wavelengths may be detected as part of the observation image data and identified in the observation image data, in order to enable a determining of the position of the associated camera based on the data generated by the associated camera or the image generated by the associated camera. Since, however, the observation image data do not contribute to the recording image data, subsequent removal of position markers contained or imaged in the observation image data is not required. In particular, the observation image data may thereby be used exclusively to determine the position of the associated camera, and optionally may be used for an electronic viewfinder or monitor (and otherwise be discarded), in order to write on any memory, for example, of the associated camera or of an external recorder, exclusively with the ultimately required recording image data and not to load an output interface with unnecessary amounts of data.

In particular, in some embodiments of the recording system having such a camera, an image sensor with respective sensor elements for detecting a recording field of view of the camera and an observation field of view of the camera adjacent thereto, it is possible that the control device of the background display system is configured to change the positions of the position markers on the background display device in dependence on the camera data. In particular, the control device may thereby be configured to change the positions of the plurality of position markers on the background display device during the recording in such a way, that the position markers are always located in the observation field of view of the associated camera, but not in the recording field of view of the associated camera. Thus, to some extent, the position markers may be tracked to the observation field of view of the camera, particularly for a change in the position of the camera, in that the positions of the plurality of position markers on the background display device are changed accordingly. To achieve this, the control device may in particular be configured to change in real time the positions of the position markers on the background display device on the basis of an image analysis, in which the locations of the position markers in the image or in the observation image data generated by the associated camera are determined and/or a change in the locations is determined, in order to track the position markers to the observation field of view of the camera.

In some embodiments, the associated camera may further comprise an electronic viewfinder, wherein the observation image data, in addition to the recording image data, may be displayed on the electronic viewfinder as image information. Such a viewfinder may in particular serve a cameraman or a photographer guiding the associated camera, to also be able to observe a surrounding area of the recording field of view of the camera. In this case, the recording field of view may be delimited from the observation field of view, for example, by means of a border or a line displayed on the viewfinder, so that the cameraman or photographer may recognize the area of the scene located in the recording field of view of the camera.

In some embodiments, the sensor elements that generate the first part of the pixel signals may be arranged in a rectangular sensor area of the image sensor that has four edges, wherein the sensor elements that generate the second part of the pixel signals may be arranged on the image sensor adjacent to at least one of the four edges of the rectangular sensor area. In this case, the sensor elements which generate the second part of the pixel signals may be arranged in particular adjacent to a left edge and/or a right edge and/or an upper edge and/or a lower edge of the rectangular sensor area. In particular, the sensor elements which generate the second part of the pixel signals may surround the rectangular sensor area in a frame-like manner and in this respect, be arranged adjacent to all four edges. Fundamentally, all the sensor elements of the image sensor may be arranged in a rectangular shape. Moreover, the sensor elements which generate the first part of the pixel signals may be arranged in a central area of such a rectangular image sensor. Further, the sensor elements may be arranged in a plurality of rows and columns.

In some embodiments, it may further be provided for, that the subdivision of the sensor elements which generate the first part of the image data and the sensor elements which generate the second part of the image data is variable. In particular, the recording field of view of the camera may thus be adaptable. This may make it possible to variably generate images in different formats by means of the associated camera, in order to enable flexible use of the camera and to be able to meet different requirements for the respective format. However, the format may be fixed in particular before the start of the recording and may not be changed during the recording of a scene. The recording field of view of the associated camera may thereby correspond in particular to an selectively adaptable rectangle. Also, the size of the observation field of view, in which in particular the position markers may be detected and to which in particular the position markers may be tracked, may thus be variable.

The invention further relates to a digital camera, in particular for use with a background display system of the type disclosed herein, having an image sensor configured to generate image data representing an image of a field of view of the camera in dependence of light exposure, and a position-determining device which is configured to detect locations of a plurality of position markers within an image of a background display device located in a field of view of the camera and to determine a position of the camera relative to the background display device in dependence on the detected locations of the plurality of position markers. In particular, the image sensor may thereby comprise a plurality of light-sensitive sensor elements for generating exposure-dependent pixel signals and which may, for example, be made of silicon, and may be based on CMOS technology or CCD technology. With such image sensors, the sensor elements may form a sensor area and are arranged in multiple rows and columns. Further, in some embodiments, the light-sensitive sensor elements may be provided with a color filter array (CFA) in order to have varying spectral sensitivity. Accordingly, such a color filter array is an integral part of the image sensor. Fundamentally, the image sensors explained above in connection with the associated camera, the main camera and/or the auxiliary camera, may also be configured in such a way or based on such technologies. The camera may also comprise readout electronics for reading out, processing and/or digitizing the pixel signals of the image sensor.

In that, the camera comprises a position-determining device, the determining of the position of the camera may already take place on the camera side and may be output directly to a background display system or a control device of a background display device, so that the control device may adapt a representation of a virtual background in dependence on the position of the camera. Therefore, such a camera also solves the task of creating simpler, faster and less expensive options for determining a position of an associated camera for recordings in a virtual image recording studio, in that the camera itself is configured to determine the position and therefore components for observing the camera and determining its position may be dispensed with. The camera having the position-determining device may therefore also be provided as a component of the above-described recording system.

The position-determining device integrated in the camera may be configured in particular to determine respective directions in which the position markers are arranged relative to the camera on the basis of the locations of the position markers in the image generated by the camera. As such, the position-determining device may be configured to first determine the positions of the position markers in a coordinate system fixed with respect to the camera, for example, with an origin at the position of the camera. Then, by comparing the positions of the position markers in the coordinate system fixed with respect to the camera with the positions of the position markers in a coordinate system fixed or defined with respect to the image recording studio and/or the background display device, the position of the camera in the coordinate system fixed with respect to the image recording studio or the background display device may be determined. For this purpose, the camera or its position-determining device may be calibrated, for example, prior to a recording in the respective image recording studio or with respect to the background display device, in order to write, for example, relative positions and/or distances of individual position markers to one another into a memory that may be read out by the position-determining device.

Alternatively, it may be provided for, for example, that the camera is configured to determine distances between the camera and respective position markers, for example, by means of a depth sensor. The position-determining device may be configured to determine the position of the camera based on the respective distances between the camera and the position markers, as well as distances of the position markers to one other previously entered during a calibration by means of a triangulation method.

In some embodiments, the camera may comprise a signal output configured to transmit the determined position of the camera to the background display device. In particular, the camera may be connectable via the signal output to the control device of the background display device in a wireless and/or wired manner, so that the control device may consider the position determined by the position-determining device of the camera, which may be transmitted in particular in the form of position data, when adapting the display of the virtual background.

Furthermore, the camera with the position-determining device described herein may comprise features explained above and/or below in connection with the associated camera, the main camera, the digital camera, and/or the auxiliary camera, provided that these do not contradict the configuration of the camera with the position-determining device. Furthermore, the camera with the position-determining device may be provided as part of the recording system described above.

The invention further relates to a method of controlling a background display device which displays, behind or above a real subject, a representation of a virtual background for a recording by means of an associated camera and generates a plurality of predetermined optically detectable position markers, in particular, in a recording system of the type disclosed herein, comprising the steps of:
  determining a position of the associated camera in dependence on camera data which represent locations of the plurality of position markers within an image of the background display device; and
  adapting the representation of the virtual background in dependence on the determined position of the camera.

The determining of the position of the associated camera may in particular take place by means of a position-determining device, which, for example, may be configured to determine, based on the locations of the plurality of position markers, respective directions in which the position markers are arranged relative to the associated camera, and therefrom, determine the position of the associated camera. The position of the associated camera may then be used to adapt the representation of the virtual background such that the image of the representation of the virtual background generated by the associated camera corresponds to or approximates an image that would be generated if a real background corresponding to the virtual background were imaged. In particular, the adapting of the representation may be carried out in real time or during a camera movement, in particular during a camera pan, in order to be able to adapt in real time the representation of the virtual background to the changing position of the camera during a moving image recording.

In some embodiments, the position of the associated camera may be calculated in dependence on the camera data and/or the position of the associated camera may be looked up in a look-up table in dependence on the camera data.

Further, in some embodiments, an orientation of the associated camera may be taken into account when determining the position of the associated camera and/or when adapting the representation of the virtual background. In particular, any determined directions in which position markers are arranged relative to the associated camera may be corrected to take into account an orientation of the associated camera, in particular to take into account rotational positions and/or tilt positions or may be transferred to corresponding directions in an orientation of the camera provided for determining the position, in order to determine the position of the camera based on these directions. Furthermore, the orientation of the camera may be used to determine its field of view in order to be able to adapt the representation of the virtual background accordingly.

In some embodiments, the image of the background display device, based on which the position of the associated camera may be determined, may be generated by the associated camera and/or at least one auxiliary camera connected to the associated camera. In particular, an auxiliary camera connected to the associated camera may be configured to detect light in a non-visible wavelength range in order to be able to identify position markers generated in such a wavelength range.

In some embodiments, it may be further provided for, that the position markers are generated by light sources. In particular, the position markers may be generated as predetermined marking patterns and/or in a non-visible wavelength range. In particular, generating the position markers as predetermined marking patterns may allow easy identification of the position markers in the image and/or a subsequent correction of the image in the course of image processing, while generating the position markers in a non-visible wavelength range, the recording of a scene by means of the associated camera may take place completely unimpaired by the generation of the position markers.

In some embodiments, positions of the position markers on the background display device may be changed during the recording in dependence on the camera data. Therefore, the position markers are tracked, for example, to a field of view of the associated camera, in particular an aforementioned over-scan area or an observation field of view of the camera, which is arranged adjacent to a recording field of view of the camera. In particular, this may allow the position of the associated camera to be determined by means of data generated by the associated camera itself, whereby the recording of the scene in the image recording studio is not impaired when imaging the position markers in an over-scan area of the camera, even when the position markers are generated in visible wavelengths. In particular, no subsequent removal of the position markers is required.

Further, in some embodiments, during a recording of a scene, image recording data from the associated camera corresponding to a recording field of view of the associated camera, may be permanently stored in the associated camera or output for storage in an external recorder or output for broadcasting (e.g., live transmission or broadcast) by funk or a cabled connection, wherein the positions of the position markers on the background display device may be changed during the recording in such a way, that the position markers are always located in an observation field of view of the associated camera that lies outside the recording field of view of the associated camera. In this case, the position markers may be identified in image data representing an image of the observation field of view of the associated camera, in order to determine the position of the camera in space based on the locations of the position markers in this image. The image recording data, on the other hand, may represent image information that may correspond to an image of the scene in an intended format. In that, the position markers are thus always lying in the observation field of view of the camera, lying outside the recording field of view of the associated camera but not in the recording field of view, the position markers may be imaged as well as identified and, in particular, their location in the image may be determined without the image recording data being impaired thereby. Further, in particular, only the image recording data of the associated camera may be permanently stored in the associated camera or output for storage in an external recorder. Image recording data corresponding to the observation field of view of the associated camera, on the other hand, may be used in particular exclusively to determine the position of the associated camera and then discarded to minimize the amount of storage required during the recording.

The method described herein may further comprise steps explained above and/or below in association with the position-determining device and/or the control device for adapting the representation of the virtual background.

The invention is explained in the following, purely by way of example, based on exemplary embodiments with reference to the drawings.

Figure 1B:
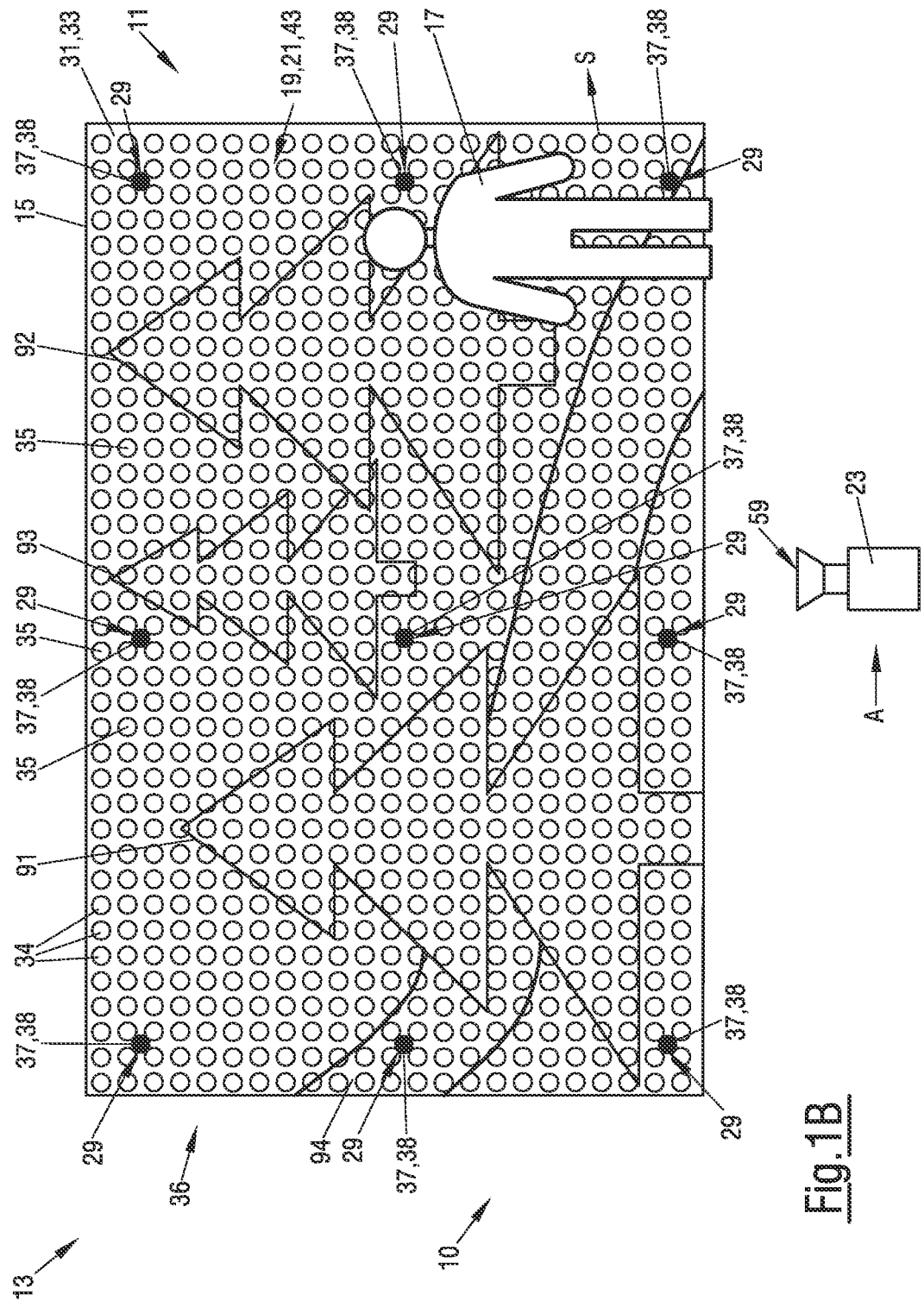
Figure 2A:
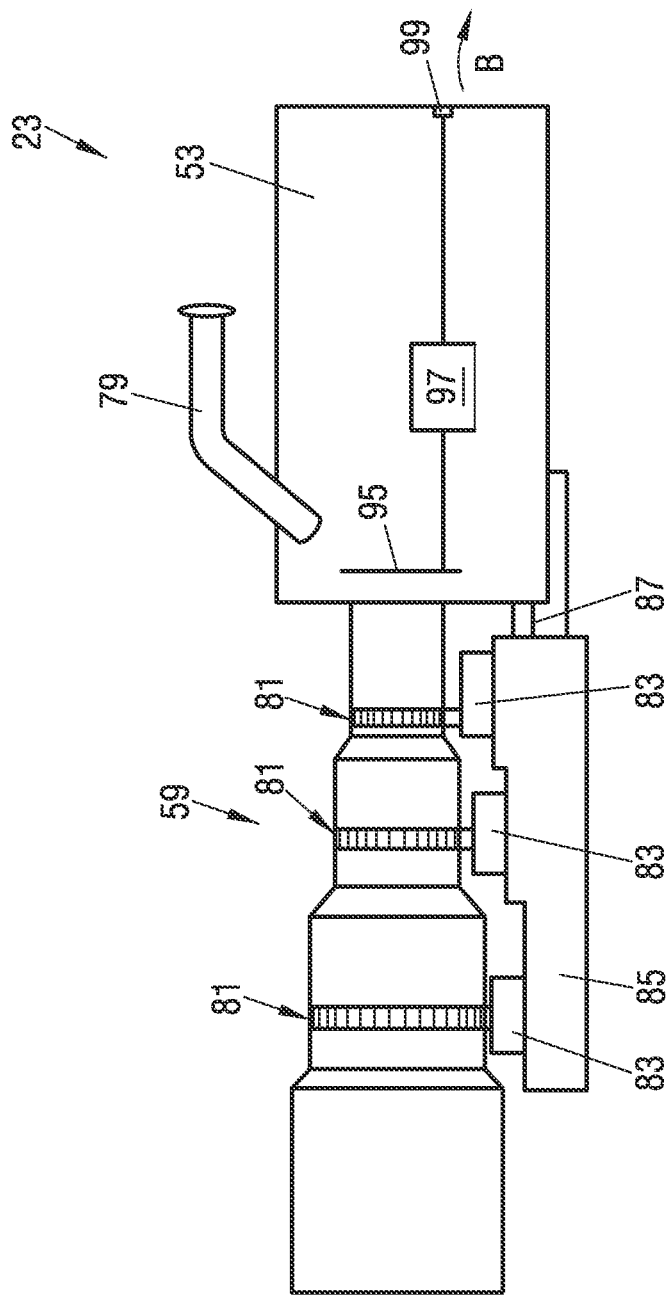
Figure 2B:
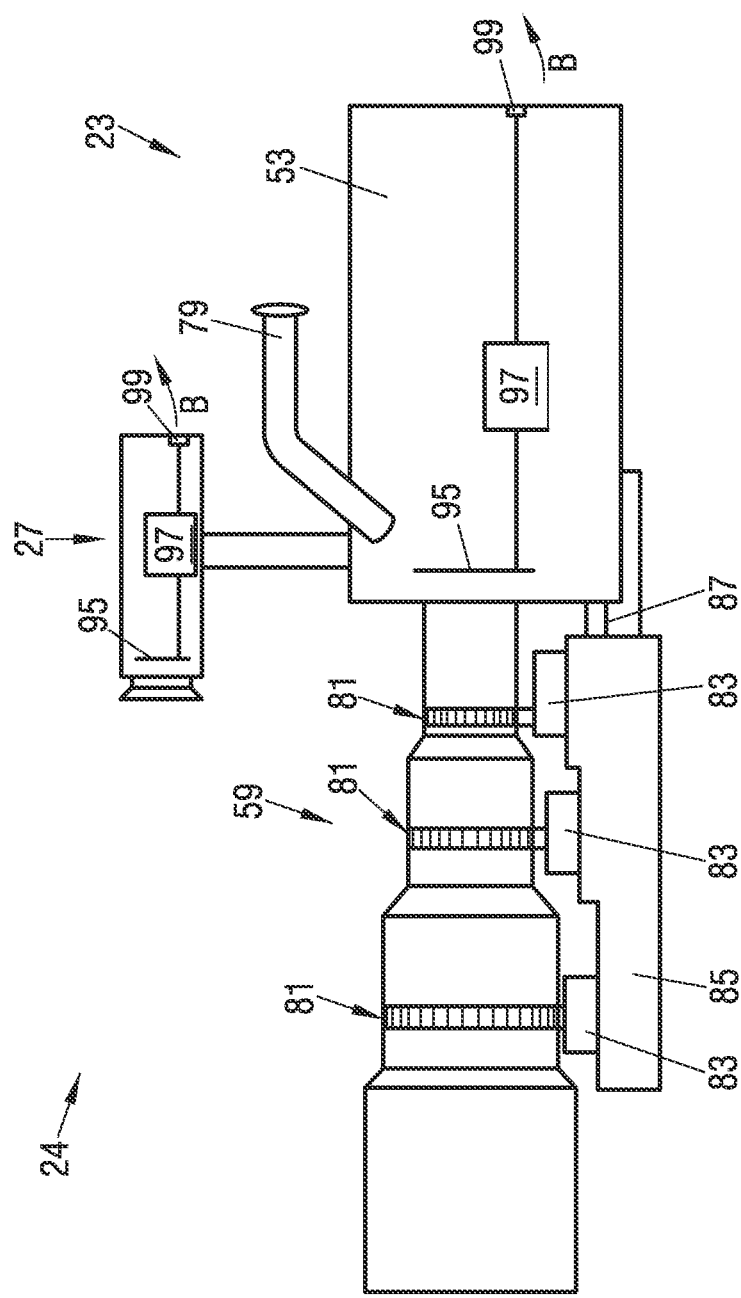
Figure 3A:
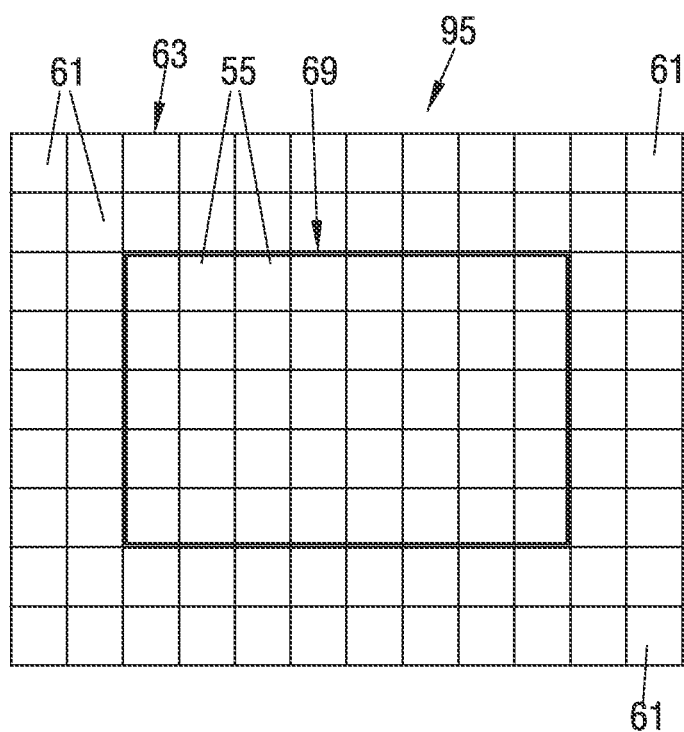
Figure 3B:
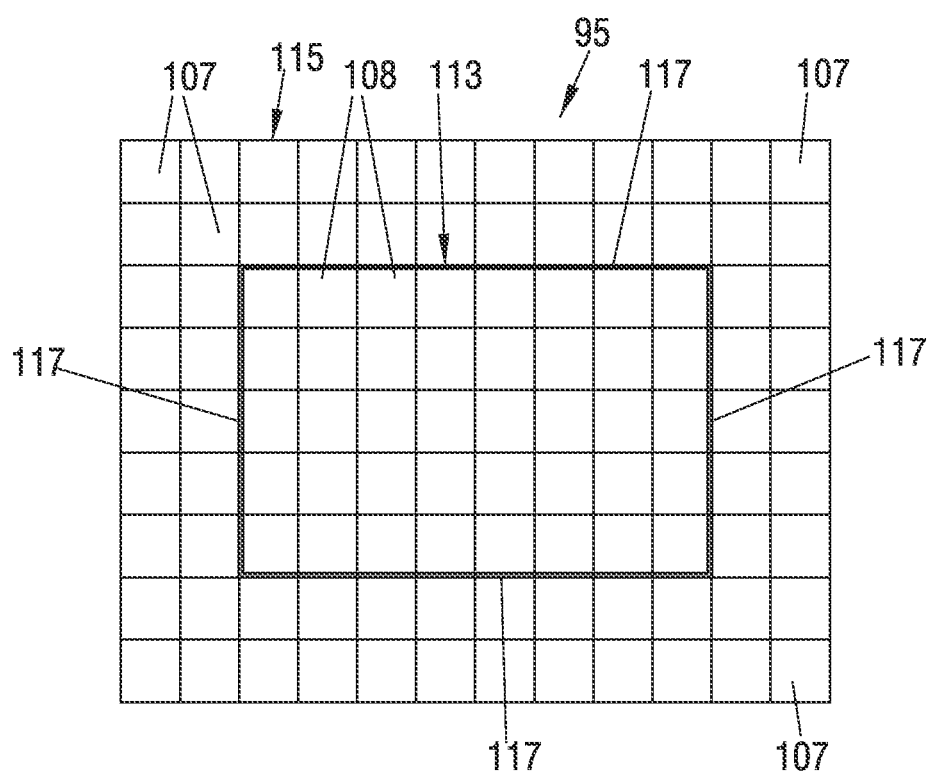
Figure 4A:
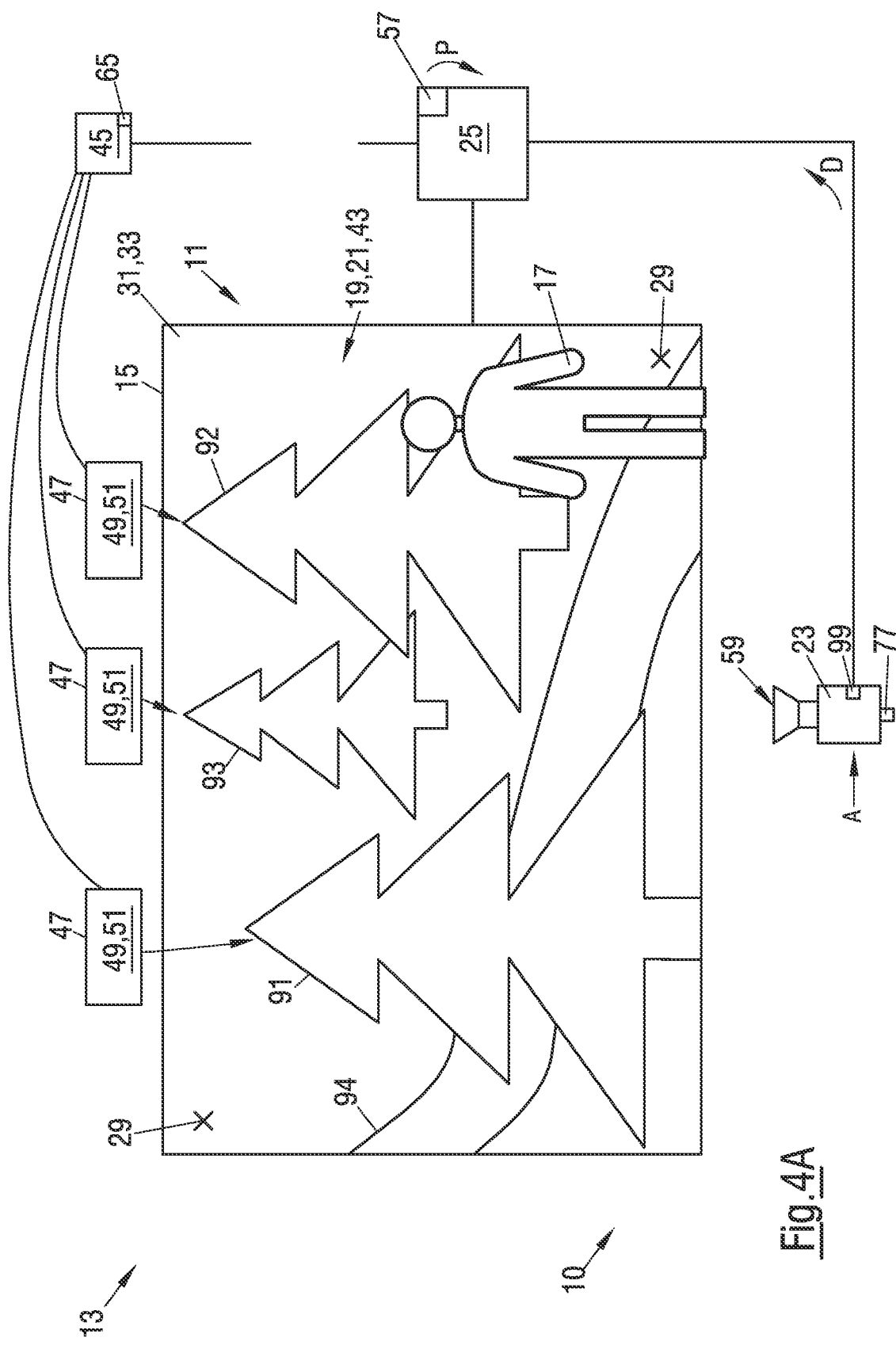
Figure 4B:
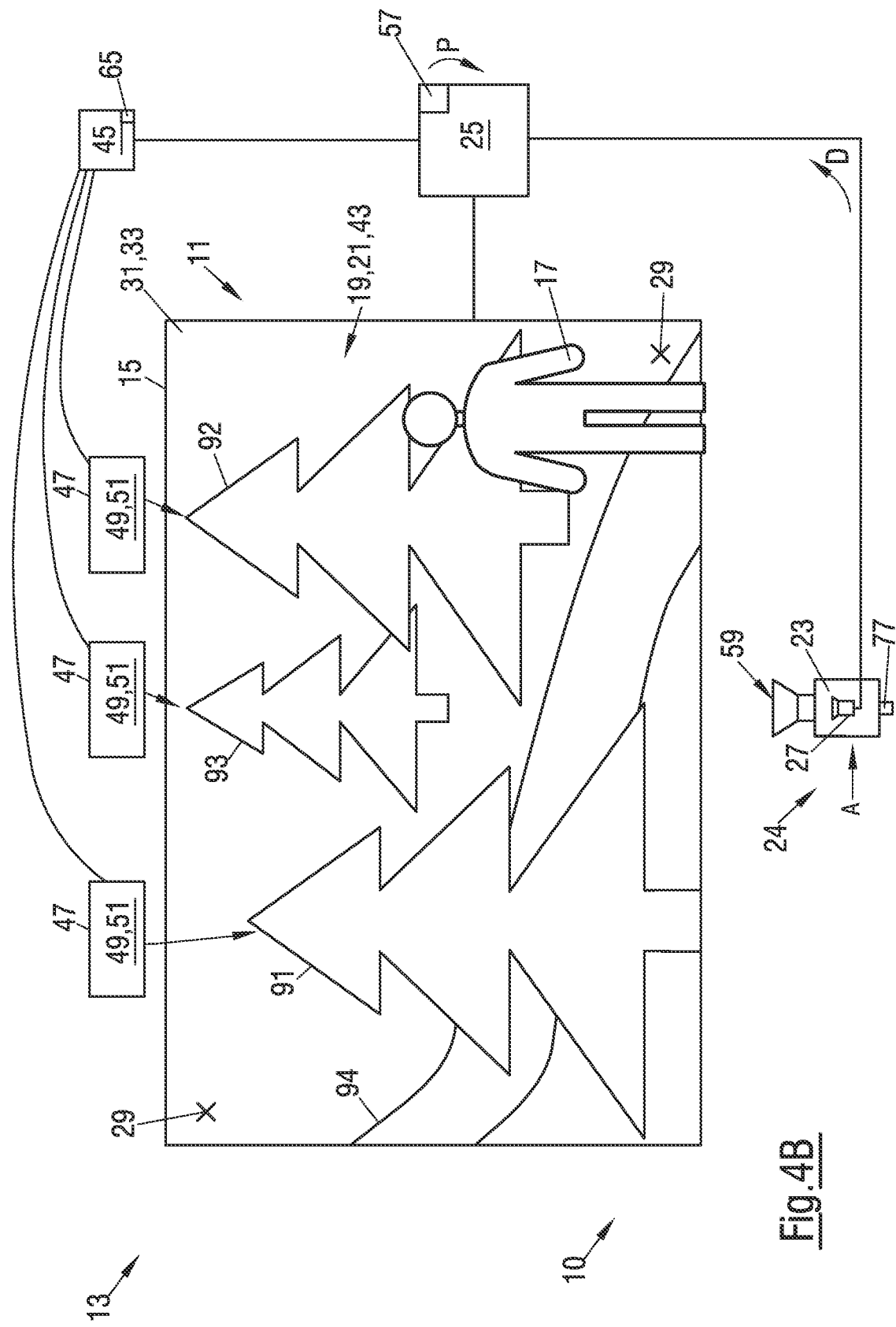
Figure 4C:
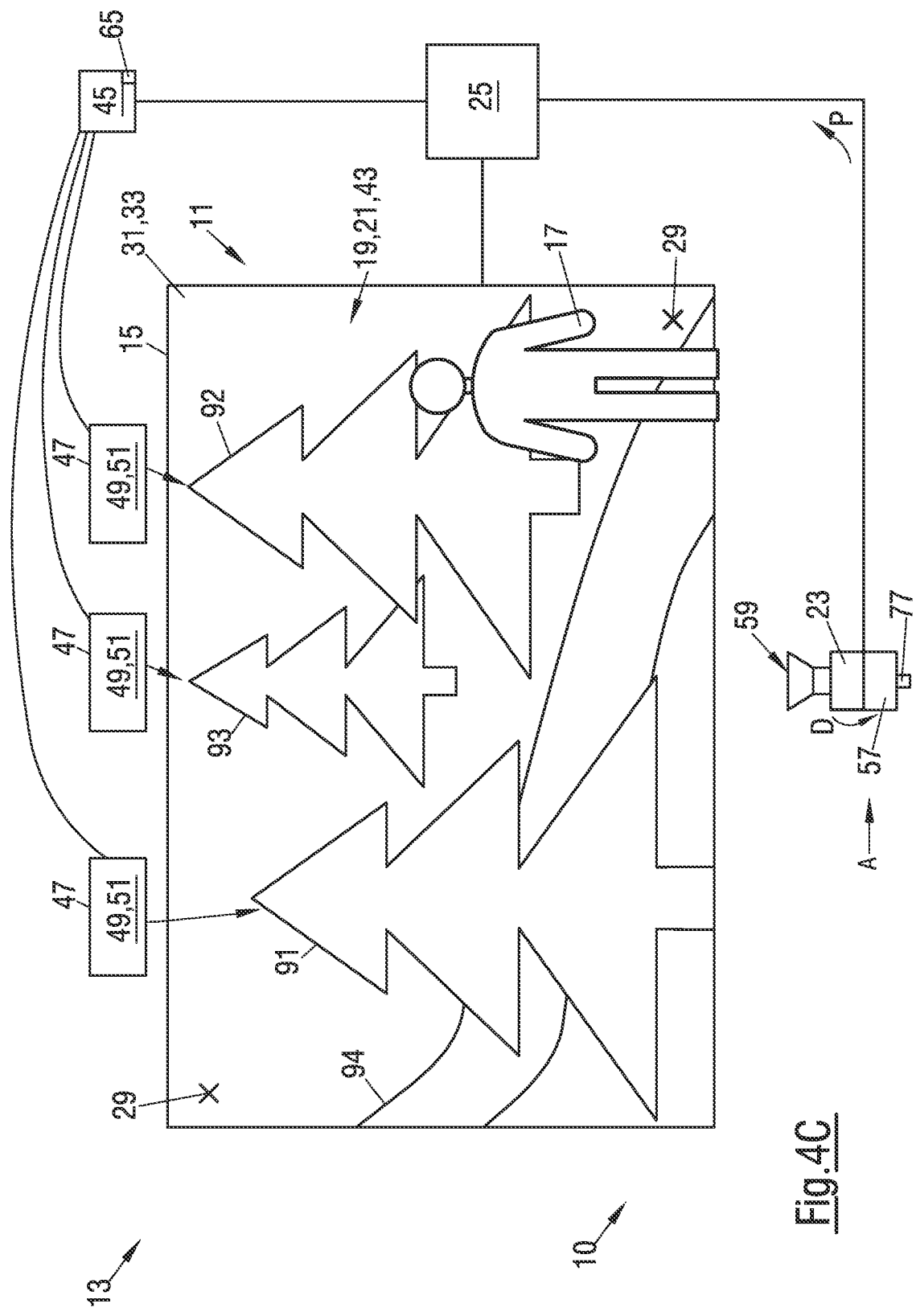
Figure 4D:
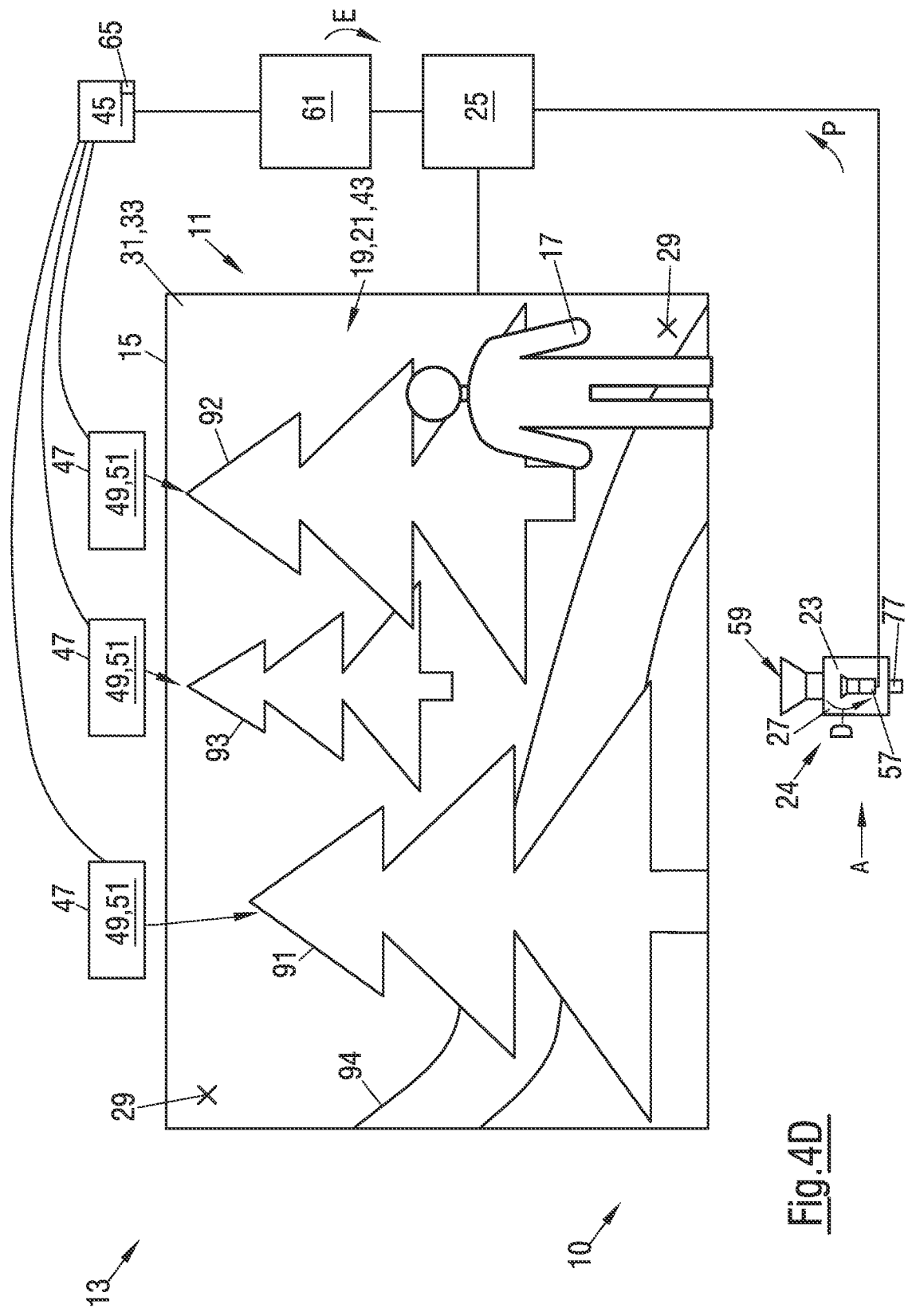
Figure 5:
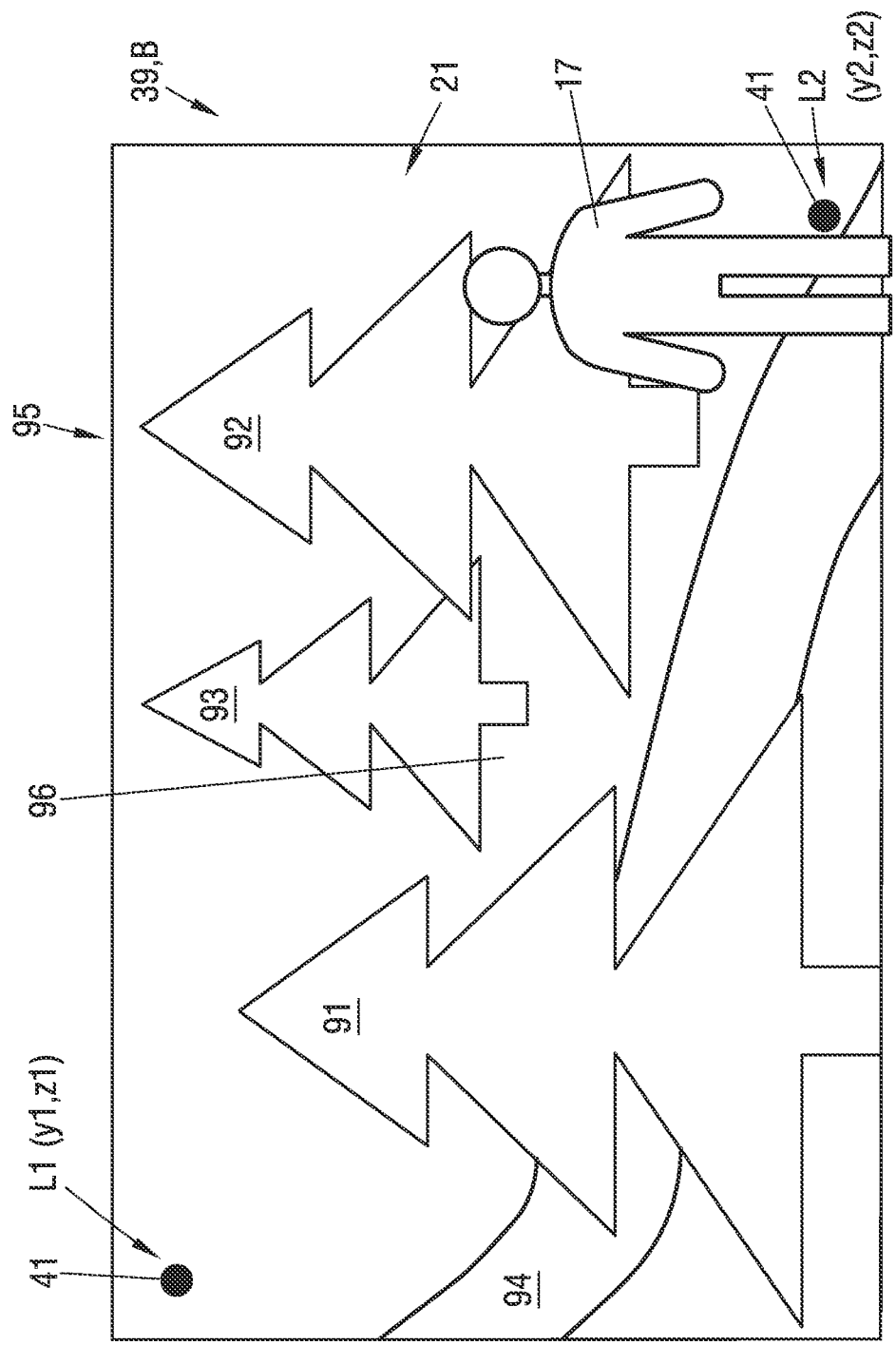
Figure 6A:
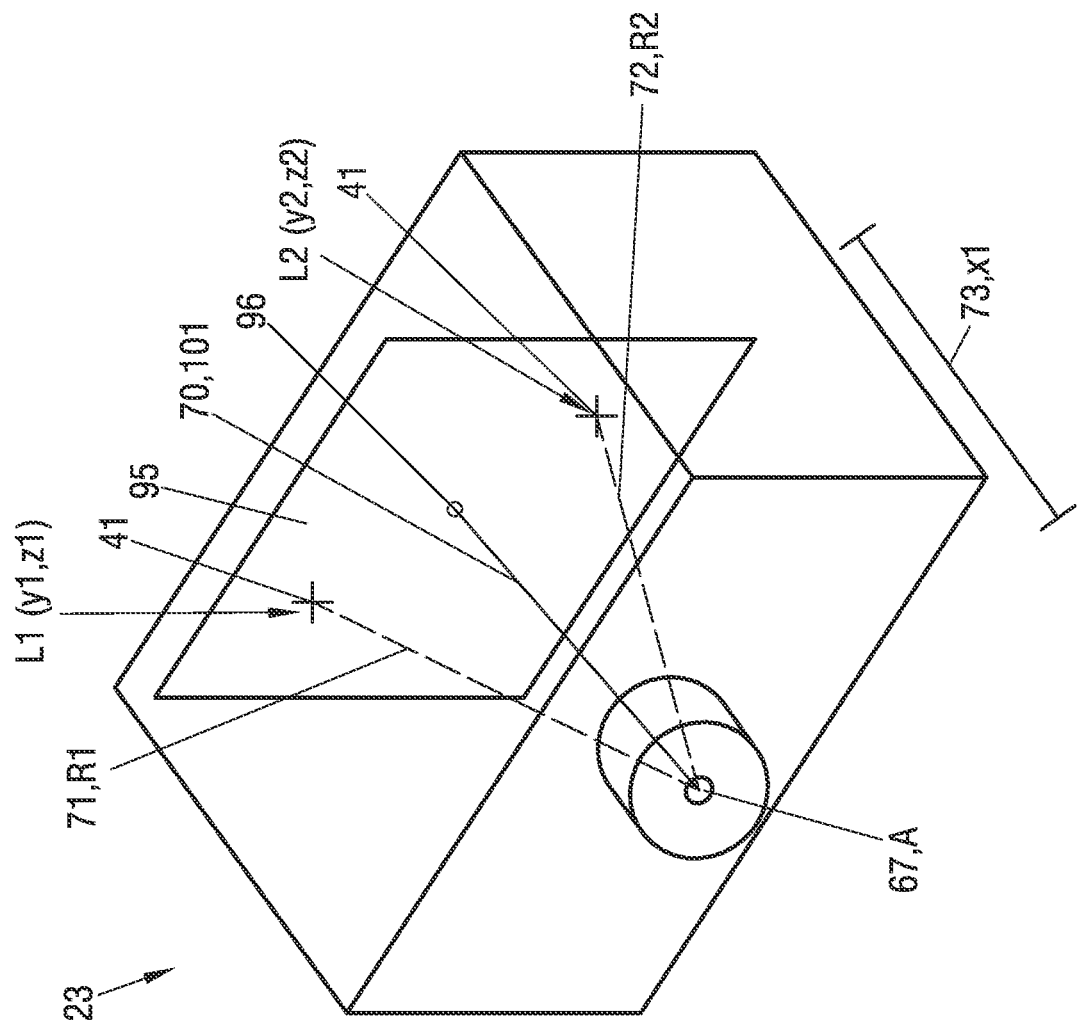
Figure 6A:
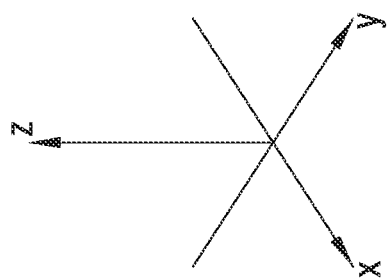
Figure 6C:
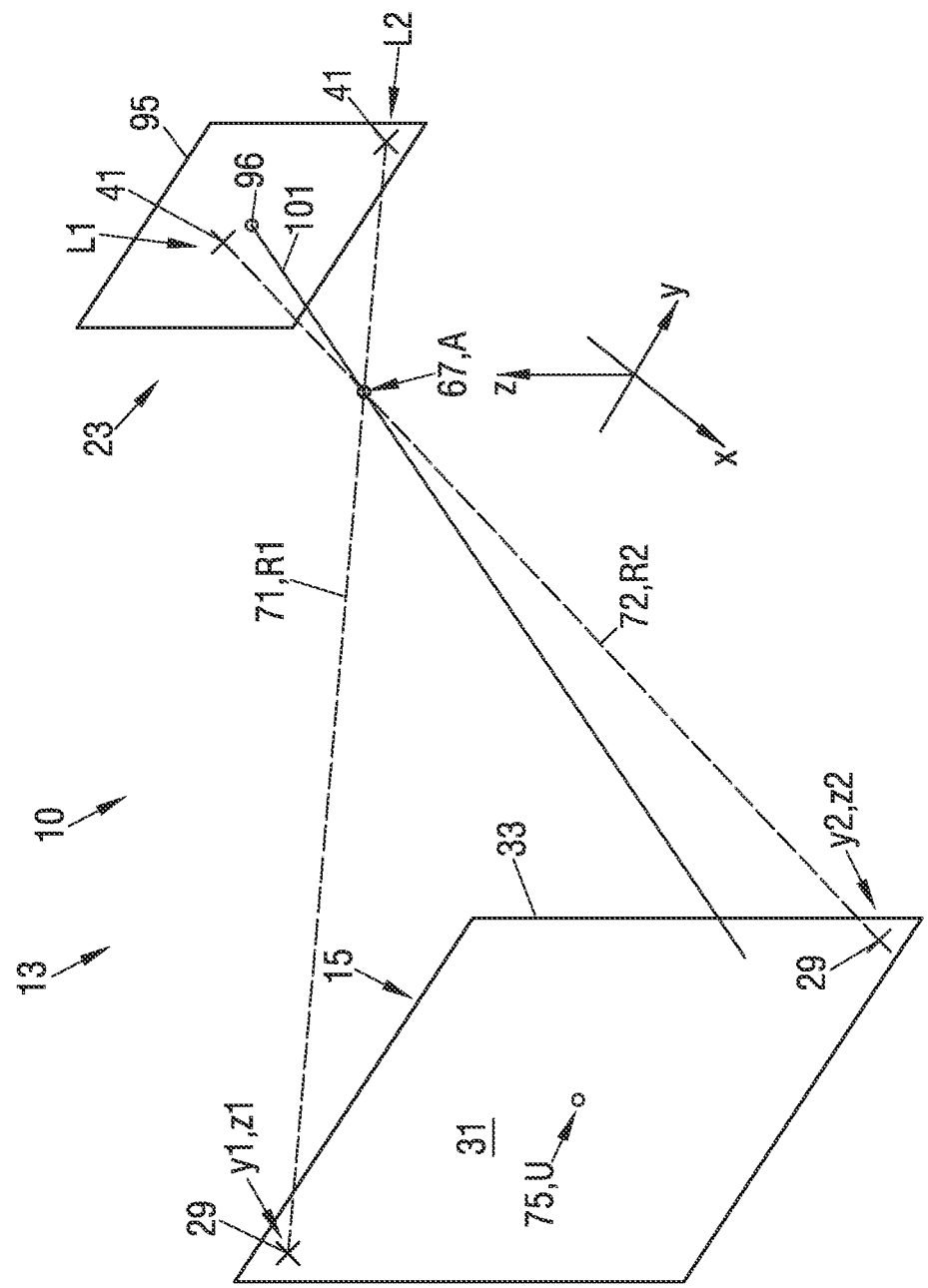
Figure 7A:
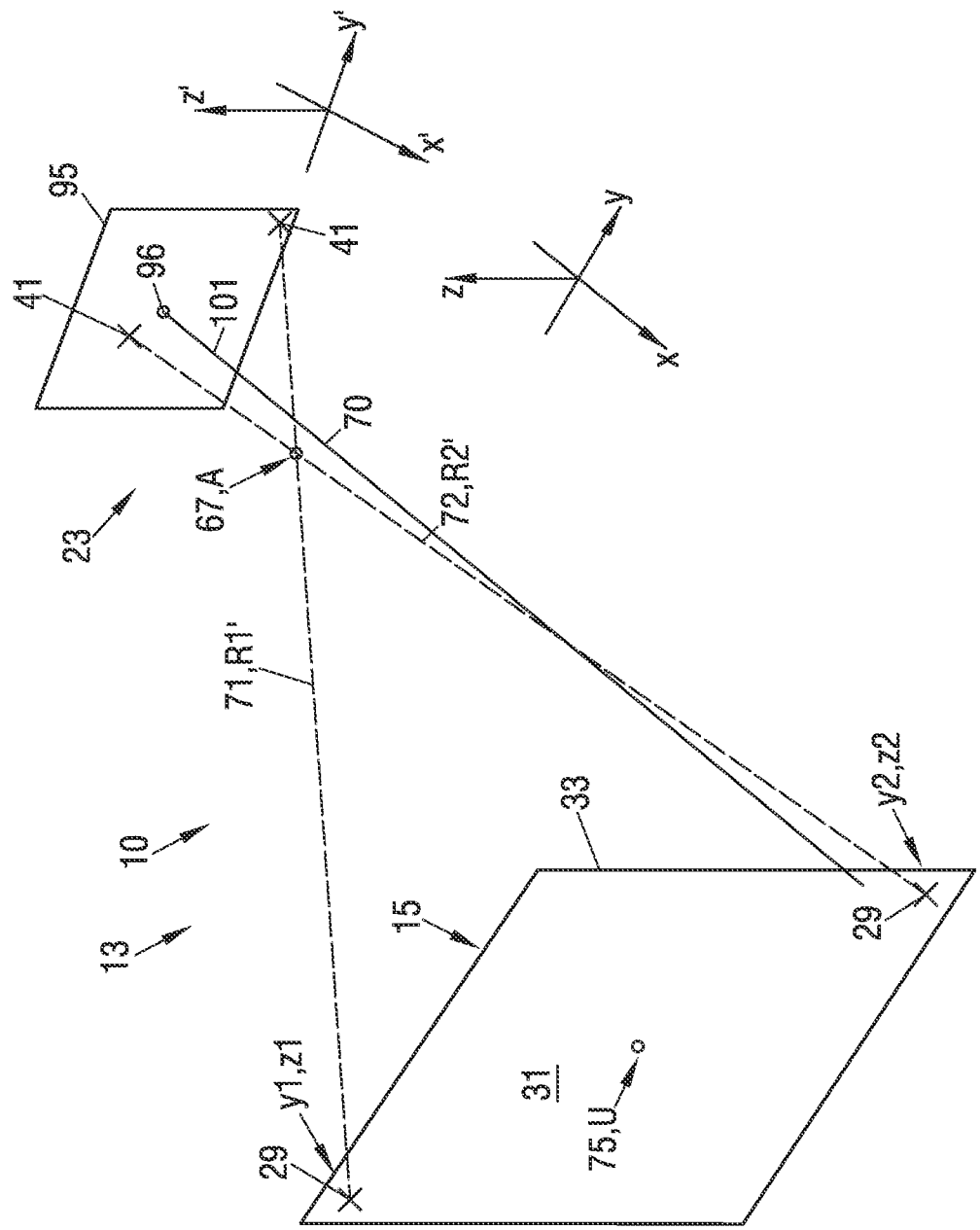
Figure 7B:
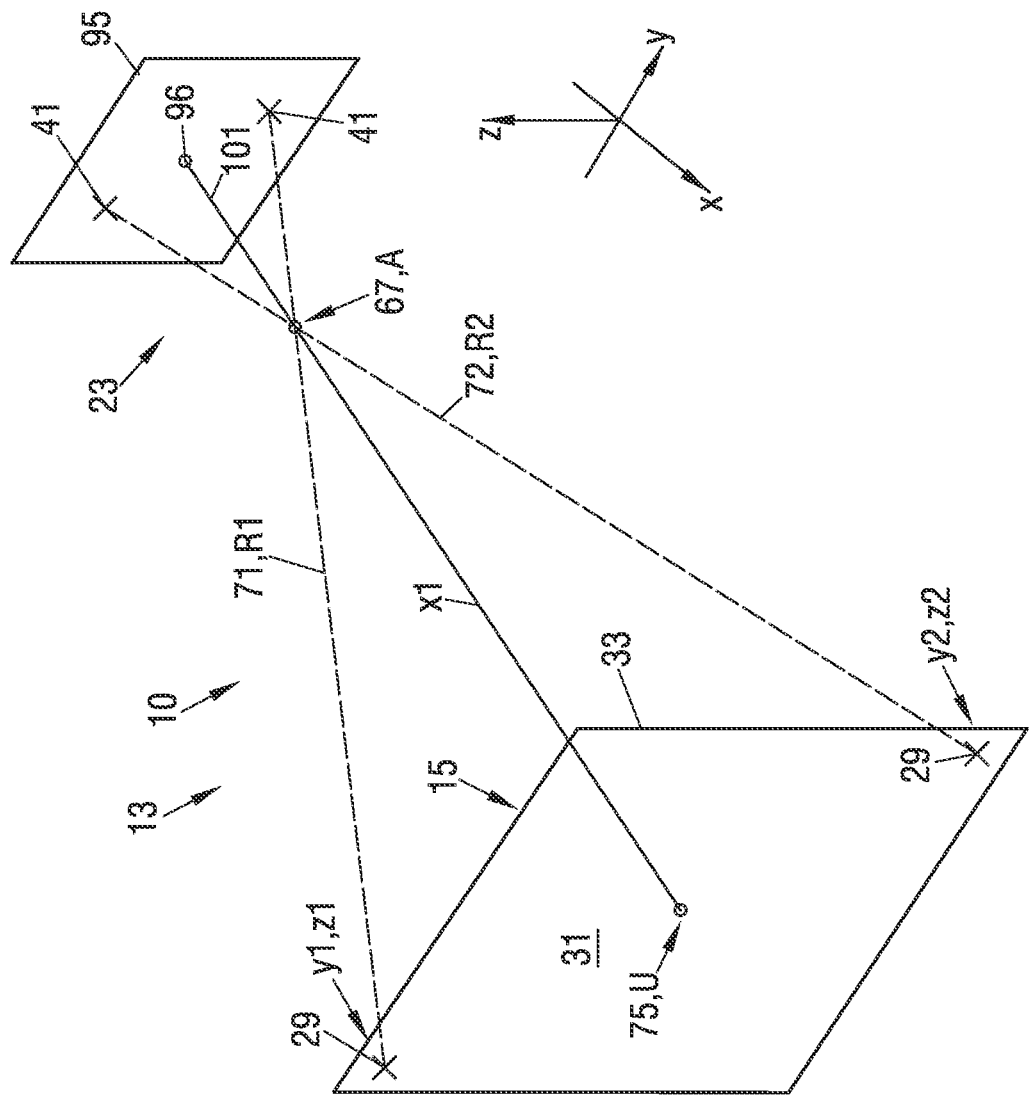

FIGS. 1A to 1E show schematic views of a recording system for an image recording studio having a background display system and an associated camera, as well as two partial views of a background display device of the background display system comprising a plurality of display modules, FIGS. 2A and 2B show a schematic view of a camera provided for a recording in the image recording studio and a schematic view of a camera system which includes the associated camera and an auxiliary camera connected to the associated camera, FIGS. 3A and 3B show a schematic view of an image sensor of an embodiment of the associated camera with a main sensor area and a supplementary sensor area, and a schematic view of an image sensor of a further embodiment of the associated camera for imaging a recording field of view and an observation field of view of the associated camera, FIGS. 4A to 4D show respective schematic views of the recording system to illustrate a determination of a position of the associated camera and a control of the background display device of the background display system in dependence on the determined position, FIG. 5 shows a schematic view of an image of the background display device generated by the camera and/or the auxiliary camera, FIGS. 6A to 6C show respective schematic views to illustrate the determination of the position of the associated camera relative to the background display device, FIGS. 7A and 7B show respective schematic views to illustrate the determination of the position of the associated camera relative to the background display device taking into account an orientation of the associated camera, FIGS. 8A to 8F show respective schematic views to illustrate the control of the background display device in dependence on the position of the associated camera, FIGS. 9A to 9F show respective schematic views to illustrate the control of the background display device taking into account the orientation of the associated camera, and FIGS. 10A to 10C show respective schematic views of an embodiment of the background display system in which positions of the position markers on the background display device are changeable, with corresponding images of the background display device generated by the associated camera.

FIG. 1A shows a virtual image recording studio 13 in which a scene may be recorded by means of an associated camera 23. The camera 23 is part of a recording system 10 which further includes a background display system 11, arranged in the virtual image recording studio 13 and having a background display device 15. The background display device 15 is configured to display a representation 19 of a virtual background 21 behind or above a real subject 17, here an actor. The associated camera 23 may in particular be a moving image camera, by means of which a moving image sequence may be recorded as a sequence of successive images 39 generated by the camera 23 (cf. also FIG. 5). Alternatively, the camera 23 may however, also be configured as a still image camera in order to be able to produce individual images 39 or photographs.

A possible embodiment of the associated camera is shown schematically in FIG. 2A. This associated camera may also be referred to or understood as the main camera and is provided to generate the image 39 of the representation 19 of the virtual background 21, as well as the real subject 17 or the actor and to produce a recording (see also FIG. 5).

The camera 23 comprises a camera body 53 to which a lens 59 is attached. The lens 59 may in particular be configured as an interchangeable lens, so that selectively various configured lenses 59 may be connected to the camera body 53 and a lens 59 that is optimal for a respective recording may always be selected. The lens 59 comprises three lens rings 81, by means of which the respective parameters of the lens 59 may be set. For example, a focusing distance, a focal length, a zoom factor and/or a diaphragm aperture, in particular an aperture of an iris diaphragm, may be set or adapted by rotating a respective one of the lens rings 81.

In order to be able to adjust the lens rings 81, a lens ring driving unit 85 is connected to the camera body 53 via a holding rod 87, which comprises a respective lens servomotor 83 for each of the lens rings 81. The lens rings 81 may be rotated by means of these lens servomotors 83 and adjustments to the lens 59 may be made as a result. In particular, the lens ring driving unit 85 may be actuated remotely, so that the said lens parameters may be set or changed remotely.

In order to generate an image of incident light through the lens 59, the camera 23 further comprises an image sensor 95 arranged within the camera body 53. This image sensor 95 may be configured based on, for example, CMOS technology or CCD technology and comprise a plurality of light-sensitive sensor elements 55 or 61, which may be arranged in a plurality of rows and columns (cf. also FIG. 3). Furthermore, the camera 23 comprises a readout circuit 97 which is configured to read out, process and digitize the signals from the respective sensor elements 55 or 61 and to output them to or via a signal output 99. For this purpose, the readout circuit 97 may in particular comprise amplifiers, multiplexers, analog-digital converters, buffers and/or microcontrollers. Ultimately, an image data set B may thus be generated by the camera 23, which corresponds to the image 39 or an image of a field of view of the camera 23, and the image data set B may be output via the signal output 99. In order to check the field of view of the camera 23 and to be able to align the camera 23 onto a respective image section, a viewfinder 79 is also arranged on the camera body 53, through which a camera man can look through.

The virtual background 21 illustrated in FIG. 1A, displayed by the background display device 15 and recorded by means of the associated camera 23, represents a three-dimensional scene 43 that includes the exemplary four objects 91, 92, 93 and 94, three trees and a path. In order to generate the representation 19 of the virtual background 21, the background display device 15 comprises a light-source wall 33 which includes a plurality of light sources 34. The plurality of light sources in the embodiment of the background display device 15 illustrated in FIG. 1A, comprises a plurality of picture-element light sources 35 which are provided at a display surface 31 in a planar arrangement. The light sources 34 and in particular the respective picture-element light sources 35 may be individually controllable, whereby the picture-element light sources 35 emits respective picture-element light signals S from which the representation 19 of the virtual background 21 is generated. The three-dimensional scene 43 is thus displayed on the display surface 31 and in this respect at least in sections in two dimensions.

While the display surface 31, for example here, extends behind the real subject 17 in a vertical orientation and as a flat surface, the background display device 15 may in particular also extend around the real subject 17 and/or above the real subject 17, in particular in a horizontal orientation. The display surface 31 may extend flat in sections and/or curved in sections. For example, the display surface 31 may extend shaped as a circular arc in a vertical direction around the real subject 17. Furthermore, in particular, transition areas between sections in which the display surface 31 is vertically oriented and sections in which the display surface 31 is horizontally oriented and/or extends above the real subject 17 may be curved.

The picture-element light sources 35 are configured here, for example, as light-emitting diodes 38 which are arranged in a regular grid 36 on the display surface 31 of the background display device 15. The display surface 31 may thus in particular be formed by an LED-wall or an OLED-wall, wherein the light-emitting diodes 38 may in particular also be part of a liquid crystal display. Each picture-element light source 35 may be formed by a single light-emitting diode 38 or, for example, by a so-called RGB pixel, which comprises a unit of several light-emitting diodes of different colors. As an alternative to this, however, the picture-element light sources 35 may also be formed, for example, by points of light which are generated by reflection or transmission on the light-source wall 33. The display surface 31 may in particular be formed by a screen on which the representation 19 of the virtual background 21 is generated by means of rear projection.

Fundamentally, representations 19 of any virtual background 21 may be generated by means of such a background display device 15 in order to create an environment in the image recording studio 13, in which the recording should take place, or a respective scene should take place. For example, images 39 may thus be created in or in front of any landscapes, spaces or other surroundings in the virtual image recording studio 13. As a result, complete images 39 are already available after the recording, without a background having to be subsequently added, for example, as is the case with a recording in front of a green screen. In addition, the direct representation of the virtual background 21 may facilitate the acting, in that an actor may, for example, perceive events taking place in the virtual background 21 and react to them.

While the use of the background display device 15 to generate a representation 19 of the virtual background 21 in the virtual image recording studio 13 thus offers numerous possibilities to facilitate or improve the making of a recording, the problem here is that the three-dimensional scene 43 on the display surface 31 or by the planar arrangement of the picture-element light sources 35 may be reproduced, at least in sections, only two dimensionally. In particular, for changes in the position of the associated camera 23, for example, while the camera is being swiveled, the objects 91, 92, 93 and 94 of the virtual background 21 are therefore mostly not imaged by the camera 23 in the way an observer would expect for an imaging of a real background 20 corresponding to the virtual background 21 (cf. also with FIGS. 8A to 9F).

In order to address this problem and to be able to correct such effects, the background display device 15 is thus configured to display a plurality of predetermined optically detectable position markers 29. These position markers 29 make it possible to determine a position A of the associated camera 23, in particular relative to the background display device 15 or in a coordinate system defined with respect to the image recording studio 13 and/or the background display device 15. As will be explained in more detail below and in particular, in relation to FIGS. 5 to 7B and FIGS. 10A to 10C, this may take place, for example, by identifying the position markers 29 or imaged position markers 41 in the image 39 generated by the camera 23 or an auxiliary camera 27 connected to the camera 23 (cf. FIG. 2B). Knowing the position A of the associated camera 23, the representation 19 of the virtual background 21 can thereupon be adapted in such a way, for example, that the representation 19 of the virtual background 21 in the image 39 generated by the camera 23 is depicted as an observer would expect of an image of the real background 20 corresponding to the virtual background 21 (cf. FIGS. 8A to 9F).

In order to generate or display the position markers 29, the background display device 15, as shown in FIGS. 1A to 1C, may comprise a plurality of position marker light sources 37. In particular, these position marker light sources 37 may also be configured as light-emitting diodes 38, whereby it is also possible to generate the position markers 29 indirectly. For this purpose, the position marker light sources 37 may be generated, for example, via transmission or reflection on the background display device 15. For example, the position marker light sources 37 may be formed by respective light-outlet openings of light guides, via which the light-outlet openings communicate with light-generating sources, in particular with respective light-emitting diodes, arranged behind the display surface 31.

In the embodiment of the background display device shown in FIG. 1A, the plurality of light sources 34 thus comprises a plurality of picture-element light sources 35 and a plurality of position marker light sources 37, wherein the picture-element light sources 35 are provided for displaying the representation 19 of the virtual background 21, while the position marker light sources 37 generate the position marker 29. Fundamentally, however, it may also be provided for, that the plurality of light sources 34 are configured in the same way and each of the plurality of light sources 34 are configured to selectively generate a part of the representation 19 of the virtual background 21 or generate a position marker 29 or a part of a position marker 29. This is explained in more detail in particular with reference to FIGS. 10A to 10C, however, the division of the plurality of light sources 34 into picture-element light sources 35 and into position marker light sources 37 shown in FIGS. 1A, 1B and 1C, and also in the embodiments of the background display device 15 illustrated in these figures, is not mandatory.

The position markers 29 are thereby intended for the purpose of enabling the position A of the camera 23 to be determined, in that by the position markers 29 are optically detectable and identifiable in an image 39 by the background display device 15. The position markers 29 or the position marker light sources 37 thus serve exclusively to enable the position A of the associated camera 23 to be determined and do not contribute to the representation 19 of the virtual background 21. Rather, the position markers 29 may differ at least sufficiently clearly from the surrounding background regions 47, which are generated by the picture-element light sources 35, in order to enable an identification of the position markers 29.

In order to enable an identification of the position markers 29 or to be able to distinguish the position markers 29 in an image 39 of the representation of the virtual background 21, it may for example be provided for, that the position marker light sources 37 are configured to partially or completely emit light in a non-visible wavelength range. The division of light into visible and non-visible wavelength ranges pertains to the perception by the human eye. In the case of an emission in a non-visible wavelength range, in particular in an infrared and/or an ultraviolet wavelength range, the position markers 29 may therefore be detected by a suitable image sensor 95 of the camera 23 or the auxiliary camera 27 in order to enable a determination of the position A of the camera 23. The recording of the scene to be recorded in the image recording studio 13 by the associated camera 23, however, is not impaired by the generation of the position markers 29 and the position markers 29 displayed in a non-visible wavelength range do not have to be subsequently removed from the image 39 of visible light generated by the associated camera 23.

Alternatively, or in addition, it may be provided for, that the position marker light sources 37 are configured to emit light with an emission spectrum which differs at least partially from the emission spectra of the picture-element light sources 35. Thereby, the emission spectra of the position marker light sources 37 may, for example, extend to short and/or long wavelengths beyond the spectral end ranges of the emission spectra of the picture-element light sources 35. The position markers 29 may thereby be identified based on signals from respective sensor elements 55 or 61 of the image sensor 95 of the camera 23 or the auxiliary camera 27 that are sensitive in the end regions of the emission spectra of the position marker light sources 37. For example, the sensor elements 55 or 61 of the respective image sensor 95 may be provided with a color filter pattern, so that only some of the sensor elements 55 or 61 are sensitive in the respective end regions of the emission spectra and signals generated by the position markers 29 can be distinguished from the signals generated by the picture-element light sources 35.

Fundamentally, however, it is also possible for the position markers 29 to be generated in a visible wavelength range and without, in particular, significant spectral differences to the emission spectra of the picture-element light sources 35. Such position markers 29 may be recorded by means of the associated camera and, for example, be removed from the image 39 generated by the camera 23 in a subsequent image processing or during post-production. Alternatively, or in addition, the position marker light sources 37 and the picture-element light sources 35 may be operated, for example, alternately or intermittently, so that the position markers 29 are only displayed in individual frames and may be detected in the corresponding images 39. For this purpose, the control of the position marker light sources 37 and/or the picture-element light sources 35 may be synchronized in particular with the associated camera 23, in order to enable a display of the position markers 29 in respective frames. In particular, an emission time of the position marker light sources 37 may be shorter than an emission time of the picture-element light sources 35, whereby due to the short emission time, the position markers 29 are in particular not perceptible to the human eye. A disturbance for an actor by the intermittent generation of the position markers 29 may thereby be prevented.

As FIG. 1A shows, the position marker light sources 37 may be arranged, for example, within the regular grid 36 of the picture-element light sources 35 in place of respective picture-element light sources 35. Hereby, the number of picture-element light sources 35 that contribute to the representation 19 of the virtual background 21 may only be reduced slightly, since the number of position marker light sources 37 may be significantly less than the number of picture-element light sources 35. In this respect, such a replacement of individual or some picture-element light sources 35 by position marker light sources 37 may take place without a noticeable impairment to the representation 19 of the virtual background 21. Since both the picture-element light sources 35 and the position marker light sources 37 may be configured as light-emitting diodes 38, the generation of position markers 29 may moreover be achieved without any structural effort. With such an arrangement of the position marker light sources 37, in particular, individual picture-element light sources 35, which are already present, may be used as position marker light sources 37 and not for generating the representation 19 of the virtual background 21, but to display the position markers 29. In this respect, the position marker light sources 37 and the picture-element light sources 35 may in particular be configured identically and each of the plurality of light sources 34 may in addition be configured to selectively generate a part of the representation 19 of the virtual background 21 or generate a position marker 29 or a part of a position marker 29. In the case of a fundamentally conventional background display device 15, this may enable the position A of the associated camera 23 to be determined without structural adaptations to the background display device 15 being necessary.

As an alternative to this, as FIG. 1B shows, the position marker light sources 37 may be provided in a respective space between a plurality of the picture-element light sources 35 arranged in the regular grid 36. With such an arrangement, the attachment of the position marker light sources 37 is not accompanied by a reduction in the number of picture-element light sources 35, so that the attachment of the position marker light sources 37 may take place without any impairment to the representation 19 of the virtual background 21 by means of the picture-element light sources 35. In particular, when light in a non-visible wavelength range is emitted by the position marker light sources 37, the representation 19 of the virtual background 21 may thus be displayed by the background display device 15 in the same way as with a conventional background display device not having position markers. The position marker light sources 37 may, for example, be made smaller than the picture-element light sources 35 in order to be able to be inserted in spaces that are already present between the picture-element light sources 35, for example, in a center of a square formed by four picture-element light sources 35.

While the position marker light sources 37 are shown in FIG. 1B, for example, as light-emitting diodes 38, it may be provided for, in particular by such an arrangement of position marker light sources 37 between a plurality of picture-element light sources 35, that the position marker light sources 37 may be generated indirectly onto the display surface 31 or onto the light-source wall 33. For example, the position marker light sources 37 may be configured as light-outlet openings of light guides, by means of which light generated by one or more light sources or light sources arranged behind the display surface 31 or the light-source wall 33, is guided to the light-outlet openings and emitted therefrom. Such light-outlet openings may have in particular a smaller area than the light-generating light sources, for example light-emitting diodes, so that by means of such light guides the position marker light sources 37 may be arranged in small spaces between the picture-element light sources 35 and the representation 19 of the virtual background 21 may be generated with a unimpaired high density of picture-element light sources 35 and thus be generated with high resolution.

Furthermore, the position markers 29 may be generated, for example, in a predetermined marking pattern 30 in order to enable a simplified identification of the position markers 29 in an image 39 of the background display device 15. Position markers 29 generated with a diamond-shaped marking pattern 30 are shown by way of example in FIG. 1C. The individual position markers 29 may consequently be generated by a respective position marker light source 37 or by a plurality, here for example, four position marker light sources 37. As an alternative to such a diamond shape, for example, crosses, concentric circles, other polygons, in particular triangles, squares or hexagons, or other types of patterns are also possible. Furthermore, the marking patterns 30 may be formed in a single color, multicolor and/or with a color gradient or a wavelength gradient.

Particularly, in the case of an emission of light in the visible wavelength range by the position marker light sources 37, such marking patterns 30 may make it possible to identify the position markers 29 in an image 39 generated by the camera 23 and thereby determine the position A of the camera 23. For this purpose, for example, image analysis methods may be used, which may be configured to recognize the respective marking patterns 30, and/or may be conditioned to recognize these marking patterns 30 in an image 39. In addition to an easier identification of the position markers 29 to thus enable a determination of the position A of the associated camera 23, the position markers 29, which are easy to identify, may also be subsequently removed without any problems from the image 39 generated by the camera 23, so that the position markers 29 are ultimately no longer seen in the presented photo or the presented moving image sequence. For example, interpolation methods based on edge detection may be provided for this purpose. Fundamentally, however, the position markers 29 may also be displayed as marking patterns 30 when generated in a non-visible wavelength range, in order to facilitate an identification in an image 39, and to exclude an incorrect identification due to any background radiation. Therefore, the position markers 29 may be displayed in particular as marking patterns 30, if the plurality of light sources 34 is configured so as to display selectively a part of the representation 19 of the virtual background 21 or a position marker 29 or a part of a position marker 29.

While all the position markers 29 are displayed in a diamond shape in FIG. 1C, it may also be provided for, that the position markers 29 or the marking patterns 30 differ from one another. In this respect, a set of marking patterns 30 may be stored in a memory of the background display device 15, wherein the position markers 29 may be generated selectively as a respective marking pattern 30 from the set of marking patterns 30. In this way, for example, a respective position marker 29 may be clearly identified in the image 39 generated by the camera 23 or the auxiliary camera 27. In addition, for example, position markers 29 with an associated marking pattern 30 may be generated in a defined region of the background display device 15, so that, based on the respective position markers 29 identified in the image 39, a field of view and/or an orientation of the camera 23 may be deduced.

FIGS. 1D and 1E show a respective schematic partial view of embodiments of the background display device 15, in which the background display device 15 comprises a plurality of display modules 123. The display modules 123 adjoin one another at lateral edges 125 in order to form the background display device 15 and enable an uninterrupted display of the virtual background 21. For this purpose, the display modules 123 are arranged in a regular grid, here along rows and columns, so that the display modules 123 form an essentially seamless two-dimensional arrangement. The display modules 123 are flat and, in the embodiments shown, are configured as square-shaped panels, which may also be referred to as tiles. Fundamentally, however, other shapes for the display modules 123 are also possible, which for example may be configured rectangular or polygonal, in particular hexagonal.

Each of the plurality of display modules 123 comprises a portion of the plurality of picture-element light sources 35 which generate the representation 19 of the virtual background 21 and are arranged in the regular grid 36 already described (cf. FIGS. 1A to 1C). In addition, position marker light sources 37, by means of which the position markers 29 may be generated, are arranged at the lateral edges 125 of the display modules 123. In the embodiment shown in FIG. 1D, the position marker light sources 37, similar to FIG. 1A, are arranged in the regular grid 36 of the picture-element light sources 35, so that, for example, conventional light sources provided at the lateral edges 125 of the display modules 123 as picture-element light sources 35 for generating the representation 19 of the virtual background 21 may be used as position marker light sources 37 for generating the position markers 29.

In the embodiment shown in FIG. 1E, the position marker light sources 37 are also provided at the lateral edges 125 of the display modules 123, but between two picture-element light sources 35 arranged in the regular grid 36 (see also FIG. 1B). For this purpose, the position marker light sources 37 may in particular be configured as light-outlet openings of light guides, which may have a smaller space requirement on the display modules 123 than the picture-element light sources 35 configured, for example, as light-emitting diodes. This may make it possible to retrofit in a simple manner already existing background display devices 15 or display modules 123 forming a background display device 15, in order to generate position markers 29 by means of the position marker light sources 37 provided at the lateral edges 125 of the display modules 123 and to be able to determine the position A of the associated camera 23.

Fundamentally, different or the same number of position marker light sources 27 may be provided on different display modules 123. It is also possible that the background display device 15 comprises individual display modules 123 at which no position marker light sources 37 are provided. Moreover, the representations in FIGS. 1D and 1E only serve to illustrate in principle a structure of the background display device 15 made up of a plurality of display modules 123, whereby a single display module 123 may comprise in particular a significantly higher number of picture-element light sources 25 than is shown in FIGS. 1D and 1E. Furthermore, the ratio between the picture-element light sources 35 and the position marker light sources 37 of a display module 123 and/or the background display device 15 may be greater than that shown in FIGS. 1D and 1E.

Fundamentally, it may be provided for, that the position markers 29 are detected by means of the associated camera 23 or in an image 39 generated by the associated camera 23, by means of which the scene to be recorded in the image recording studio 13 is also recorded. As an alternative to this, FIG. 2B shows a camera system 24 which, as already mentioned, in addition to the associated camera 23 or the main camera 23 comprises an auxiliary camera 27 which is or may be connected to the main camera 23 via a coupling rod 89. The auxiliary camera 27 is arranged at a defined position relative to the camera 23 and is oriented in such a way, that the respective fields of view of the main camera 23 and the auxiliary camera 27 essentially correspond to one another.

In particular, the auxiliary camera 27 may in addition be configured to detect light in a non-visible wavelength range, in particular in an infrared and/or an ultraviolet wavelength range, in order to be able to detect position markers 29 generated in this wavelength range. For this purpose, the auxiliary camera 27 also comprises an image sensor 95 which may include auxiliary sensor elements 55 which are sensitive to light in the non-visible wavelength range (cf. also FIG. 3). The auxiliary camera 27 also comprises a readout circuit 97 in order to be able to read out, process and/or digitize the signals generated at the image sensor 95, wherein an image data set B corresponding to an image 39 generated by the auxiliary camera 27 may be output to or via a signal output 99 of the auxiliary camera 27.

In particular, such a camera system 24 can make it possible to detect position markers 29 generated in a non-visible wavelength range by means of the auxiliary camera 27 and to determine the position A of the main camera 23 therefrom, in particular based on a respective location L1 or L2 of the position markers 29 or the imaged position markers 41 in the image 39 generated by the auxiliary camera 27. In addition, for example, the position of the auxiliary camera 27 may first be determined, whereupon based on the defined relative position of the auxiliary camera 27 to the camera 23, the position A of the camera 23 may then be directly deduced. Alternatively to this, the locations L1 and L2 of the position markers 29 imaged by the auxiliary camera 27, within the image 39, may at first be transferred by means of a parallax correction in the respective locations L1 and L2, which would be expected for an imaging of the position markers 29 at the position A of the main camera 23, in order to directly determine the position A of the main camera 23 based on these locations L1 and L2. The auxiliary camera 27 may, for example, be connected to the camera body 53 of the camera 23 by means of the coupling rod 89 by means of a rotary, plug-in and/or rotary-plug connection, wherein the achieving of the defined position may be, for example, optically and/or haptically perceived.

Fundamentally, the auxiliary camera 27 or its image sensor 95 may also be configured to detect light, at least partially or in sections, in the visible wavelength range. For example, the image sensor 95 of the auxiliary camera 27 may comprise individual auxiliary sensor elements 55 which are light-sensitive in the visible wavelength range. By comparing the images 39 generated by the auxiliary camera 27 and the main camera 23, for example, a relative alignment between the auxiliary camera 27 and the main camera 23 may be determined, whereby in particular relative rotations between the auxiliary camera 27 and the main camera 23 may be recorded and may be taken into account when determining the position A of the camera 23.

Since the auxiliary camera 27 may thus primarily, in particular exclusively, be intended for determining the position A of the camera 23, the image sensor 95 of the auxiliary camera 27 may in particular have a lower spatial resolution than the image sensor 95 of the main camera 23. Consequently, fewer sensor elements 55 per unit length or per unit area may be provided on the image sensor 95 of the auxiliary camera 27 than on the image sensor 95 of the main camera 23. Such an auxiliary camera 27 may thus enable the position A of the camera 23 to be determined in a relatively inexpensive manner, without having to make changes to the main camera 23 or its image sensor 95. Furthermore, by detecting position markers 29 generated in a non-visible wavelength range by means of the auxiliary camera 27, the recording in the image recording studio 13 may take place as usual by means of the unaltered main camera 23 and without any impairment. Also, subsequent removal of the position markers 29 from the image 39 generated by the main camera 23 is not necessary.

FIG. 3A shows an embodiment of the image sensor 95 of the associated camera 23, by means of which position markers 29 generated in the non-visible wavelength range enable detection even when the camera 23 is used exclusively. The image sensor 95 comprises, in a central area, a main sensor area 69 having a plurality of main sensor elements 55 which are arranged in several rows and columns. These main sensor elements 55 may be sensitive in the visible wavelength range and serve to generate the image 39 of the representation 19 of the virtual background 21 or the scene to be recorded in the image recording studio 13.

In other embodiments of the associated camera 23, the respective image sensor 95 may in particular be configured similarly to this main sensor area 69 with main sensor elements 55 arranged in rows and columns. The image sensor 95 of the auxiliary camera 27 may also be configured in accordance with the main sensor area 69, wherein the auxiliary sensor elements 55 of this image sensor 95 may be sensitive in a non-visible wavelength range.

The image sensor 95 shown in FIG. 3A, however, comprises, in addition to the main sensor area 69, a supplementary sensor area 63 which is arranged outside the main sensor area 69 and surrounds the main sensor area 69 frame-like. The supplementary sensor area 63 thus joins the respective outer edges of the main sensor area 69. The supplementary sensor area 63 includes a plurality of supplementary sensor elements 61 which are light-sensitive to non-visible wavelengths.

Such an image sensor 95 therefore makes it possible using the signals of the main sensor elements 55 to generate an image data set B which represents the image 39 of the representation 19 of the virtual background 21 in wavelengths that are perceptible or visible to the human eye. In addition, however, the signals from the supplementary sensor elements 61 may be used to generate an image data set B in which the position markers 29 generated in a non-visible wavelength range may be identified, in order to be able to determine the position A of the camera 23 from this image data set B. Also in this case, a determination of a position may therefore take place without the recording in the virtual image recording studio 13 being impaired by the generation of the position markers 29. Fundamentally, the data from the main sensor elements 55 and the supplementary sensor elements 61 may also be summarized and/or processed in a common image data set B, in particular by a common readout circuit 97.

Since also the supplementary sensor elements 61 are only provided to determine the position A of the camera 23 or to detect the position markers 29, the spatial resolution in the supplementary sensor area 63 may be lower than in the main sensor area 69. Consequently, fewer supplementary sensor elements 61 may be provided per unit length or per unit area than main sensor elements 55 per unit length or per unit area. Furthermore, the supplementary sensor area 63 may directly join the main sensor area 69, wherein with a slight distance between the supplementary sensor area 63 and the main sensor area 69, in particular due to the manufacturing process. Moreover, the supplementary sensor elements 61 may be configured to be larger or have a larger area than the main sensor elements 55.

Furthermore, the main sensor elements 55 in particular—also in embodiments of the image sensor 95 that have only one main sensor area 69—may be provided with a color filter array (CFA) so that the main sensor elements 55 may be configured with different spectral sensitivities. Such a color filter pattern may be an integral part of the image sensor 95. As an alternative to configuring the image sensor 95 with a main sensor area 69 and a supplementary sensor area 63, it may also be provided for, in the case of an image sensor 95 without a supplementary sensor area 63, that individual sensor elements 55 may be provided with a predetermined color filter pattern that differs from the other sensor elements 55, in order to, for example, be able to detect position markers 29 generated in a specific emission spectrum and/or in a non-visible wavelength range. As already explained, the position marker light sources 37 may, for example, be configured to emit light with a different emission spectrum than the picture-element light sources 35, so that, for example, an emission spectrum of the position marker light sources 37 may extend to short and/or long wavelengths beyond the emission spectrum of the picture-element light sources 35. While, for example, individual sensor elements 55 may be sensitive in the respective wavelength ranges only attained by the position marker light sources 37, position markers 29 generated in this way may also be identified in a simple manner in the image 39 generated by the associated camera 23.

FIG. 3B shows a further embodiment of an image sensor 95 of the associated camera 23, wherein this image sensor 95 comprises a rectangular sensor area 113 arranged in a central area, in which a plurality of light-sensitive sensor elements 108 are arranged in rows and columns. These sensor elements 108 are thereby configured to generate a first part of image-element signals which correspond to an image 119 of a recording field of view 109 of the associated camera 23 and to output them as recording image data (cf. also FIGS. 10A to 10C). By means of the sensor elements 108 arranged in the rectangular sensor area 113, which are particularly sensitive in the visible wavelength range, an image 119 may be created in a format intended for recording the scene in the image recording studio 13. Subsequently, the recording image data generated by the sensor elements 108 may, for example, be permanently stored in the associated camera 23 or output to an external recorder and stored there, and thus represent the ultimately desired image 119 of the recording field of view 109 of the associated camera which is generated by the associated camera 23.

In addition to the sensor elements 108, the image sensor 95 shown in FIG. 3B, includes, however, further light-sensitive sensor elements 107, which are configured to generate a second part of image-element signals which correspond to an image 121 of an observation field of view 111 adjacent to the recording field of view 109 of the associated camera 23 (see FIGS. 10A to 10C). Here, the rectangular sensor area 113 comprises, for example, four edges 117, whereby the sensor elements 107 are arranged adjacent to these four edges 117 and surrounds the rectangular sensor area 113 frame-like. The sensor elements 107 thereby form a over-scan area 115, which to some extent expands the rectangular sensor area 113 outwards. These sensor elements 107, arranged outside the rectangular sensor area 113, may also be sensitive in particular to visible wavelengths. However, the image-element signals of the sensor elements 107 do not contribute to the image 119 of the recording field of view 109 of the associated camera 23. The sensor elements 108 and the sensor elements 107 may be identical to one another, apart from the spectral sensitivity (for example, due to an RGB color filter pattern). An existing color filter pattern may continue beyond the rectangular sensor area 113 into the over-scan area 115.

Such an image sensor 95 with an over-scan area 115 makes it possible, in particular, to detect position markers 29 generated in the visible wavelength range by means of the sensor elements 107 arranged in the over-scan area 115 and to identify them in an image 121 of the observation field of view 111 of the associated camera 23 generated by the sensor elements 107, in order to be able to determine the position A of the associated camera 23 based on the locations L1, L2, L3 and L4 of the position markers 29 within the image 121 of the observation field of view 111. In particular, the position A of the associated camera 23 may thereby be determined based on data generated by the associated camera 23 itself, whereby the recording is not being impaired by the position markers 29 generated in the visible wavelength range. Since the position markers 29 only lie in the observation field of view 111 of the camera 23 and are imaged by means of the sensor elements 107, the position markers 29 may not be seen in the image 119 of the recording field of view 109, so that, in particular, the position markers 29 must not be subsequently removed from the image 119 (cf. FIGS. 10A to 10C).

In particular, the division of the sensor elements 107 and 108 may be variable in respect of the central rectangular sensor area 113 which creates the image of the recording field of view 109 of the associated camera 23, and in respect of the over-scan area 115. Here, the rectangular sensor area 113 may in particular be adaptable to different formats, so that the associated camera 23 may be flexibly used. Correspondingly, for different recordings, a different number of sensor elements 107 may be assigned to the rectangular sensor area 113 and a different number of sensor elements 108 may be assigned to the over-scan area 115. Furthermore, it may be provided for, that only the recording field of view 109 of the associated camera 23 is displayed on the viewfinder 79 of the associated camera 23, or the entire field of view of the camera 23 with the recording field of view 109 and the surrounding observation field of view 111 may be displayed on the viewfinder 79 (see also FIG. 2A). In order to enable the viewfinder 79 to distinguish between the recording field of view 109 of the associated camera 23 and its observation field of view 111, the recording field of view 109 may in particular be displayed surrounded by a frame (cf. also FIGS. 10A to 10C).

FIGS. 4A to 4D show further schematic views of the virtual image recording studio 13 or the recording system 10 to illustrate the determination of the position A of the camera 23 and the control of the background display device 15 in dependence on the position A of the camera 73.

For this purpose, the associated camera 23 shown in FIG. 4A is initially connected to a control device 25 of the background display device 15 via the signal output 99 and is configured to transmit camera data D to the control device 25. The transmission of the camera data D may take place, for example, in a wired or wireless manner, in particular, via a Wi-Fi/WLAN connection, a Bluetooth connection and/or a mobile wireless connection. The camera data D may represent in particular a respective location L1 or L2 of the imaged position markers 41 within the image 39 generated by the camera 23 (cf. also FIG. 5). The locations L1 and L2 may, for example, be contained in the camera data D as respective coordinate tuples Y1 and Z1 or Y2 and Z2, or the camera data D may include the image data set B corresponding to the image 39, from which the coordinates Y1 and Z1 or Y2 and Z2 of the imaged position markers 41 may be determined. Here, the position markers 29 and the associated camera 23 or its image sensor 95 are thus coordinated with one another in such a way, that the associated camera 23 may image the position markers 29.

According to the representation in FIG. 4A, the control device 25 comprises a position-determining device 57, which is shown as an integral part of the control device 25. Fundamentally, however, the position-determining device 57 may also be configured as a separate unit and be connected to the control device 25. The position-determining device 57 is configured to determine the position A of the camera 23 based on the locations L1 and L2 of the imaged position markers 41 in the image 39 generated by the camera 23, and to transmit corresponding position data P to the control device 25 or to transmit provided components of the control device 25 for controlling the background display device 15. For this purpose, the position-determining device 57 may comprise, in particular, a microprocessor, a CPU and/or a GPU. The control device 25 may also comprise a microprocessor, a CPU and/or a GPU, wherein the hardware components of the position-determining device 57 and the control device 25 may in particular correspond to one another when the position-determining device 57 is integrated into the control device 25.

One possibility of determining the position A of the camera 23 by means of the position-determining device 57 based on the locations L1 and L2 of the imaged position markers 41 within the image 39 generated by the associated camera 23, is explained below with reference to FIGS. 5 to 7B. The determining of the position is explained by way of example for only two position markers 29, whereby fundamentally, more than two position markers 29, in particular three, four, five, six, seven, eight or more than eight position markers 29 may be used to determine position A of the associated camera 23.

In order to determine the position A of the camera 23, the locations L1 and L2 of the imaged position markers 41 in the image 39 may first be determined as respective coordinate tuples Y1 and Z1 or Y2 and Z2. The image 39 represent in particular a projection of a frustum of the camera 23 on its image sensor 95. The determination of the locations L1 and L2 may take place, for example, directly in the camera 23, so that the locations L1 and L2 or the coordinate tuples Y1 and Z1 and Y2 and Z2 may be transmitted, as part of, or as the camera data D to the control device 25 or to the position-determining device 57. Alternatively, the camera data D may include the image data set B generated by the camera 23 corresponding to the image 39, and the position-determining device 57 may be configured to identify the imaged position markers 41 in the image data set B corresponding to the image 39 and to determine their locations L1 and L2. This may take place, for example, by means of an image recognition method or an image analysis method. In order to facilitate such an identification, the position markers 29 may be generated, for example, with the predetermined marking pattern 30 (cf. FIG. 1C). The coordinates Y1, Y2, Z1 and Z2 may be specified or determined, in particular, in a two-dimensional coordinate system within a plane defined by the image sensor 95, wherein a center point 96 of the image sensor 95 may form the origin of this coordinate system.

As FIG. 6A illustrates, based on the locations L1 and L2 of the imaged position markers 41, a respective direction R1 or R2 may be determined, in which the corresponding position markers 29 are arranged on the background display device 15 relative to a light-inlet opening 67 representing the position A of the camera 23. For simplicity, the camera 23 is represented here with only one light-inlet opening 67, wherein the camera 23 and also the auxiliary camera 27 fundamentally may include different optical elements such as lenses, mirrors, reflectors and/or filters.

In order to be able to consider such a more complex optical system of the camera 23 when determining its position A in space, the position-determining device 57 may in particular be configured to receive information about the optical system and to use it when determining the position A of the camera 23. In particular, the optical system settings, such as setting a focus position, a focal length, a zoom factor and/or a diaphragm aperture (iris aperture), may be transmitted as part of the camera data D in real time to the position-determining device 57 and may be taken into account when determining the position of the associated camera 23 and in particular the directions R1 and R2. Such settings may in particular influence a frustum of the camera 23, so that the locations L1 and L2 of the imaged position markers 41 may depend on both the position A of the camera 23 and the settings of the optical system. Taking into account the setting of the optical system in real time may thus make it possible to reliably determine the position A of the camera 23 even when the settings of the optical system change during a recording.

Furthermore, in FIGS. 6A to 7B only the imaged position markers 41 are marked on the image sensor 95. While the image sensor 95 of the camera 23 fundamentally also images the representation 19 of the virtual background 21, in particular when using the auxiliary camera 27 to determine the position A of the camera 23 and/or to generate the position markers 29 in a non-visible wavelength range on the corresponding image sensor 95, if necessary, only the position markers 29 are actually imaged.

In order to determine the directions R1 and R2, in particular respective center point rays 71 and 72 which, starting from the position markers 29 enter in a straight line through the light-inlet opening 67 and hit the image sensor 95, may be compared with a center point ray 70 hitting the center point 96 of the image sensor 95 or with the optical axis 101 of the camera 23 (cf. also FIG. 6B to 7B). Fundamentally, such center point rays 70, 71 and 72 run in a straight line through the center point of the optical system of the camera 23, which is shown here for simplicity as the light-inlet opening 67. Even with a more complex design of the camera 23, in particular having a lens system, however, such a center point of the optical system may be determined, in particular when information about the optical system is taken into account and is considered when determining the directions R1 and R2.

The distance 73 between the light-inlet opening 67 or a center point of the optical system of the camera 23 and the image sensor 95 may be known as coordinate X1 in a coordinate system x, y and z defined with respect to the camera 23. The y and z axes of the coordinate system may, for example, extend in a plane defined by the image sensor 95, while the x axis may correspond to the optical axis 101 of the camera 23 (or the auxiliary camera 27 in other embodiments). The directions R1 and R2 thus result from the locations L1 and L2 of the imaged position markers 41 as respective vectors R1=(X1, −Y1, −Z1) and R2=(X1, −Y2, −Z2).

As FIG. 6B illustrates, the position A of the camera 23 may thereupon be calculated in a coordinate system x, y and z defined with respect to the background display device 15 or the image recording studio 13. This coordinate system x, y, z may be defined, for example, in such a way that the origin U lies in the center point of the display surface 31 of the background display device 15.

In order to determine the position A of the associated camera 23 as a three-dimensional position with x, y and z coordinates, the position-determining device 57 may be configured to calculate the position A as the point of intersection of two straight lines 71 and 72 going out from the position markers 29 along the determined directions R1 and R2 and corresponding to the central point rays 71 and 72. In doing so, the coordinates Y1 and Z1 or Y2 and Z2 of the position markers 29 in the coordinate system x, y and z defined with respect to the background display device 15, may be known, so that for determining the position of the camera 23, the straight line 71 going out from the position (0, Y1, Z1) in direction−(minus) R1 may be intersected with the straight line 72 going out from the position (0, Y2, Z2) in direction−(minus) R2.

While the position A of the camera 23 fundamentally may be determined as the intersection point of the two straight lines 71 and 72, the determined straight lines 71 and 72 may run skewed to one another, for example due to measurement errors in the determination of the locations L1 and L2 of the imaged position markers 41, wherein the position-determining device 57 may be configured to determine the position A of the camera 23 as the point at which the two straight lines 71 and 72 have the smallest distance from one another. For this purpose, the position-determining device 57 may be configured, for example, to carry out regression methods, in particular when using more than two position markers 29 to determine the position A of the associated camera 23. Alternatively, or additionally, the position-determining device 57 may also be configured to determine the position A of the camera 23 by triangulation methods, for which purpose, for example, the distance between the position markers 29 is used as the base length and respective angles between the center point rays 71 and 72 and the optical axis 101 of the camera 23 may be determined from the directions R1 and R2.

Furthermore, as an alternative to calculating the position A of the associated camera 23, it may be provided for, that the position-determining device 57 is configured to read out from a look-up table the position A of the associated camera 23 in dependence on the locations L1 and L2 of the imaged position markers 41 within the image 39. For this purpose, the control device 25 or the position-determining device 57 may in particular be connected to a memory 45 in which a look-up table of this type may be stored (cf. FIGS. 4A to 4D).

While the center point 75 of the background display device 15 in FIGS. 6A and 6B is aligned along the optical axis 101 of the camera 23, going out from the center point 96 of the image sensor 95 of the associated camera 23, FIG. 6C illustrates the determining of the position A of the camera 67 after a displacement of the camera 23 along the y-axis in the coordinate system x, y and z established with respect to the background display device 15. In comparison with FIGS. 6A and 6B, the position markers 29 are imaged in other locations L1 and L2, so that accordingly other directions R1 and R2 may be determined. Again, the position A of the associated camera 23 may be determined by the intersection of respective straight lines 71 and 72 going out from the position markers 29 along the directions R1 or R2.

In FIGS. 6A to 6C, the image sensor 95 of the camera 23 is aligned parallel to the display surface 31 of the background display device 15, so that the directions R1 and R2 determined in the coordinate system x, y, z defined with respect to the camera 23 or the image sensor 95, may be transmitted directly in the coordinate system x, y, z defined with respect to the background display device 15 or the image recording studio 13. FIG. 7A, on the other hand, illustrates a situation in which the camera 23 or the image sensor 95 is rotated about the z-axis relative to the background display device 15 or the display surface 31. In this respect, the axes, here the x' axis and the x axis, of the coordinate system x', y' and z' defined with respect to the camera 23 and the coordinate system x, y and z defined with respect to the background display device 15 or the image recording studio, do not run parallel to one another unlike in FIGS. 6A to 6C. Therefore, the directions R1 and R2 determined in the coordinate system x', y' and z' may not readily be used, in order to calculate the position A of the camera 23 in the coordinate system x, y, z.

In order to consider such rotations of the camera 23 and still be able to determine its position A, as FIG. 4A shows, the camera 23 comprises a measurement device 77 which is configured to determine the alignment of the associated camera 23 and in particular any rotational or tilted positions of the camera 23. For this purpose, the measurement device 77 may comprise, for example, an incremental rotary encoder and/or a static acceleration sensor. The orientation of the camera 23 may be transmitted as part of the camera data D to the control device 25 or the position-determining device 57, so that the position A of the associated camera 23 may be determined taking into consideration such a rotation and coordinate system x, y and z defined with respect to the background display device 15 or the image recording studio 13. Fundamentally, as an alternative to determining the rotational positions or tilted positions of the associated camera 23 by means of a measurement device 77, it may be provided for, to also determine the rotational positions or tilted positions based on the locations L1 and L2 of the imaged position markers 41 within the image 39, however, for this purpose a larger number of imaged position markers 41 is required as shown here by way of example.

In order to be able to determine the position A of the camera 23 in the coordinate system x, y, z, the directions R1' and R2' determined in the rotated coordinate system x', y' and z' may, for example, be transferred by multiplication with a rotation matrix to the coordinate system x, y, z defined with respect to the background display device 15 or the image recording studio 13. To some extent, it results due to a computation, in a situation shown in FIG. 7B, in which the image sensor 95 is aligned parallel to the display surface 31. By intersecting the straight lines 70 and 71, which run along the directions R1 and R2 transformed to the coordinate system x, y, z, the position A of the camera 23 may be determined accordingly in this coordinate system x, y, z.

While the determination of the position A of the associated camera 23 by means of the position-determining device 57 may be based on such geometrical considerations, fundamentally it may be provided for, that the position-determining device 57 is configured to solve systems of equations resulting from these geometrical considerations. These may be stored in the memory 45, for example, as calculation rules, in particular, in a form that has already been solved as far as possible. Thereby, the locations L1 and L2 of the imaged position markers 41 may be applied as parameters in such calculation rules, wherein the position A of the camera 23 may thereupon be determined by one or more computational steps by the position-determining device 57.

Furthermore, the control device 25 may be configured to change positions 103, 104, 105 and 106 of the position markers 29 on the background display device 15 in dependence on the camera data D. In particular, the control device 25 may be configured to change the positions 103, 104, 105 and 106 of the position markers 29 on the background display device 15 in dependence on the locations L1, L2, L3 and L4 of the position markers 29 within the image 39 generated by the associated camera 23. The positions 103, 104, 105 and 106 of the position markers 29 may be changed in particular during the recording, in such a way, that the position markers 29 are tracked to the field of view of the associated camera 23, so that the position markers 29 may always be imaged by the associated camera 23 in order to enable a determining of the position A of the camera 23 (cf. FIGS. 10A to 10C).

FIGS. 10A to 10C illustrate such a control of the background display device 15 during a camera pan from the object 91 of the virtual background 21 to the actor 17, whereby the associated camera 23 generates or records a moving picture sequence having a plurality of images 39. The associated camera 23 has in particular the image sensor 95 illustrated in FIG. 3B which has a rectangular sensor area 113 for imaging a recording field of view 109 of the associated camera 23 and an over-scan area 115 surrounding the rectangular sensor area 113 for imaging an observation field of view 111 which lies outside the recording field of view 109 of the associated camera 23. The image 39 generated by the associated camera 23 thus includes an image 119 of the recording field of view 109, in which in particular, the scene to be recorded is imaged in an intended format. In particular, solely this image 119 may be stored permanently in the camera 23 or in a recorder (not shown) connected to the camera 23. In addition, however, an image 121 of the observation field of view 111 of the associated camera 23 is generated by means of the sensor elements 107, within which the position markers 29 may be detected, in order to be able to determine the position A of the associated camera 23 by means of the position-determining device 57 based on their locations L1, L2, L3 and L4.

As FIG. 10A shows, at the beginning of the camera panning, the position markers 29 arranged at respective positions 103, 104, 105 and 106 on the background display device 15. The position markers 29 lie within the observation field of view 111 of the associated camera 23, however, not within the recording field of view 109. Consequently, light emitted from the respective light sources 34, which generate the position markers 29, hits the sensor elements 107 at positions 103, 104, 105 and 106 of the over-scan area 115 of the image sensor 95, so that the position markers 29 are detected in the image 121 of the observation field of view 111, but not in the image 119 of the recording field of view 109. Based on the camera data D transmitted by the associated camera 23 or the locations L1, L2, L3 and L4 of the imaged position markers 41 in the image 121, as explained above, the position A of the associated camera 23 in space may then be determined by the position-determining device 57. Here, in FIGS. 10A to 10C only the imaged position markers 41 are shown in the respective images 121 of the observation field of view 111 of the associated camera 23, while in the images 121 fundamentally, part of the representation 19 of the virtual background 21 or of the real subject 17 lying within the observation field of view 111 may also be imaged.

Since the control device 25 is now configured to change the positions 103, 104, 105 and 106 of the position markers 29 on the background display device 15 in dependence on the camera data D, the position markers 29 may be tracked in particular to the field of view 111 of the associated camera 23. As FIG. 10B shows, the field of view of the associated camera 23 and thus its recording field of view 109 and observation field of view 111 change during the panning of the camera. Due to this movement of the camera 23, fundamentally, the locations L1, L2, L3 and L4 also change within the image 121. The control device 25 may change the positions 103, 104, 105 and 106 of the position markers 29, as shown in FIG. 10A, in dependence on the camera data D in such a way, that the position markers 29 arranged at positions 103', 104', 105' and 106' for the alignment of the associated camera 23 shown in FIG. 10B, lie again in the observation field of view 111, but not in the recording field of view 109 of the associated camera 23. Consequently, the position markers 29 may also be detected by the sensor elements 107 of the over-scan area 115 of the image sensor 95 for a change in the alignment of the associated camera 23 (cf. FIG. 3B).

In order to be able to track the position markers 29 to the field of view or the observation field of view of the associated camera 23, the control device 25 and/or the position-determining device 57 connected to the control device 25 may be configured to determine the locations L1, L2, L3 and L4 of the position markers 29 and/or to determine changes in these locations L1, L2, L3 and L4 in successive images 39 or 121 based on the received camera data D in real time. The positions 103, 104, 105 and 106 of the position markers 29 on the background display device may then be changed in such a way, that the position markers 29 of the associated camera 23 are tracked. In particular, the control device 25 and/or the position-determining device 57 may use or execute an image analysis method, in order to identify the imaged position markers 41 in the image 121 of the observation field of view 111 of the camera 23. Furthermore, the position markers 29 generated at changeable positions 103, 104, 105 and 106 may be generated as marking patterns 30, so that the identification of the imaged position markers 41 in the image 121 may be facilitated. By way of example, the position markers 29 are generated as squares in FIGS. 10A to 10C.

Also, in FIG. 10B, the position A of the associated camera 23 may thus be determined by the position-determining device 57 based on the image data generated by the sensor elements 107 or based on the locations L1, L2, L3 and L4 of the imaged position markers 41 within the image 121 of the observation field of view 111. On the other hand, the image 119 of the recording field of view 109 generated by the associated camera 23 is not impaired by the position markers 29 generated also as a result of the movement of the camera 23 from FIG. 10A to FIG. 10B, since the position markers 29 are always located outside the recording field of view 109 of the camera 23. Furthermore, the control device 25 may be configured to transmit in real time the changed positions 103', 104', 105' and 106' of the position markers 29 on the background display device 15 to the position-determining device 57, so that the position-determining device 57 may always take into consideration the current or where appropriate changed positions 103', 104', 105' and 106' when determining the position A of the associated camera 23.

As FIG. 10C shows, during the subsequent movement of the associated camera 23, the positions 103', 104', 105' and 106' of the position markers 29 may also be changed by means of the control device 25 in such a way, that the position markers 29 arranged at the positions 103", 104", 105" and 106" in FIG. 10C, in turn lie in the observation field of view 111 of the associated camera 23, not however, in the recording field of view 109. The position markers 29 may thus be detected by the sensor elements 107 of the over-scan area 115 of the image sensor 95 of the associated camera 23 during the entire camera panning, while the image 119 of the recording field of view 109 of the associated camera 23 generated by the sensor elements 108 arranged in the rectangular sensor area 113 is completely unaffected by the position markers 29.

In particular, such a control of the background display device 15 in combination with the associated camera 23, which comprises an image sensor 95 having an over-scan area 115, may enable the position markers 29 to be generated in the visible wavelength range without the intended recording of the scene by means of the associated camera 23 being impaired or that the position markers 29 need to be subsequently removed from the image 119 of the recording field of view 109 of the associated camera 23. The background display device may comprise in particular a plurality of light sources 34 which are configured to selectively generate the representation 19 of the virtual background 21 or a part thereof or generate a position marker 29 or a part of a position marker 29. The position markers 29 may be displayed to some extent as an overlay of the representation 19 of the virtual background 21, wherein the control device 25 may be configured to control a respective selection of light sources 34 for generating position markers 29 in dependence on the camera data D, so that the position markers 29 lie in the observation field of view 111 of the associated camera 23, not however, in its recording field of view 109. To change the position 103, 104, 105 or 106 of a position marker 29, the control device may change in particular the selection of light sources 34 which are used to generate the respective position marker 29. Light sources 34 previously used to generate the position marker 29 may thereupon be immediately involved again in the representation 19 of the virtual background 21, so that, for example, the light sources 34 in FIG. 10B generating the position markers 29 in FIG. 10A are involved in the representation 19 of the virtual background 21.

Ultimately, the said combination of such a background display device 15 with an associated camera 23, which comprises an image sensor 95 with an over-scan area 115, enables the position A of the associated camera 23 to be determined without any structural effort. Rather, for a fundamentally conventional background display device 15 which includes a plurality of light sources 34, a control device 25 may be provided in order to use some of the light sources 34, not for the representation 19 of the virtual background 21, but for generating position markers 29, and to track the position markers 29 to the observation field of view 111 of the associated camera 23. This allows the position A of the associated camera 23 to be easily determined and by position markers 29 generated in the visible wavelength range on the background display device, without these visible position markers 29 impairing the image 119 of the scene in the image recording studio 13 generated by the associated camera 23.

As an alternative to determining the position A of the associated camera 23 based on an image 39 generated by the camera 23, as shown in FIG. 4B instead of solely using the main camera 23, the camera system 24 may also be provided for determining the position A, wherein the auxiliary camera 27 connected to the main camera 23 may be configured to transmit camera data D to the control device 25 of the background display device 15 or to the position-determining device 57. Here, for example, as explained above, a position of the auxiliary camera 27 may first be determined by the position-determining device 57 based on the locations L1 and L2 of the position markers 29 in the image 39 generated by the auxiliary camera 27, from which, based on the position of the auxiliary camera 27 defined relative to the main camera 23, the position A of the camera 23 may be directly determined. As an alternative to this, specified locations L1 and L2 in the image 39 generated by the auxiliary camera 27, may first be transferred by means of a parallax correction to locations L1 and L2 expected for an image taking place at the position A of the main camera, in order to be able to directly determine the position A of the main camera 23 based on these transferred locations L1 and L2. The relative position between the auxiliary camera 27 and the main camera 23, which is also required for such a parallax correction, may, for example, be entered into the position-determining devices 57 during a calibration, so that the background display system 11 may be used with different camera systems 24, in particular different main cameras 23.

According to the embodiments illustrated in FIGS. 4C and 4D, it may also be provided for, that the main camera 23 or the auxiliary camera 27 includes a position-determining device 57. Here, position data P may therefore be transmitted directly to the control device 25 of the background display device 15, while the camera data D are processed within the camera 23 or the camera system 24.

Such a position-determining device 57 integrated in the camera 23 or the auxiliary camera 27 may be configured, for example, to first determine positions of the position markers 29 in a coordinate system x, y, z defined with respect to the camera 23, whose origin may be defined in particular at the position A of Camera 23 (cf. FIGS. 6A to 7B). For example, positions of the position markers 29 relative to one another may be entered in the camera 23 before the start of the recording, for example, by connecting a computer or PC or via an input menu of the camera 23 or the auxiliary camera 27, so that the position-determining device 57 may be calibrated to a certain extent to the image recording studio 13 or the background display device 15.

An unknown position of a position marker 29 with the coordinates (X, Y, Z) may be determined, for example, by considering a straight line 71 starting from this position marker 29 and pointing along the previously determined direction R1, and a straight line 72 starting from a further position marker 29 and pointing along a previously determined direction R2, and which lines intersect at the position of the camera 23 or auxiliary camera 27, in particular at the origin. Due to the known relative positions of the position markers 29, the coordinates of further position markers 29 may be specified as (X, Y+Y1, Z+Z1), wherein Y1 and Z1 are known. After the positions of the position markers 29 in the coordinate system x, y, z defined with respect to the camera 23, have been determined, by comparing these coordinates of the position markers 29 with the coordinates of the position markers 29 in a fixed coordinate system x, y, z with respect to the background display device 15, the position A of the camera 23 in this coordinate system x, y, z may be calculated. By firstly taking into consideration an alignment of the associated camera 23 and/or the auxiliary camera 27, also here, the directions R1 and R2 may be transferred in an opposite coordinate system x, y, z defined with respect to the background display device 15 or the image recording studio 13, if necessary, transferred in a translational shifted coordinate system x, y, z.

Fundamentally, the determined position A of the camera 23 may be used by the control device 25 to adapt the representation 19 of the virtual background 21 in dependence on this position A. The control device 25 may, for example, draw on the memory 45 in which at least one model for generating the representation 19 of the virtual background 21 may be stored. In this case, such a model may include, for example, for respective background regions 47 which in particular may be assigned to objects 91, 92, 93 and 94 of the virtual background 21, respective image information 49 and respective position information 51. The control device 25 may be configured to generate the representation 19 of the virtual background 21 based on the image information 49, and to adapt it taking into consideration the position information 51 and in dependence of the position A of the associated camera 23. In particular, the position information 51 may include respective distances between the background regions 47 and the display surface 31.

In order to generate and/or adapt the representation 19 of the virtual background 21, the control device 25 may in particular draw on a game engine, which may be configured as a software module for generating and/or adapting the representation 19 of the virtual background 21. Such a game engine may, for example, draw on a database 65 stored in the memory 45 and adapt in real time the representation 19 of the virtual background 21 in dependence on the position A of the camera 23.

Based on FIGS. 8A to 9F, various possibilities for controlling the background display device 15 in dependence on the position A of the camera 23 are discussed below by way of example, in order to be able to generate an image 39 by means of the associated camera 23 that corresponds to an expected image of a real background 20 corresponding to the virtual Background 21.

Figure 8D:
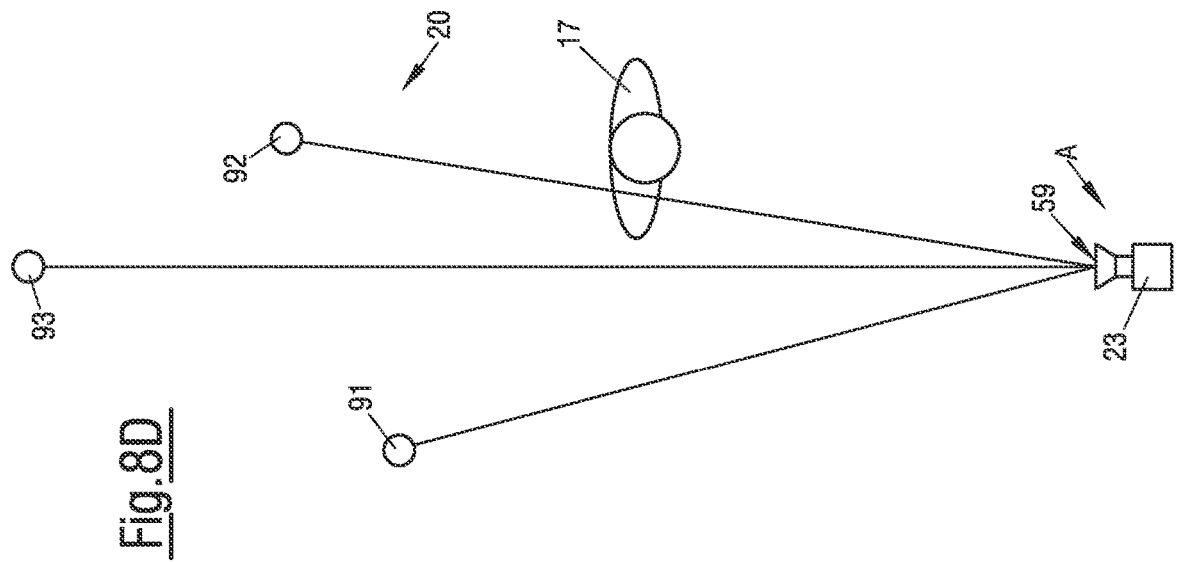
Figure 8C:
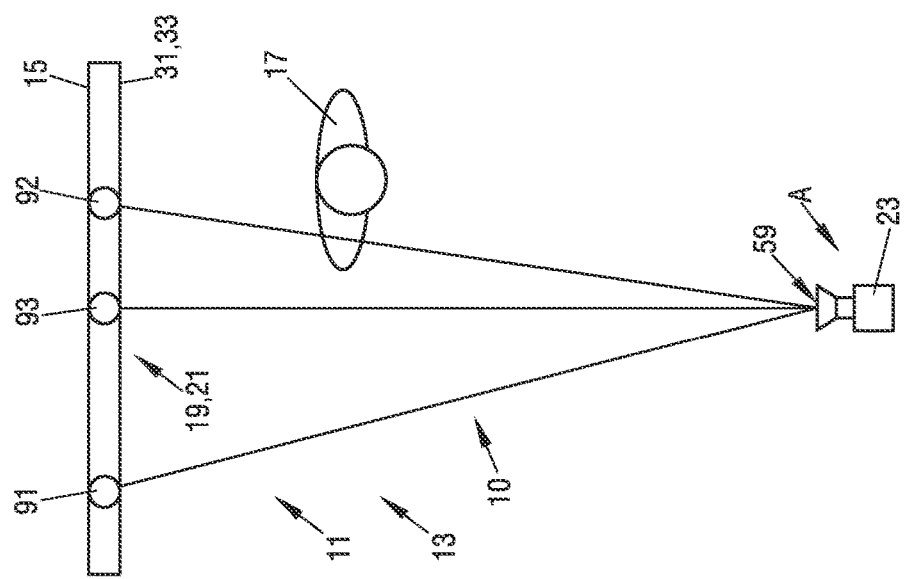

FIG. 8A illustrates initially a recording in the virtual image recording studio 13, wherein the objects 91, 92 and 93 are displayed on the display surface 31 in such a way, that rays emanating from the objects 91, 92 and 93 with the same angle impinge on the lens 59 of the camera 23 like rays emanating from corresponding objects 91, 92 and 93 in the real background 20, wherein the real background 20 is three-dimensional and corresponds to the virtual background 21 (cf. FIG. 8B). If the position A of the camera 23 is now changed, these angles change differently in an image 39 of the representation 19 of the virtual background 21 than in an imaging of the real background 20, since the objects 92 and 93 in the real background 20 are arranged at a different distance to the camera 23 than when it is displayed on the display surface 31 of the background display device 15 (cf. FIGS. 8C and 8D). Therefore, by a change in the position A of the camera 23, the image 39 of the representation 19 of the virtual background 21 generated by the camera 23 does not correspond to the image that an observer would expect for an imaging of the real background 20.

By determining the position A of the camera 23, the representation 19 of the virtual background 21, in particular taking into consideration the respective position information 51 of background regions 47 of the virtual background 21, may, however, be adapted in such a way that the image 39 of the representation 19 of the virtual background 21 generated by the camera 23, corresponds to the expected image of the real background 20. As FIGS. 8E and 8F show, the objects 91, 92 and 93 may be displaced starting from the representation in FIG. 8E, so that the objects 91, 92 and 93 ultimately may be imaged by the camera 23 in the expected arrangement (cf. FIG. 8F).

Figure 9B:
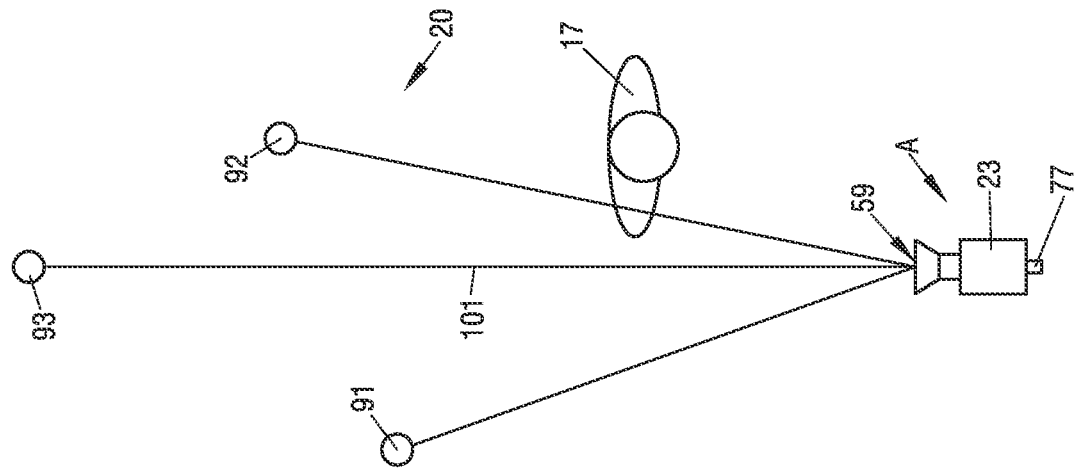
Figure 9A:
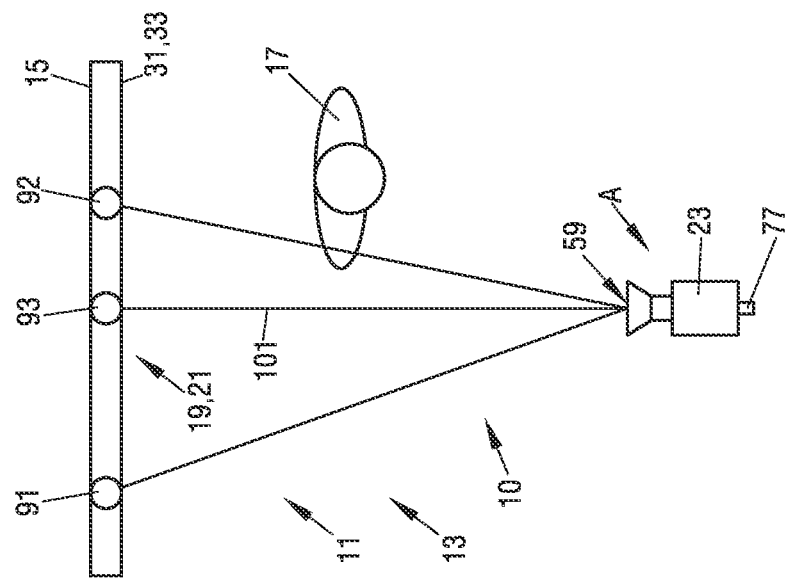
Figure 9D:
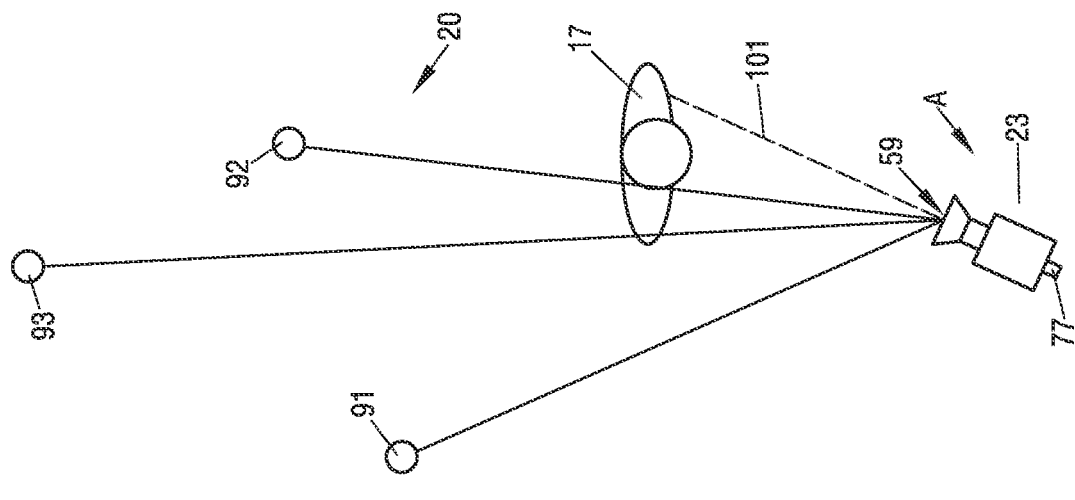
Figure 9C:
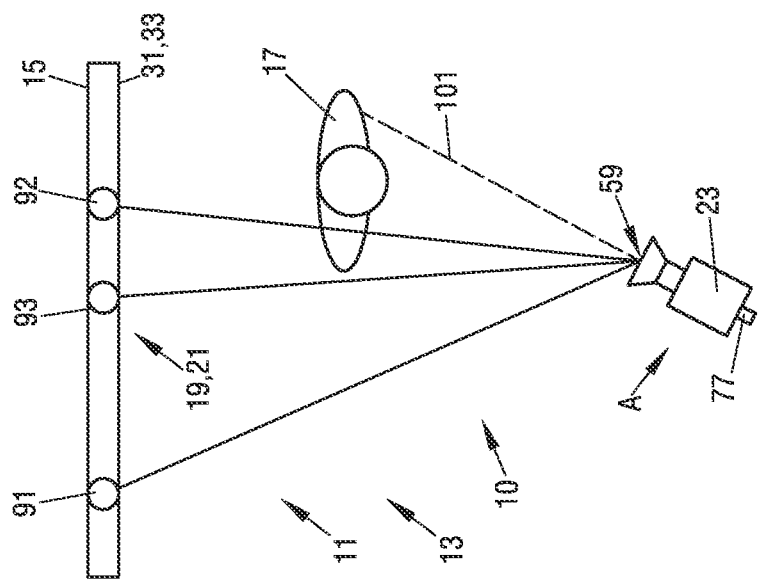

FIGS. 9A to 9F also illustrate a possibility of adapting the representation 19 of the virtual background 21 in dependence on the position A of the associated camera 23 and taking into consideration the orientation of the camera 23 or its rotational position. FIGS. 9A and 9B again show a situation in which the camera 23, when aligned with the display surface 31 of the background display device 15, generates an image 39 which corresponds to an image expected when imaging the real background 20. If the camera 23 is then rotated, the objects 92 and 93 in the representation 19 of the virtual background 21 are displayed at angles to the optical axis 101 of the camera 23 which do not correspond to the angles for an imaging of the real background 20 (cf. FIGS. 9C and 9D). However, as FIGS. 9E and 9F show, this effect may also be corrected for by displacing the objects 92 and 93 on the display surface 31 with knowledge of the position A of the camera 23 and its orientation, which may be determined in particular by means of the measurement device 77. However, for such a correction it is also necessary to know the position A of the camera 23, which, as explained above, may be determined based on the locations L1 and L2 of the position markers 29 in the image 39 of the background display device 15 generated by the camera 23 or an auxiliary camera 27 connected to it. The control device 25 may in particular be configured to adapt in real time the representation 19 of the virtual background 21 in dependence on changing positions A and/or changing orientations of the camera 23.

Thus, the position markers 29 provided at the background display device 15 allows in a simple manner, the determination of the position A of the camera 23 and the adapting of the representation 19 of the virtual background 21 taking this position A into account. In addition, various embodiments of the associated camera 23 or a camera system 24 are possible, in order to be able to determine the position A of the camera 23 from an image 39 generated at this position A. Structurally complex solutions in which the camera 23 is observed by external or further high-resolution cameras may consequently be dispensed with.

LIST OF REFERENCE NUMERALS 10 recording system
11 background display system
13 image recording studio
15 background display device
17 real subject, actor
19 representation
20 real background
21 virtual background
23 camera, main camera
24 camera system
25 control device
27 auxiliary camera
29 position marker
30 marking pattern
31 display surface
33 light-source wall 34 light sources
35 picture-element light source
36 grid of picture-element light sources
37 position marker light source
38 light-emitting diode
39 image, optical image
41 imaged position marker
43 three-dimensional scene
45 memory
47 background region
49 image information
51 position information
53 camera body
55 main sensor element
57 position-determining device
59 camera lens, interchangeable lens
61 supplementary sensor element
63 supplementary sensor area
65 data bank
67 light-inlet opening
69 main sensor area
70 center point ray
71 center point ray
72 center point ray
73 distance between light-inlet opening and image sensor
75 center point of display surface
77 measurement device
79 viewfinder
81 lens ring
83 lens servomotor
85 lens ring driving unit
87 holding rod
89 coupling rod
91 first object
92 second object
93 third object
94 fourth object
95 image sensor
96 center point of image sensor
97 readout circuit
99 signal output
101 optical axis
103, 103', 103" position of position marker
104, 104', 104" position of position marker
105, 105', 105" position of position marker
106, 106', 106" position of position marker
107 sensor element
108 sensor element
109 recording field of view
111 observation field of view
113 rectangular sensor area
115 over-scan area
117 edge
119 image of recording field of view
121 image of observation field of view
123 display module
125 lateral edge
A position
B image data, image data set
D camera data
L1, L2, L3, L4 location
P position data
R1, R2 direction
S picture-element light signal
U origin
x, x' axis
X1 coordinate
y, y' axis
Y1, Y2 coordinate
z, z' axis
Z1, Z2 coordinate

The invention claimed is:

1. A background display device for a virtual image recording studio,
   which is configured to display, behind or above a real subject, a representation of a virtual background for a recording by an associated camera,
   wherein the background display device is further configured to display a plurality of predetermined optically detectable position markers while displaying the representation of a virtual background in order to enable a determination of a position of the associated camera relative to the background display device,
   wherein the virtual background represents a three-dimensional scene.

2. A background display device according to claim 1, wherein the background display device comprises a display surface for the representation of the virtual background, and wherein the background display device extends in at least one of a vertical or horizontal orientation.

3. A background display device according claim 1, wherein the background display device comprises a light-source wall including a plurality of light sources, wherein the light sources are configured to display the representation of the virtual background and to generate the plurality of position markers.

4. A background display device according to claim 3, wherein the background display device comprises a plurality of position marker light sources which generate the plurality of position markers, and wherein the light-source wall comprises a plurality of picture-element light sources which are individually controllable and which generate respective picture-element light signals in order to display the virtual background.

5. A background display device according to claim 4, wherein the background display device is configured to generate the plurality of position markers with partially or completely different wavelengths than the picture-element light signals.

6. A background display device according to claim 4, wherein the background display device is configured to generate the plurality of position markers with partially or completely non-visible wavelengths.

7. A background display device according to claim 4, wherein the plurality of picture-element light sources is arranged in a regular grid, wherein the position marker light sources are arranged between the picture-element light sources of the regular grid.

8. A background display device according to claim 4, wherein the plurality of picture-element light sources is arranged in a regular grid, wherein the position marker light sources are arranged in place of a respective picture-element light source of the regular grid.

9. A background display device according to claim 4, wherein the background display device comprises a plurality of display modules having lateral edges, wherein the display modules adjoin one another at their lateral edges, wherein each of the plurality of display modules comprises a part of the plurality of picture-element light sources, wherein the plurality of position marker light sources is arranged at the lateral edges of the plurality of display modules.

10. A background display device according claim 1, wherein the background display device is configured to generate the position markers as at least one predetermined marking pattern.

11. A background display system for a virtual image recording studio, comprising:
- a background display device for a virtual image recording studio, which is configured to display, behind or above a real subject, a representation of a virtual background for a recording by an associated camera, wherein the background display device is further configured to display a plurality of predetermined optically detectable position markers, in order to enable a determination of a position of the associated camera relative to the background display device, wherein the virtual background represents a three-dimensional scene; and
- a position-determining device which is configured to determine the position of the associated camera in dependence on camera data which represent locations of the plurality of position markers within an image of the background display device.

12. A background display system according to claim 11, wherein the camera data include coordinates of the locations of the plurality of position markers within an image of the background display device generated by at least one of the associated camera or at least one auxiliary camera.

13. A background display system according to claim 11, wherein the camera data include image data of an image of the background display device generated by at least one of the associated camera or at least one auxiliary camera, wherein the position-determining device is configured to determine the locations of the plurality of position markers within the image.

14. A background display system according to claim 11, wherein the position-determining device is configured to determine, from the locations of the plurality of position markers within the image, respective directions in which the plurality of position markers generated on the background display device are arranged relative to the associated camera.

15. A background display system according to claim 14, wherein the position-determining device is configured to determine the position of the associated camera as an intersection of straight lines which extend from the multiple position markers in the respective directions.

16. A background display system according to claim 11, wherein the camera data further include an orientation of the associated camera, wherein the orientation of the associated camera includes at least one of a rotational position or a tilt position of the associated camera, wherein the position-determining device is configured to consider the orientation when determining the position of the associated camera.

17. A background display system according to claim 11, further comprising a control device which is configured to adapt the representation of the virtual background in dependence on a determined position of the associated camera.

18. A recording system comprising a background display system according to claim 11 and further comprising at least one of the associated camera or at least one auxiliary camera, wherein the associated camera or the at least one auxiliary camera is configured to generate the camera data for the position-determining device.

19. A recording system according to claim 18, wherein the associated camera or the at least one auxiliary camera is configured to detect light of a non-visible wavelength.

20. A recording system according to claim 18, wherein the at least one auxiliary camera is configured to be coupled to the associated camera in a detachable manner, but in a defined position.

21. A recording system according to claim 18, wherein only an image sensor of the at least one auxiliary camera, but not an image sensor of the associated camera, is light-sensitive to non-visible wavelengths.

22. A recording system according to claim 18, wherein the associated camera comprises the position-determining device, wherein the associated camera further comprises a signal output which is configured to transmit the determined position of the associated camera to the background display device.

23. A method for controlling a background display device which displays, behind or above a real subject, a representation of a virtual background for a recording by an associated camera and generates a plurality of predetermined optically detectable position markers, comprising the step of determining a position of the associated camera in dependence on camera data which represent locations of the plurality of position markers within an image of the background display device, wherein the virtual background represents a three-dimensional scene.

24. A method according to claim 23, further comprising the step of adapting the representation of the virtual background in dependence on the determined position of the associated camera.

25. A method according to claim 23, wherein the position of the associated camera is calculated in dependence on the camera data.

26. A method according to claim 23, wherein the position of the associated camera is looked up in dependence on the camera data in a look-up table.

27. A method according to claim 23, wherein the background display device comprises a light-source wall including a plurality of light sources, wherein the position markers are generated by the plurality of light sources.

28. A method according to claim 23, wherein the position markers are generated in a non-visible wavelength range.

29. A method according to claim 23, wherein the position markers are generated as at least one predetermined marking pattern.

* * * * *